US012582126B2

(12) United States Patent
Rodionov et al.

(10) Patent No.: US 12,582,126 B2
(45) Date of Patent: Mar. 24, 2026

(54) AUTOMATED FOOD ARTICLE MAKING SYSTEM AND METHOD

(71) Applicant: X Robotics, Inc., San Francisco, CA (US)

(72) Inventors: Denis Rodionov, San Francisco, CA (US); Roman Sharapov, San Francisco, CA (US)

(73) Assignee: X ROBOTICS, INC., San Francisco, CA (US)

( * ) Notice: Subject to any disclaimer, the term of this patent is extended or adjusted under 35 U.S.C. 154(b) by 988 days.

(21) Appl. No.: 17/475,293

(22) Filed: Sep. 14, 2021

(65) Prior Publication Data

US 2023/0077697 A1 Mar. 16, 2023

(51) Int. Cl.
*A21C 9/04* (2006.01)
*A21D 13/22* (2017.01)
*A21D 13/41* (2017.01)

(52) U.S. Cl.
CPC ................ *A21C 9/04* (2013.01); *A21D 13/22* (2017.01); *A21D 13/41* (2017.01)

(58) Field of Classification Search
CPC ........... A21C 9/04; A21D 13/22; A21D 13/41
See application file for complete search history.

(56) References Cited

U.S. PATENT DOCUMENTS 3,513,477 A    5/1970  Hayashi
3,554,391 A *  1/1971  Goodell ................. B65G 1/045
                                                          414/331.05

(Continued)

FOREIGN PATENT DOCUMENTS

CN         103037697 A      4/2013
JP         2007020520 A     2/2007
(Continued)

OTHER PUBLICATIONS

International Search Report dated Feb. 9, 2023 issued on PCT/US2022/043266, filed Sep. 13, 2022, entitled "Automated Food Article Making System and Method" in the name of X Robotics, Inc.

(Continued)

*Primary Examiner* — Claire X Wang
*Assistant Examiner* — Patrick M McCarty
(74) *Attorney, Agent, or Firm* — Franklin & Associates International Inc; Matthew F. Lambrinos

(57) ABSTRACT

An automated pizza making system and method for rapidly and efficiently preparing a pizza utilizing computer controlled components. The system includes a platform moving assembly for moving and rotating a pizza crust, a sauce dispenser assembly for dispensing a sauce on the pizza crust, a cheese dispenser assembly for dispensing cheese on the pizza crust, and a slicer assembly for slicing food items and dispensing the sliced food items on the pizza crust. A time-of-flight sensor can be utilized to scan the pizza crust for determining the amount or placement of ingredients on the pizza crust. A weight sensor can be utilized for determining the amount of ingredients placed on the pizza crust. A computer system can be utilized to execute a user's orders and control all the electrical components based on pizza parameters entered by the user in an automated mode, with minimal human assistance.

20 Claims, 33 Drawing Sheets

(56) References Cited

U.S. PATENT DOCUMENTS

| | | | | |
|---|---|---|---|---|
| 3,662,677 | A | * | 5/1972 | Westling .............. A23G 3/2076 |
| | | | | 241/220 |
| 3,851,554 | A | | 12/1974 | Papai |
| 4,078,874 | A | | 3/1978 | Lenhardt, Sr. |
| 4,595,349 | A | | 6/1986 | Preston et al. |
| 4,844,296 | A | | 7/1989 | Hayashi |
| 4,996,914 | A | * | 3/1991 | D'Alterio .............. A21C 9/066 |
| | | | | 99/450.2 |
| 5,121,677 | A | | 6/1992 | Le Claire et al. |
| 5,215,771 | A | | 6/1993 | Callebaut et al. |
| 5,217,108 | A | | 6/1993 | Newnan |
| 5,318,629 | A | | 6/1994 | Raque et al. |
| 5,445,674 | A | * | 8/1995 | DeMars ................... A21C 9/04 |
| | | | | 137/563 |
| 5,921,170 | A | * | 7/1999 | Khatchadourian .... A21D 13/41 |
| | | | | 99/450.7 |
| 5,997,924 | A | | 12/1999 | Olander, Jr. et al. |
| 6,422,421 | B1 | | 7/2002 | Freudinger et al. |
| 8,710,408 | B2 | | 4/2014 | Khatchadourian et al. |
| 9,974,314 | B2 | | 5/2018 | Watson |
| 10,792,818 | B2 | | 10/2020 | Fritz-Jung et al. |
| 10,980,270 | B2 | | 4/2021 | Lindee et al. |
| 11,544,925 | B1 | * | 1/2023 | Lim ....................... G06Q 50/12 |
| 11,685,641 | B2 | | 6/2023 | Lange et al. |
| 11,903,516 | B1 | * | 2/2024 | Lyons ..................... A61J 9/001 |
| 2002/0020348 | A1 | | 2/2002 | Gardner |
| 2002/0176921 | A1 | | 11/2002 | Torghele |
| 2006/0239758 | A1 | * | 10/2006 | Di Paolo .............. A47G 19/183 |
| | | | | 401/152 |
| 2010/0075013 | A1 | * | 3/2010 | Takata ..................... A23G 9/28 |
| | | | | 99/461 |
| 2010/0212516 | A1 | | 8/2010 | Westberg |
| 2011/0059209 | A1 | * | 3/2011 | Khatchadourian .. A21C 11/006 |
| | | | | 426/232 |
| 2011/0209961 | A1 | | 9/2011 | Fritz-Jung |
| 2012/0185086 | A1 | * | 7/2012 | Khatchadourian ..... G07F 11/70 |
| | | | | 99/345 |
| 2013/0331989 | A1 | | 12/2013 | Umeno |
| 2014/0154384 | A1 | * | 6/2014 | Vardakostas ........ G07F 17/0078 |
| | | | | 426/531 |
| 2016/0067866 | A1 | | 3/2016 | Sekar et al. |
| 2017/0290345 | A1 | | 10/2017 | Garden et al. |
| 2018/0075506 | A1 | | 3/2018 | Burkhard et al. |
| 2018/0230997 | A1 | * | 8/2018 | Dearden ................... F04C 2/18 |
| 2019/0142017 | A1 | * | 5/2019 | Blachere ................. A21B 1/50 |
| | | | | 426/496 |
| 2020/0154754 | A1 | | 5/2020 | Lindee et al. |
| 2020/0249660 | A1 | | 8/2020 | Rao |
| 2021/0094188 | A1 | | 4/2021 | Rodionov |
| 2021/0186034 | A1 | * | 6/2021 | Frea ......................... A21C 9/04 |
| 2021/0282409 | A1 | * | 9/2021 | Kesler ................. A21C 11/006 |
| 2023/0077697 | A1 | | 3/2023 | Rodionov et al. |
| 2023/0240459 | A1 | | 8/2023 | Rodionov et al. |
| 2023/0255225 | A1 | | 8/2023 | Rodionov et al. |
| 2023/0371739 | A1 | * | 11/2023 | Taylor ..................... H05B 3/74 |
| 2023/0381995 | A1 | | 11/2023 | Rodionov et al. |

FOREIGN PATENT DOCUMENTS

| | | | |
|---|---|---|---|
| JP | 2010007509 | A | 1/2010 |
| WO | 2017101015 | A1 | 6/2017 |
| WO | 2017134156 | A1 | 8/2017 |
| WO | 2019070733 | A1 | 4/2019 |
| WO | 2021062343 | A1 | 4/2021 |
| WO | 2023/043706 | | 3/2023 |
| WO | 2023196657 | A1 | 10/2023 |
| WO | 2024227110 | A1 | 10/2024 |

OTHER PUBLICATIONS

Written Opinion of International Search Authority dated Feb. 9, 2023 issued on PCT/US2022/043266, filed Sep. 13, 2022, entitled "Automated Food Article Making System and Method" in the name of X Robotics, Inc.

PCT/US2020/052982, International Searching Authority, Notification of Transmittal of the International Search Report and the Written Opinion of the International Searching Authority, Notification Date Dec. 17, 2020.

Written Opinion issued on Oct. 10, 2024 on International Patent Application PCT/US2024/026684, filed Apr. 26, 2024, in the name of X Robotics, Inc.

Written Opinion issued on Aug. 11, 2023 on International Patent Application PCT/US23/17976, filed Apr. 7, 2023, in the name of X Robotics, Inc.

Partial supplementary European search report dated Aug. 28, 2023 issued on European Patent Application No. 20868965.3, filed Sep. 27, 2020 in the name of X Robotics Inc.

* cited by examiner

90 ⟶

92
Sauce
Container

102
Pump

112
Tube

118
Servo
Motor

Adjustable Smearing
System

Crust Thickness
Data

Spreader
120

112
Tube

118
Servo
Motor

Position
1

4
Sauce

128
Spreader Pad(s)

Position #2

300

52

58

2

130

132
Container 140,162
Mixer

170
Auger

178
Silicone
Nozzle

180

Silicone
Nozzle

Gear Box

140'
Motor #1

140
Motor #2

Revolver

192

Weight Pressure 196

Sausage

2

190

204
Disk

Adjustable
Thickness

230
Vibro
Motor

212
Anti-stick
Silicone Nozzle

205
Servo
Motor

270

358    Move platform unit to sauce spreader

360    Sauce spreader is lowered second position to contact pizza crust

362    Start pizza crust rotation ( start tray motor)

364    Start sauce pump

366    Slowly move platform unit/ pizza crust so sauce is spread from border to center 368    Raise and disable sauce spreader to first position 370    Stop sauce pump and tray motor 402 — Move platform to the start or idle position 404 — Notify user dispensing process is finished

AUTOMATED FOOD ARTICLE MAKING SYSTEM AND METHOD

BACKGROUND

Technical Field

The present technology relates to automated food article making systems and methods for use in connection with automatic food processing. In some other aspects, the present technology relates to a platform moving assembly for food dispensing and/or method of operation thereof. In some other aspects, the present technology relates to a food dispenser and/or method of dispensing food. In some other aspects, the present technology relates to a sauce dispenser and/or method of dispensing sauce. In some other aspects, the present technology relates to a cheese dispenser and/or method of dispensing cheese. In some other aspects, the present technology relates to a food slicer assembly and/or method of slicing tubular like food. In yet some further aspects, the present technology relates to a system and/or method that can prepare a food article and execute client orders in an automated mode, with minimal human assistance. In some other aspects, the present technology relates to an automated system and/or method for preparing a pizza for cooking.

Background Description

Due to permanently increasing wages there is pressure on restaurants concerning economical efficiency. The possible salvation is the automatization of the restaurants. Nowadays there is no fully automatic restaurant in the world. Most of the restaurants use scattered tools and machines, with manual control and logistics between those.

Many attempts were executed to automatization of the restaurants. Most of it uses universal robotics in the process. Patent U.S. Pat. No. 5,997,924A uses a robot arm to move pizza from the topping line to the oven. Topping is executed manually. Patent U.S. Pat. No. 9,974,314B2 also uses a robot arm to move the pizza between stations. Patent WO 2017/134156 A1 uses 2 robot arms for pizza sauce spreading and moving the pizza from dough press to ingredients dispenser and then to carousel oven. In all the examples the robot arm copies of the human behavior and has constraints related to it. The throughput capacity of one arm is equal to one employee.

Several patents use CNC-like machines with linear motion modules (e.g., US20160067866A1). It is a precise mechanism with excess accuracy and complex installation and calibration process. It is not flexible, allows only consistent work with limited speed and capacity. There is a group of patents with the invention of the pizza vending machine (U.S. Pat. No. 8,710,408B2, WO2017101015A1). However, the design of all these machines doesn't allow to cook restaurant quality pizza because of limited ingredients, frozen dough and a number of other quality constraints related to the vending format.

A need exists for a new and novel automatic food article making systems and methods that can be used for preparing and cooking food items per client orders utilizing flexible automatic food processing. In this regard, the present technology substantially fulfills this need. In this respect, the automatic food article making system and method according to the present technology substantially departs from the conventional concepts and designs of the prior art, and in doing so provides an apparatus primarily developed for the purpose of preparing food articles per client orders utilizing automatic food article making system and method.

SUMMARY

According to one aspect of the present technology, a food dispensing system is provided. The food dispensing system can comprise a food dispenser and a platform for supporting a pizza crust or other type of food. The food dispenser can include a food spreader. The system can include a computer processing unit or other controller is configured to adjust the position of the platform relative to the food spreader according to thickness data associated with the thickness of food on the platform. In some embodiments, the platform is moveable. The computer processing unit or controller can be configured to control the movable platform to adjust the height of the platform according to the thickness data such that the food spreader position is maintained in substantially the same position relative to the food surface on the platform irrespective of whether the thickness of the food on the platform is a smaller thickness or a larger thickness than an average thickness or predefined thickness for which the food spreader is normally configured to operate.

In some embodiments, the food spreader position is movable and the computer processing unit or controller can be configured to control the movable food spreader position relative to the surface of the food on the platform (which may be moveable or fixed in height) according to the thickness data such that the food spreader position is maintained in substantially the same position relative to the food surface on the platform irrespective of whether the thickness of the food on the platform is a smaller thickness or a larger thickness than an average thickness or predefined thickness for which the food spreader is normally configured to operate. In some embodiments, the food dispenser is a cheese dispenser. In some embodiments, the food dispenser is a food slice dispenser such as a sausage slice dispenser In some embodiments, the food dispenser system is a sauce dispenser system. The sauce dispenser system can comprise a sauce dispenser assembly including a sauce spreader configured to spread the sauce dispensed from a discharge tube on to a pizza crust or other type of food. The sauce spreader can include a discharge tube opening configured to receive therethrough an end of the discharge tube, and a spreader pad adjacent the discharge tube opening, the spreader pad being positionable downstream of the discharge tube opening so that the sauce dispensed from the discharge tube is spread out by the spreader pad in relation to a rotational direction of the pizza crust. The sauce spreader can be pivotable so that the spreader pad(s) is contactable with the pizza crust. In some embodiments, the sauce spreader is pressed against the pizza crust or other food so that the spreader pad(s) in contact with the pad are pressed onto the pizza crust surface on which the sauce is being dispensed. The computer processing unit or controller can be configured to control the movable platform to adjust the height of the platform according to the thickness data such that the pivotable sauce spreader angle of inclination to the pizza crust surface, spreader pads position, and/or spreader pad pressing force on the pizza crust surface is/are maintained in their normal operating range or in substantially the same operating range irrespective of whether the thickness of the food on the platform is a smaller thickness or a larger thickness than an average thickness or predefined thickness for which the sauce spreader is normally configured to operate. In some embodiments, the amount of required adjustment of the height of the platform according to the thickness data can be predetermined during system calibration for pizza crusts with regular thickness, smaller thickness and larger thickness.

Alternatively or additionally, in some embodiments the computer processing unit or controller can be configured to adjust the height of the pivot point of the sauce spreader (the vertical distance between the pivot of the sauce spreader and the platform) according to the thickness data such that the pivotable sauce spreader angle of inclination to the pizza crust surface, spreader pads position, and/or spreader pad pressing force on the pizza crust surface is/are maintained in their normal operating range or in substantially the same operating range irrespective of whether the thickness of the food on the platform is a smaller thickness or a larger thickness than an average thickness or predefined thickness for which the sauce spreader is normally configured to operate. In some embodiments, the amount of required adjustment of the height of the pivot point of the sauce spreader according to the thickness data can be predetermined during system calibration for pizza crusts with regular thickness, smaller thickness and larger thickness.

Alternatively or additionally, in some embodiments, the computer processing unit or controller can be configured to control the pivotable sauce spreader angle of inclination to the pizza crust surface, spreader pads position, and/or spreader pad pressing force on the surface of the pizza crust on the platform (which may be moveable or fixed in height) according to the thickness data such that the sauce spreader is able to spread the sauce being discharged into a substantially uniform and consistent layer irrespective of whether the thickness of the pizza crust on the platform is a smaller thickness or a larger thickness than an average thickness or predefined thickness for which the sauce spreader normally configured to operate. In some embodiments, the amount of required adjusted of sauce spreader angle of inclination to the pizza crust surface, spreader pads position, and/or spreader pad pressing force on the surface of the pizza crust on the platform (which may be moveable or fixed in height) according to the thickness data can be predetermined during system calibration for pizza crusts with regular thickness, smaller thickness and larger thickness.

Additionally, the sauce dispenser system or platform of any ore the embodiments can include a range finder sensor configured to determine the thickness of the pizza crust or other food on the platform. The range finder sensor can be operably coupled to the computer processing unit or other controller.

In some embodiments, the food dispenser system is a sauce dispenser system. The sauce dispenser system can comprise a sauce dispenser assembly including a sauce spreader configured to spread the sauce dispensed from a discharge tube on to a pizza crust or other type of food. The sauce spreader can include a discharge tube opening configured to receive therethrough an end of the discharge tube, and a spreader pad adjacent the discharge tube opening, the spreader pad being positionable downstream of the discharge tube opening so that the sauce dispensed from the discharge tube is spread out by the spreader pad in relation to a rotational direction of the pizza crust. In other embodiments, the sauce dispensed is spread out by the spreader pad in relation to a linear direction of the pizza crust (for example if the pizza crust is on a convey platform rather than rotatable platform). The sauce spreader can be pivotable so that the spreader pad(s) is contactable with the pizza crust. In some embodiments, the sauce spreader is pressed against the pizza crust or other food so that the spreader pad(s) in contact with the pad are pressed onto the pizza crust surface on which the sauce is being dispensed. The computer processing unit or controller can be configured to control the movable platform to adjust the height of the platform according to the thickness data such that the pivotable sauce spreader angle of inclination to the pizza crust surface, spreader pads position, and/or spreader pad pressing force on the pizza crust surface is/are maintained in their normal operating range or in substantially the same operating range irrespective of whether the thickness of the food on the platform is a smaller thickness or a larger thickness than an average thickness or predefined thickness for which the sauce spreader is normally configured to operate. In some embodiments, the amount of required adjustment of the height of the platform according to the thickness data can be predetermined during system calibration for pizza crusts with regular thickness, smaller thickness and larger thickness.

According to one aspect, the present technology can include a sauce dispenser system that can include a sauce dispenser assembly. The sauce dispenser assembly can include a sauce container, a sauce pump unit and a sauce spreader. The sauce container can be configured to store a sauce therein. The sauce pump unit can be configured to receive and pump the sauce from the sauce container to a discharge tube. The sauce spreader can be configured to spread the sauce dispensed from the discharge tube on to a pizza crust.

In some or all embodiments, the sauce pump unit can include a sauce motor operatively coupled to a pair of counter rotating impellers.

In some or all embodiments, the sauce spreader can include a discharge tube opening configured to receive therethrough an end of the discharge tube, and a spreader pad adjacent the discharge tube opening. The spreader pad can be positionable downstream of the discharge tube opening so that the sauce dispensed from the discharge tube is spread out by the spreader pad in relation to a rotational direction of the pizza crust.

In some or all embodiments, the sauce spreader can be pivotable so that the spreader pad is contactable with the pizza crust.

In some embodiments, the sauce spreader includes a range finder sensor system configured to scan the pizza crust to provide thickness data associated with the pizza crust. The range finder sensor system may comprise a time-of-flight sensor or other type of range finder sensor system.

In some embodiments, the sauce dispenser comprises a platform moving assembly configured to support a pizza crust at a dispense operating height. The platform moving assembly may further comprise a weight sensor configured to provide weight data associated with the pizza crust and any ingredients thereon.

In some embodiments, the sauce dispenser may further comprise a computer system including at least one processing unit operably connected or connectable to the platform moving assembly, the and the range finder sensor system and/or the weight sensor. The at least one processing unit can be configured to control any one of or combination of the platform moving assembly to adjust the dispense operating height at which the pizza crust is supported according to the thickness data, the sauce spreader pad position and the sauce pump according to the thickness data and/or the weight data.

Some or all embodiments of the present technology can include a platform moving assembly that can include a platform unit configured to move in a horizontal direction along a pair of travel tracks. The platform moving assembly can include a travel motor configured to impart movement of the platform unit in the horizontal direction. The platform moving assembly can include a tray motor unit slidably mounted to the platform unit and configured to move in a vertical direction in relation to the platform unit. The tray motor unit can include a tray motor configured to rotate a tray support platform that is configured to support the pizza crust.

In some or all embodiments, the platform unit can include a platform motor and platform gear, with the platform gear being configured to engage with a rack gear of the tray motor unit to move the tray motor unit in the vertical direction.

Some or all embodiments of the present technology can include a time-of-flight sensor configured to scan the pizza crust to provide thickness data associated with the pizza crust, and wherein the tray motor unit further comprising a weight sensor configured to provide weight data associated with the pizza crust acting on the tray motor.

Some or all embodiments of the present technology can include a computer system including at least one processing unit operably connected or connectable to the tray motor, the travel motor, the platform motor, a horizontal position sensor and a vertical position sensor each associated with the platform unit, the sauce motor, the weight sensor and the time-of-flight sensor.

In some or all embodiments, the at least one processing unit can be configured to control any one of or any combination of the tray motor, the travel motor, the platform motor, and the sauce motor based on any one of or any combination of the weight data, the thickness data, horizontal position data provided by the horizontal position sensor, and vertical position data provided by the vertical position sensor.

According to another aspect, the present technology can include a method of operating a sauce dispenser system. The method can include the step of moving a platform unit that is supporting a pizza crust thereon to a position below a sauce dispenser assembly. The method can include the step of rotating the pizza crust while below the sauce dispenser assembly. The method can include the step of moving the platform unit in a vertical direction toward the sauce dispenser assembly. The method can include the step of contacting a spreader pad of a sauce spreader with the pizza crust. The method can include the step of pumping a sauce from a sauce container of the sauce dispenser assembly to a discharge tube. The method can include the step of dispensing the sauce from the discharge tube so as to be spread on the pizza crust by the sauce spreader.

In some embodiments, the method can further comprise the step of controlling the platform unit to adjust the dispense operating height at which the pizza crust is supported between the pizza crust and the spreader pad according to any one of or any combination of weight data provided by a weight sensor associated with the platform movement assembly and thickness data associated with the pizza crust provided by a range finder sensor system.

In some embodiments, the ranger finder sensor system can comprise a time-of-flight sensor or other type of range finder sensor system.

In some embodiments, the step of moving a platform unit that is supporting a pizza crust thereon to a position below a sauce dispenser assembly comprises moving the platform unit in a horizontal direction to a position below the sauce dispenser assembly.

In some or all embodiments, the moving of the platform unit in the horizontal direction can be accomplished by operating a travel motor that is configured to move the platform unit along a pair of travel tracks. The rotation of the pizza crust can be accomplished by operating a tray motor associated with a tray motor unit, the tray motor being configured to support the pizza crust. The moving of the platform unit in the vertical direction can be accomplished by operating a platform motor associated with the platform unit that operates a platform gear that is engageable with a rack gear of the tray motor unit.

Some or all embodiments of the present technology can include a step of controlling the travel motor, the tray motor and the platform motor in part by any one of or any combination of weight data provided by a weight sensor associated with the tray motor unit, and thickness data associated with the pizza crust provided by the range finder sensor system.

Some or all embodiments of the present technology can include a step of controlling the travel motor to move the platform unit in the horizontal direction based on any one of or any combination of the weight data, the thickness data, horizontal position data provided by a horizontal position sensor associated with the platform unit, and vertical position data provided by a vertical position sensor associated with the platform unit. Some or all embodiments of the present technology can include a step of controlling the tray motor based on any one of or any combination of the weight data, the thickness data, the horizontal position data, and the vertical position data. Some or all embodiments of the present technology can include a step of control the platform motor based on any one of or any combination of the weight data, the thickness data, the horizontal position data, and the vertical position data.

Some or all embodiments of the present technology can include a step of controlling an amount of the sauce dispensed on to the pizza crust by controlling a sauce motor based on any one of or any combination of the weight data, the thickness data, horizontal position data provided by a horizontal position sensor associated with the platform unit, and vertical position data provided by a vertical position sensor associated with the platform unit.

Some or all embodiments of the present technology can include a step of pivoting the sauce spreader to control contact of the spreader pad with the pizza crust or an amount of the sauce is spread by the spreader pad.

Some or all embodiments of the present technology can include a step of controlling the pivoting of the sauce spreader based on any one of or any combination of the weight data, the thickness data, the horizontal position data, and the vertical position data.

According even still to another aspect, the present technology can include a computer method for operating a sauce dispenser system. The computer method can include a step of receiving, by a computer system including at least one processing unit, pizza parameters associated with a pizza order. The computer method can include a step of causing, by the computer system, movement of a platform unit that is supporting a pizza crust thereon in a horizontal direction. The computer method can include a step of causing, by the computer system, rotation of the pizza crust. The computer method can include a step of causing, by the computer system, movement of the platform unit in a vertical direction so the pizza crust and a spreader pad of a sauce spreader are in contact. The computer method can include a step of causing, by the computer system and based on the pizza parameters, a sauce to be pumped from a sauce container of a sauce dispenser assembly to a discharge tube while the pizza crust is rotating. In some embodiments, the computer method can include a step of determining, by the computer system, thickness data associated with the pizza crust utilizing a time-of-flight sensor. The computer method can include a step of determining, by the computer system, weight data associated with the pizza crust utilizing a weight sensor associated with the platform unit.

Some or all embodiments of the present technology can include a step of controlling, by the computer system, the movement of the platform unit in the horizontal direction so that the sauce is dispensed evenly over the pizza crust.

Some or all embodiments of the present technology can include a step of controlling, by the computer system, the movement of the platform unit in any one of or any combination of the horizontal direction and the vertical direction based on any one of or any combination of weight data provided by a weight sensor associated with the platform unit, thickness data provided by a range finder sensor system, horizontal position data provided by a horizontal position sensor, and vertical position data provided by a vertical position sensor.

In some or all embodiments, the moving of the platform unit in the horizontal direction can be accomplished by controlling, by the computer system, an operation a travel motor that is configured to move the platform unit along a pair of travel tracks. In some or all embodiments, the rotation of the pizza crust can be accomplished by controlling, by the computer system, an operation of a tray motor associated with a tray motor unit, the tray motor being configured to support the pizza crust. In some or all embodiments, the moving of the platform unit in the vertical direction can be accomplished by controlling, by the computer system, an operation of a platform motor associated with the platform unit that operates a platform gear that is engageable with a rack gear of the tray motor unit.

Some or all embodiments of the present technology can include a step of controlling, by the computer system, the travel motor, the tray motor and the platform motor in part by any one of or any combination of weight data provided by a weight sensor associated with the platform unit, thickness data provided by a range finder sensor system, horizontal position data provided by a horizontal position sensor, and vertical position data provided by a vertical position sensor.

Some or all embodiments of the present technology can include a step of controlling, by the computer system, a sauce motor based on any one of or any combination of the weight data, the thickness data, the horizontal position data, and the vertical position data, wherein the sauce motor is operatively associated with a sauce pump configured to pump the sauce from the sauce container.

Some or all embodiments of the present technology can include a step of controlling, by the computer system, a pivoting of the sauce spreader based on any one of or any combination of the weight data, the thickness data, the horizontal position data, and the vertical position data to control the contact of the spreader pad with the pizza crust or an amount of the sauce is spread by the spreader pad.

According to yet another aspect, the present technology can include a non-transitory computer readable medium with an executable program stored thereon comprising instructions for execution by at least one processing unit for operating a sauce dispenser system, such that the instructions when executed by the at least one processing unit can cause the at least one processing unit to receive pizza parameters associated with a pizza order. The at least one processing unit can be caused to cause movement of a platform unit that is supporting a pizza crust thereon in a horizontal direction. The at least one processing unit can be caused to cause rotation of the pizza crust. The at least one processing unit can be caused to cause movement of the platform unit in a vertical direction so the pizza crust and a spreader pad of a sauce spreader are in contact. The at least one processing unit can be caused to cause a sauce to be pumped from a sauce container of a sauce dispenser assembly to a discharge tube while the pizza crust is rotating. In some embodiments, least one processing unit can be caused to determine thickness data associated with the pizza crust utilizing a time-of-flight sensor. The at least one processing unit can be caused to determine weight data associated with the pizza crust utilizing a weight sensor associated with the platform unit.

In some or all embodiments, the at least one processing unit can be caused to control the movement of the platform unit in the horizontal direction so that the sauce is dispensed evenly over the pizza crust.

In some or all embodiments, the at least one processing unit can be caused to control the movement of the platform unit in any one of or any combination of the horizontal direction and the vertical direction based on any one of or any combination of weight data provided by a weight sensor associated with the platform unit, thickness data provided by a range finder sensor system, horizontal position data provided by a horizontal position sensor, and vertical position data provided by a vertical position sensor.

In some or all embodiments, the moving of the platform unit in the horizontal direction can be accomplished by controlling an operation a travel motor that is configured to move the platform unit along a pair of travel tracks. The rotation of the pizza crust can be accomplished by controlling an operation of a tray motor associated with a tray motor unit, the tray motor being configured to support the pizza crust. The moving of the platform unit in the vertical direction is accomplished by controlling an operation of a platform motor associated with the platform unit that operates a platform gear that is engageable with a rack gear of the tray motor unit.

In some or all embodiments, the at least one processing unit can be caused to control the travel motor, the tray motor and the platform motor in part by any one of or any combination of weight data provided by a weight sensor associated with the platform unit, thickness data provided by a range finder sensor system, horizontal position data provided by a horizontal position sensor, and vertical position data provided by a vertical position sensor.

In some or all embodiments, the at least one processing unit can be caused to control a sauce motor based on any one of or any combination of weight data provided by a weight sensor associated with the platform unit, thickness data provided by a range finder sensor system, horizontal position data provided by a horizontal position sensor, and vertical position data provided by a vertical position sensor. The sauce motor can be operatively associated with a sauce pump configured to pump the sauce from the sauce container.

In some or all embodiments, the at least one processing unit can be caused to control a pivoting of the sauce spreader based on any one of or any combination of weight data provided by a weight sensor associated with the platform unit, thickness data provided by a range finder sensor system, horizontal position data provided by a horizontal position sensor, and vertical position data provided by a vertical position sensor to control the contact of the spreader pad with the pizza crust or an amount of the sauce is spread by the spreader pad.

According to some aspects of the present technology, a platform moving assembly for a food dispenser is provided.

The platform moving assembly can comprise a moveable support for supporting a pizza crust, a range finder sensor system configured to scan a pizza crust to provide thickness data associated with the pizza crust and any ingredients disposed thereon; and a weight sensor configured to provide weight data associated with the pizza crust and any ingredients thereon.

In some embodiments, the range finder sensor system comprises a time-of-flight sensor or other type of range finder sensor system.

In some embodiments, the movable support can further comprise an elevator system configured to move the pizza crust in a vertical direction.

In some embodiments, the moveable support further comprises a rotator mechanism configured to rotate the pizza crust.

In some embodiments, the platform moving assembly further comprises a computer system including at least one processing unit operably connected or connectable to the range finder sensor system and/or the weight sensor, the elevator system and the rotator mechanism.

In some embodiments, the platform moving assembly further comprises at least one processing unit is configured to control any one or combination of the elevator system and rotator mechanism according to the thickness data and/or the weight data.

In some embodiments, the moveable support can comprise a platform unit configured to move in a horizontal direction along at least one travel track; a travel motor configured to impart movement of the platform unit in the horizontal direction; and a tray motor unit slidably mounted to the platform unit and configured to move in a vertical direction in relation to the platform unit, the tray motor unit including a tray motor configured to rotate a tray support platform that is configured to support the pizza crust.

In some embodiments, the platform unit includes a platform motor and platform gear, with the platform gear being configured to engage with a rack gear of the tray motor unit to move the tray motor unit in the vertical direction.

In some embodiments, the computer system includes at least one processing unit is operably connected or connectable to the tray motor, the travel motor, the platform motor, a horizontal position sensor and a vertical position sensor.

In some embodiments, the at least one processing unit is configured to control any one of or any combination of the tray motor, the travel motor, the platform motor based on any one of or any combination of the weight data, the thickness data, horizontal position data provided by the horizontal position sensor, and vertical position data provided by the vertical position sensor.

In some embodiments, the platform moving assembly includes a computer system including at least one processing unit operably connected or connectable to the platform moving assembly, the range finder sensor system and/or the weight sensor. The at least one processing unit can be configured to control any one or combination of the platform moving assembly, the sauce spreader pad position and the sauce pump according to the thickness data and/or the weight data.

According to another aspect, the present technology can include a cheese dispenser system that can include a cheese dispenser assembly. The cheese dispenser assembly can include a cheese container, a mixer, an auger, and a cheese spreader. The cheese container can be configured to store a cheese therein. The mixer can be rotatably located within the cheese container. The auger can be rotatably located in an auger cavity of the cheese container, and an auger motor can be configured to rotate the auger. The auger cavity can be in open communication with an interior of the cheese container to receive the cheese from the cheese container. The auger can be configured to transfer the cheese out from the cheese container. The cheese spreader can be attachable to the cheese container and configured to receive the cheese from the auger and dispense the cheese on to the pizza crust.

In some embodiments, the cheese dispenser further comprises a high torque motorized gearbox operably coupled to the mixer and a high torque gearbox operably connected to the augur motor of the auger.

In some or all embodiments, the cheese spreader can be an elongated tubular member defining a longitudinally defined internal bore and an angled lip extending into the internal bore.

The angled lip is configured to decrease a size of the internal bore.

In some or all embodiments, the cheese spreader can include a tail extending from the angled lip.

In some embodiments, the mixer comprises one or more paddles rotably located in the container and a mixer motor configured to rotate the paddles.

In some embodiments, the cheese dispenser further comprises a platform moving assembly configured to support a pizza crust. The platform moving assembly can further comprise a weight sensor configured to provide weight data associated with the pizza crust and any ingredients thereon.

In some embodiments, the cheese dispenser can comprise a computer system including at least one processing unit operably connected or connectable to the platform moving assembly and the weight sensor.

In some embodiments, the ratably at least one processing unit can be configured to control any one or combination of the platform moving assembly, the cheese spreader position, the augur motor according to the weight data.

In some or all embodiments, the cheese dispenser assembly can include a mixer motor configured to rotate the paddles.

Some or all embodiments of the present technology can include a platform moving assembly that can include a platform unit, a travel motor and a tray motor unit. The platform unit can be configured to move in a horizontal direction along a pair of travel tracks. The travel motor can be configured to impart movement of the platform unit in the horizontal direction. The tray motor unit can be slidably mounted to the platform unit and configured to move in a vertical direction in relation to the platform unit. The tray motor unit can include a tray motor configured to rotate a tray support platform that is configured to support the pizza crust.

In some or all embodiments, the platform unit includes a platform motor and platform gear. The platform gear can be configured to engage with a rack gear of the tray motor unit to move the tray motor unit in the vertical direction.

Some or all embodiments of the present technology can include a time-of-flight sensor can be configured to scan the pizza crust to provide thickness data associated with the pizza crust. The tray motor unit can include a weight sensor configured to provide weight data associated with the pizza crust acting on the tray motor.

Some or all embodiments of the present technology can include a computer system including at least one processing unit operably connected or connectable to the tray motor, the travel motor, the platform motor, a horizontal position sensor and a vertical position sensor each associated with the platform unit, the auger motor, the weight sensor and the time-of-flight sensor.

In some or all embodiments, the at least one processing unit can be configured to control any one of or any combination of the tray motor, the travel motor, the platform motor, and the auger motor based on any one of or any combination of the weight data, the thickness data, horizontal position data provided by the horizontal position sensor, and vertical position data provided by the vertical position sensor.

According to yet another aspect, the present technology can include a method of operating a cheese dispenser system. The method can include a step of moving a platform unit that is supporting a pizza crust thereon to a position below a cheese dispenser assembly. The method can include a rotating the pizza crust while below the cheese dispenser assembly. The method can include a moving the platform unit in a vertical direction toward the cheese dispenser assembly. The method can include a dispensing cheese from a cheese container of the cheese dispenser assembly to a cheese spreader. The method can include a dispensing the cheese from the cheese spreader so as to be spread on the pizza crust by the cheese spreader.

In some embodiments, the method further comprises the step of controlling any one or combination of the platform unit movement, the relative position between the pizza crust and the cheese spreader, and the augur according to any one of or any combination of weight data provided by a weight sensor associated with platform unit, and thickness data provided from a ranger finder sensor system.

In some or all embodiments, the moving of the platform unit can be accomplished by operating a travel motor that is configured to move the platform unit in the horizontal direction along a pair of travel tracks. In some or all embodiments, the rotation of the pizza crust can be accomplished by operating a tray motor associated with a tray motor unit, the tray motor being configured to support the pizza crust. In some or all embodiments, the moving of the platform unit in the vertical direction can be accomplished by operating a platform motor associated with the platform unit that operates a platform gear that is engageable with a rack gear of the tray motor unit.

Some or all embodiments of the present technology can include a step of controlling the travel motor, the tray motor and the platform motor in part by any one of or any combination of weight data provided by a weight sensor associated with the tray motor unit, and thickness data associated with the pizza crust provided by a time-of-flight sensor.

Some or all embodiments of the present technology can include a step of controlling the travel motor to move the platform unit in the horizontal direction based on any one of or any combination of the weight data, the thickness data, horizontal position data provided by a horizontal position sensor associated with the platform unit, and vertical position data provided by a vertical position sensor associated with the platform unit. Some or all embodiments of the present technology can include a step of controlling the tray motor based on any one of or any combination of the weight data, the thickness data, the horizontal position data, and the vertical position data. Some or all embodiments of the present technology can include a step of control the platform motor based on any one of or any combination of the weight data, the thickness data, the horizontal position data, and the vertical position data.

Some or all embodiments of the present technology can include a step of controlling an amount of the cheese dispensed on to the pizza crust by controlling an auger motor based on any one of or any combination of the weight data, the thickness data, horizontal position data provided by a horizontal position sensor associated with the platform unit, and vertical position data provided by a vertical position sensor associated with the platform unit.

In some or all embodiments, the cheese spreader is an elongated tubular member defining a longitudinally defined internal bore and an angled lip extending into the internal bore. The angled lip is configured to decrease a size of the internal bore.

In some or all embodiments, the cheese spreader can include a tail extending from the angled lip.

According to still yet another aspect, the present technology can include a computer method for operating a cheese dispenser system. The computer method can include a step of receiving, by a computer system including at least one processing unit, pizza parameters associated with a pizza order. The computer method can include a step of causing, by the computer system, movement of a platform unit that is supporting a pizza crust thereon in any one of or any combination of a horizontal direction and vertical direction. The computer method can include a step of causing, by the computer system, rotation of the pizza crust. The computer method can include a step of causing, by the computer system and based on the pizza parameters, cheese to be transferred from a cheese container of a cheese dispenser assembly to a cheese spreader configured to dispense the cheese on to the pizza crust while the pizza crust is rotating. In some embodiments, the computer method can include a step of determining, by the computer system, thickness data associated with the pizza crust utilizing a time-of-flight sensor. The computer method can include a step of determining, by the computer system, weight data associated with the pizza crust utilizing a weight sensor associated with the platform unit.

Some or all embodiments of the present technology can include a step of controlling, by the computer system, the movement of the platform unit in the horizontal direction so that the sauce is dispensed evenly over the pizza crust.

Some or all embodiments of the present technology can include a step of controlling, by the computer system, the movement of the platform unit in any one of or any combination of the horizontal direction and the vertical direction based on any one of or any combination of weight data provided by a weight sensor associated with the platform unit, thickness data provided by a range finder sensor system, horizontal position data provided by a horizontal position sensor, and vertical position data provided by a vertical position sensor.

In some or all embodiments, the moving of the platform unit in the horizontal direction can be accomplished by controlling, by the computer system, an operation a travel motor that is configured to move the platform unit along a pair of travel tracks. The rotation of the pizza crust can be accomplished by controlling, by the computer system, an operation of a tray motor associated with a tray motor unit, the tray motor being configured to support the pizza crust. The moving of the platform unit in the vertical direction can be accomplished by controlling, by the computer system, an operation of a platform motor associated with the platform unit that operates a platform gear that is engageable with a rack gear of the tray motor unit.

Some or all embodiments of the present technology can include a step of controlling, by the computer system, the travel motor, the tray motor and the platform motor in part by any one of or any combination of the weight data, the thickness data, the horizontal position data, and the vertical position data.

Some or all embodiments of the present technology can include a step of controlling, by the computer system, an auger motor based on any one of or any combination of the weight data, the thickness data, the horizontal position data, and the vertical position data, wherein the auger motor is operatively associated with an auger configured to transfer the cheese from the cheese container to the cheese spreader.

According to yet still another aspect, the present technology can include a non-transitory computer readable medium with an executable program stored thereon comprising instructions for execution by at least one processing unit for operating a cheese dispenser system. The instructions when executed by the at least one processing unit can cause the at least one processing unit to receive pizza parameters associated with a pizza order. The instructions can cause the at least one processing unit to cause movement of a platform unit that is supporting a pizza crust thereon in any one of or any combination of a horizontal direction and a vertical direction. The instructions can cause the at least one processing unit to cause rotation of the pizza crust. The instructions can cause the at least one processing unit to cause cheese to be transferred from a cheese container of a cheese dispenser assembly to a cheese spreader configured to dispense the cheese on the pizza crust while the pizza crust is rotating. In some embodiments, the instructions can cause the at least one processing unit to determine thickness data associated with the pizza crust utilizing a time-of-flight sensor. The instructions can cause the at least one processing unit to determine weight data associated with the pizza crust utilizing a weight sensor associated with the platform unit.

In some or all embodiments, the at least one processing unit can be caused to control the movement of the platform unit in the horizontal direction so that the cheese is dispensed evenly over the pizza crust.

In some or all embodiments, the at least one processing unit can be caused to control the movement of the platform unit in any one of or any combination of the horizontal direction and the vertical direction based on any one of or any combination of weight data provided by a weight sensor associated with the platform unit, thickness data provided by a range finder sensor system, horizontal position data provided by a horizontal position sensor, and vertical position data provided by a vertical position sensor.

In some or all embodiments, the moving of the platform unit in the horizontal direction can be accomplished by controlling an operation a travel motor that is configured to move the platform unit along a pair of travel tracks. In some or all embodiments, the rotation of the pizza crust can be accomplished by controlling an operation of a tray motor associated with a tray motor unit, the tray motor being configured to support the pizza crust. In some or all embodiments, the moving of the platform unit in the vertical direction can be accomplished by controlling an operation of a platform motor associated with the platform unit that operates a platform gear that is engageable with a rack gear of the tray motor unit.

In some or all embodiments, the at least one processing unit can be caused to control the travel motor, the tray motor and the platform motor in part by any one of or any combination of the weight data, the thickness data, the horizontal position data, and the vertical position data.

In some or all embodiments, the at least one processing unit can be caused to control an auger motor based on any one of or any combination of the weight data, the thickness data, the horizontal position data, and the vertical position data, wherein the auger motor is operatively associated with an auger configured to transfer the cheese from the cheese container to the cheese spreader.

According to another aspect, the present technology can include a slicer system including a slicer assembly. The slicer assembly can include a rotatable food revolver including multiple radially arranged food tubes, wherein each of the food tubes being configured to slidably receive a food item. The slicer assembly can include a rotatable disc blade configured to receive the food item from the food tubes when the food tubes are rotated in a position above the disc blade. The disc blade being configured to cut the food item from the food tubes to form sliced food items. The slicer assembly can include a slicer spreader configured to dispense the sliced food items on to the pizza crust.

Some or all embodiments of the present technology can include a revolver motor configured to rotate the food revolver, and a disc motor configured to rotate the disc blade.

In some or all embodiments, the food tubes can include a weight slidably received therein. The weight being configured to contact the food item in the food tubes and press the food item toward the disc blade.

In some or all embodiments, the slicer spreader can include a longitudinally defined slicer bore configured to allow the sliced food items to pass therethrough and on to the pizza crust.

In some or all embodiments, the slicer bore further can include multiple slots defined into the slicer spreader in communication with the slicer bore. The slots can run along a longitudinal length of the slicer bore.

In some or all embodiments, the slicer bore can be defined by at least a first side and a second side opposite the first side. The second side can be angled in a converging direction in relation with the first side toward a discharge end of the slicer spreader.

In some or all embodiments, the slicer spreader can include an angled notch defined in the first side and in communication with the slicer bore. The angled notch can be configured to form a pivot point for the sliced food items passing through the slicer bore.

Some or all embodiments of the present technology can include a vibration device configured to provide a vibrational force to the slicer spreader.

In some or all embodiments, the slicer assembly can include a servo motor and gear system configured to adjust a distance of the disc blade to the food item to be sliced.

Some or all embodiments of the present technology can include a platform moving assembly. The platform moving assembly can include a platform unit configured to move in a horizontal direction along a pair of travel tracks. The platform moving assembly can include a travel motor configured to impart movement of the platform unit in the horizontal direction. The platform moving assembly can include a tray motor unit slidably mounted to the platform unit and configured to move in a vertical direction in relation to the platform unit. The tray motor unit can include a tray motor configured to rotate a tray support platform that is configured to support the pizza crust.

In some or all embodiments, the platform unit can include a platform motor and platform gear. The platform gear can be configured to engage with a rack gear of the tray motor unit to move the tray motor unit in the vertical direction.

Some or all embodiments of the present technology can include a computer system including at least one processing unit operably connected or connectable to the tray motor, the travel motor, the platform motor, a horizontal position sensor and a vertical position sensor each associated with the platform unit, the revolver motor, the disc motor, the servo motor, a weight sensor and a time-of-flight sensor.

In some or all embodiments, the at least one processing unit is configured to control any one of or any combination of the tray motor, the travel motor, the platform motor, the revolver motor, the disc motor and the servo motor based on any one of or any combination of weight data from the weight sensor, thickness data from the time-of-flight sensor, horizontal position data provided by the horizontal position sensor, and vertical position data provided by the vertical position sensor.

According to yet another aspect, the present technology can include a computer method for operating a slicer system. The computer method can include a step of receiving, by a computer system including at least one processing unit, pizza parameters associated with a pizza order. The computer method can include a step of causing, by the computer system, movement of a platform unit that is supporting a pizza crust thereon in any one of or any combination of a horizontal direction and a vertical direction. The computer method can include a step of causing, by the computer system, rotation of the pizza crust. The computer method can include a step of causing, by the computer system, a revolver and a disc blade to rotate so as to cut a food item from food tubes of the revolver to form sliced food items that are dispensed on to the pizza crust by way of a slicer spreader. In some embodiments, the computer method can include a step of determining, by the computer system, thickness data associated with the pizza crust utilizing a time-of-flight sensor. The computer method can include a step of determining, by the computer system, weight data associated with the pizza crust utilizing a weight sensor associated with the platform unit.

Some or all embodiments of the present technology can include a step of controlling, by the computer system, the movement of the platform unit in the horizontal direction so that the sauce is dispensed evenly over the pizza crust.

Some or all embodiments of the present technology can include a step of controlling, by the computer system, the movement of the platform unit in any one of or any combination of the horizontal direction and the vertical direction based on any one of or any combination of weight data provided by a weight sensor associated with the platform unit, thickness data provided by a range finder sensor system, horizontal position data provided by a horizontal position sensor, and vertical position data provided by a vertical position sensor.

In some or all embodiments, the moving of the platform unit in the horizontal direction can be accomplished by controlling, by the computer system, an operation a travel motor that is configured to move the platform unit along a pair of travel tracks. In some or all embodiments, the rotation of the pizza crust can be accomplished by controlling, by the computer system, an operation of a tray motor associated with a tray motor unit, the tray motor being configured to support the pizza crust. In some or all embodiments, the moving of the platform unit in the vertical direction can be accomplished by controlling, by the computer system, an operation of a platform motor associated with the platform unit that operates a platform gear that is engageable with a rack gear of the tray motor unit.

Some or all embodiments of the present technology can include a step of controlling, by the computer system, the travel motor, the tray motor and the platform motor in part by any one of or any combination of the weight data, the thickness data, the horizontal position data, and the vertical position data.

Some or all embodiments of the present technology can include a step of controlling, by the computer system, any one or any combination of a revolver motor and a disc motor based on any one of or any combination of the weight data, the thickness data, the horizontal position data, and the vertical position data. The revolver motor is operatively associated with the revolver and the disc motor is operatively associated with the disc blade.

Some or all embodiments of the present technology can include a step of controlling, by the computer system, a servo motor based on any one of or any combination of the weight data, the thickness data, the horizontal position data, and the vertical position data, wherein the servo motor is configured to adjust a distance of the disc blade to the food item to be sliced thereby determining a thickness of the sliced food items.

According to yet still another aspect, the present technology can include a non-transitory computer readable medium with an executable program stored thereon comprising instructions for execution by at least one processing unit for operating a slicer system. The instructions when executed by the at least one processing unit can cause the at least one processing unit to receive pizza parameters associated with a pizza order. The instructions can cause the at least one processing unit to cause movement of a platform unit that is supporting a pizza crust thereon in any one of or any combination of a horizontal direction and a vertical direction. The instructions can cause the at least one processing unit to cause rotation of the pizza crust. The instructions can cause the at least one processing unit to cause a revolver and a disc blade to rotate so as to cut a food item from food tubes of the revolver to form sliced food items that are dispensed on to the pizza crust by way of a slicer spreader. In some embodiments, the instructions can cause the at least one processing unit to determine thickness data associated with the pizza crust utilizing a time-of-flight sensor. The instructions can cause the at least one processing unit to determine weight data associated with the pizza crust utilizing a weight sensor associated with the platform unit.

In some or all embodiments, the instructions can cause the at least one processing unit to control the movement of the platform unit in the horizontal direction so that the cheese is dispensed evenly over the pizza crust.

In some or all embodiments, the instructions can cause the at least one processing unit to control the movement of the platform unit in any one of or any combination of the horizontal direction and the vertical direction based on any one of or any combination of weight data provided by a weight sensor associated with the platform unit, thickness data provided by a range finder sensor system, horizontal position data provided by a horizontal position sensor, and vertical position data provided by a vertical position sensor.

In some or all embodiments, the moving of the platform unit in the horizontal direction can be accomplished by controlling an operation a travel motor that is configured to move the platform unit along a pair of travel tracks. In some or all embodiments, the rotation of the pizza crust can be accomplished by controlling an operation of a tray motor associated with a tray motor unit, the tray motor being configured to support the pizza crust. In some or all embodiments, the moving of the platform unit in the vertical direction can be accomplished by controlling an operation of a platform motor associated with the platform unit that operates a platform gear that is engageable with a rack gear of the tray motor unit.

In some or all embodiments, the instructions can cause the at least one processing unit to control the travel motor, the tray motor and the platform motor in part by any one of or any combination of the weight data, the thickness data, the horizontal position data, and the vertical position data.

In some or all embodiments, the instructions can cause the at least one processing unit to control any one or any combination of a revolver motor and a disc motor based on any one of or any combination of the weight data, the thickness data, the horizontal position data, and the vertical position data, wherein the revolver motor is operatively associated with the revolver and the disc motor is operatively associated with the disc blade.

In some or all embodiments, the instructions can cause the at least one processing unit to control a servo motor based on any one of or any combination of the weight data, the thickness data, the horizontal position data, and the vertical position data. The servo motor can be configured to adjust a distance of the disc blade to the food item to be sliced thereby determining a thickness of the sliced food items.

According to one aspect, the present technology can include a compact automated pizza assembly machine including a chassis enclosure, a platform moving assembly, a sauce dispenser assembly, a cheese dispenser assembly and a slicer assembly. The chassis enclosure can define an opening configured to receive a pizza crust. The platform moving assembly can be configured to support the pizza crust, and can be configured to rotate the pizza crust within the chassis enclosure and move the pizza crust in a horizontal direction and a vertical direction within the chassis enclosure. The sauce dispenser assembly can be mountable within the chassis enclosure and can be configured to dispense a sauce on to the pizza crust. The cheese dispenser assembly can be mountable within the chassis enclosure and can be configured to dispense cheese on to the pizza crust. The slicer assembly can be mountable within the chassis enclosure and can be configured to cut a food item to form sliced food items and dispense the sliced food items on to the pizza crust.

Some or all embodiments of the present technology can include a support frame mountable to frame members of the chassis enclosure and configured to support the sauce dispenser assembly at a first location on the support frame above the platform moving assembly, to support the cheese dispenser assembly at a second location on the support frame above the platform moving assembly, and to support the slicer assembly at a third location on the support frame above the platform moving assembly.

In some or all embodiments, the platform moving assembly can further include a platform unit that can be configured to move in the horizontal direction along a pair of travel tracks. The platform moving assembly can further include a travel motor that can be configured to impart movement of the platform unit in the horizontal direction. The platform moving assembly can further include a tray motor unit slidably that can be mounted to the platform unit and can be configured to move in the vertical direction in relation to the platform unit. The tray motor unit can include a tray motor configured to rotate a tray support platform that is configured to support the pizza crust.

In some or all embodiments, the tray motor unit cab further include a weight sensor configured to provide weight data associated with the pizza crust acting on the tray motor.

In some or all embodiments, the platform unit can include a platform motor and platform gear. The platform gear can be configured to engage with a rack gear of the tray motor unit to move the tray motor unit in the vertical direction.

In some or all embodiments, the sauce dispenser assembly can further include a sauce container configured to store the sauce therein. The sauce dispenser assembly can further include a sauce pump unit configured to receive and pump the sauce from the sauce container to a discharge tube. sauce dispenser assembly can further include a sauce spreader configured to spread the sauce dispensed from the discharge tube on to the pizza crust.

In some or all embodiments, the sauce pump unit can include a sauce motor operatively coupled to a pair of counter rotating impellers.

In some or all embodiments, the sauce spreader can include a discharge tube opening configured to receive therethrough an end of the discharge tube, and a spreader pad adjacent the discharge tube opening. The spreader pad can be positionable downstream of the discharge tube opening so that the sauce dispensed from the discharge tube is spread out by the spreader pad in relation to a rotational direction of the pizza crust.

In some or all embodiments, the sauce spreader can be pivotable so that the spreader pad is contactable with the pizza crust.

In some or all embodiments, the cheese dispenser assembly can further include a cheese container configured to store cheese therein. The cheese dispenser assembly can further include one or more paddles rotatably located within the cheese container, and a mixer motor configured to rotate the paddles. The cheese dispenser assembly can further include an auger rotatably located in an auger cavity of the cheese container, and an auger motor configured to rotate the auger. The auger cavity can be in open communication with an interior of the cheese container to receive the cheese from the cheese container. The auger can be configured to transfer the cheese out from the cheese container. The cheese dispenser assembly can further include a cheese spreader attachable to the cheese container and configured to receive the cheese from the auger and dispense the cheese on to the pizza crust.

In some or all embodiments, the cheese spreader can be an elongated tubular member defining a longitudinally defined internal bore and an angled lip extending into the internal bore. The angled lip can be configured to decrease a size of the internal bore.

In some or all embodiments, the cheese spreader can include a tail extending from the angled lip.

In some or all embodiments, the slicer assembly can further include a food revolver rotatably mounted to a support frame, and a revolver motor configured to rotate the food revolver. The food revolver can include multiple radially arranged food tubes. Each of the food tubes can be configured to slidably receive the food item. The slicer assembly can further include a disc blade rotatably mounted to the support frame, and a disc motor configured to rotate the disc blade. The disc blade can be configured to receive the food item from the food tubes when the food tubes are rotated in a position above the disc blade. The disc blade can be configured to cut at least the food item from the food tubes to form the sliced food items. The slicer assembly can further include a slicer spreader mountable to the support frame to receive the sliced food items from the disc blade. The slicer spreader can include a longitudinally defined slicer bore configured to allow the sliced food items to pass therethrough and on to the pizza crust.

In some or all embodiments, each of the food tubes can include a weight slidably received therein. The weight can be configured to contact the food item in the food tubes and press the food item toward the support frame or the disc blade.

In some or all embodiments, the slicer bore can include multiple slots defined into the slicer spreader in communication with the slicer bore. The slots can run along a longitudinal length of the slicer bore.

In some or all embodiments, the slicer bore can be defined by at least a first side and a second side opposite the first side. The second side can be angled in a converging direction in relation with the first side toward a discharge end of the slicer spreader.

In some or all embodiments, the slicer spreader can include an angled notch defined in the first side and in communication with the slicer bore. The angled notch can be configured to form a pivot point for the sliced food items passing through the slicer bore.

Some or all embodiments of the present technology can include a vibration device configured to provide a vibrational force to the slicer spreader.

In some or all embodiments, the slicer assembly further comprising a servo motor and gear system configured to adjust a distance of the disc blade to the food item to be sliced.

Some or all embodiments of the present technology can include a cooling unit mountable within the chassis enclosure and configured to provide cooled air within the chassis enclosure.

Some or all embodiments of the present technology can include a time-of-flight sensor mountable within the chassis enclosure and configured to scan the pizza crust and provide thickness data associated with the pizza crust.

Some or all embodiments of the present technology can include a computer system including at least one processing unit operably connected or connectable to the platform moving assembly, the sauce dispenser assembly, the cheese dispenser assembly, the slicer assembly, a weight sensor and a time-of-flight sensor.

In some or all embodiments, the at least one processing unit can be configured to receive any one or any combination of weight data from the weight sensor associated with a tray motor unit of the platform moving assembly, and calculate a weight value of at least the pizza crust, and thickness data from the time-of-flight sensor located in the chassis enclosure, calculate an average thickness of at least the pizza crust. The at least one processing unit can be configured to control a travel motor of the platform moving assembly to move a platform unit of the platform assembly in the horizontal direction. The travel motor can be included with the platform moving assembly. The at least one processing unit can be configured to control a tray motor configured to rotate a tray support platform that is configured to support the pizza crust. The tray motor being included with the tray motor unit that is included with the platform moving assembly. The at least one processing unit can be configured to control a platform motor configured to rotate a platform gear that is engageable with a rack gear of the tray motor unit to move the tray motor unit in the vertical direction. The at least one processing unit can be configured to control a sauce motor of a sauce pump unit of the sauce dispenser assembly to receive and pump the sauce from a sauce container of the sauce dispenser assembly to a discharge tube configured to dispense the sauce on to the pizza crust. The at least one processing unit can be configured to control an auger motor operatively engaged with an auger of the cheese dispenser assembly to transfer the cheese from a cheese container to a cheese spreader configured to dispense the cheese on to the pizza crust. The at least one processing unit can be configured to control a mixer motor operatively engaged with mixer paddles of the cheese dispenser assembly to mix the cheese in the cheese container. The at least one processing unit can be configured to control a revolver motor operatively engaged with a revolver of the slicer assembly to rotate the revolver, the food item being stored in the revolver. The at least one processing unit can be configured to control a disc motor operatively engaged with a disc blade of the slicer assembly to cut the food item from the revolver.

According to another aspect, the present technology can include a method of operating a compact pizza assembly machine. The method can include moving a platform unit that is supporting a pizza crust thereon in a horizontal direction within a chassis enclosure. The platform unit can be included with a platform moving assembly mountable within the chassis enclosure. Rotating the pizza crust within the chassis enclosure. Determining if a sauce is to be dispensed on to the pizza crust and if so then moving the platform unit in a vertical direction with the chassis enclosure so that a sauce from a sauce dispenser assembly is dispensed on to the pizza rotate while rotating. Determining if cheese is to be dispensed on to the pizza crust and if so then dispensing cheese from a cheese dispenser assembly on to the rotating pizza crust. Determining if a food item is to be dispensed on to the pizza crust and if so then slicing the food item in a slicer assembly to form a sliced food item and dispensing the sliced food item on to the rotating pizza crust.

Some or all embodiments of the present technology can include a support frame mountable to frame members of the chassis enclosure and configured to support the sauce dispenser assembly at a first location on the support frame above the platform moving assembly, to support the cheese dispenser assembly at a second location on the support frame above the platform moving assembly, and to support the slicer assembly at a third location on the support frame above the platform moving assembly.

In some or all embodiments, the moving of the platform unit in the horizontal direction can be accomplished by operating a travel motor that is configured to move the platform unit along a pair of travel tracks. The rotation of the pizza crust can be accomplished by operating a tray motor associated with a tray motor unit, the tray motor being configured to support the pizza crust. The moving of the platform unit in the vertical direction can be accomplished by operating a platform motor associated with the platform unit that operates a platform gear that is engageable with a rack gear of the tray motor unit.

Some or all embodiments of the present technology can include a step of controlling the travel motor, the tray motor and the platform motor in part by any one of or any combination of weight data provided by a weight sensor associated with the tray motor unit, and thickness data associated with the pizza crust provided by a time-of-flight sensor.

In some or all embodiments, the sauce can be dispensed on to the pizza crust by pumping the sauce from a sauce container utilizing a sauce pump unit through a discharge tube and spreading the sauce from the discharge tube on to the pizza crust utilizing a sauce spreader that is in part in contact with the pizza crust.

Some or all embodiments of the present technology can include a step of controlling an amount of the sauce dispensed on to the pizza crust by controlling a sauce pump operatively associated with the sauce pump unit based on any one of or any combination of the weight data and the thickness data.

In some or all embodiments, the cheese is dispensed on to the pizza crust by operating an auger to transfer the cheese from a cheese container to a cheese spreader configured to dispense the cheese on to the pizza crust.

Some or all embodiments of the present technology can include a step of controlling an amount of the cheese dispensed on to the pizza crust by controlling an auger motor operatively associated with the auger based in part on any one of or any combination of the weight data and the thickness data.

In some or all embodiments, the food item can be dispensed on to the pizza crust by operating a revolver configured to store the food item and a disc blade configured to cut the food item to form the sliced food item. The sliced food item can pass through a slicer spreader configured to dispense the sliced food item on to the pizza crust.

Some or all embodiments of the present technology can include a step of controlling an amount of the sliced food item dispensed on to the pizza crust by controlling at least a disc motor operatively associated with the disc blade based in part on any one of or any combination of the weight data and the thickness data.

Some or all embodiments of the present technology can include a step of controlling a thickness of the sliced food item by controlling a servo motor of the slicer assembly that is configured to adjust a distance of the disc blade to the food item to be sliced.

Some or all embodiments of the present technology can include a step of controlling the movement of the platform unit in any one of or any combination of the horizontal direction and the vertical direction, based on any one of or any combination of the weight data and the thickness data, so that any one of or any combination of the sauce, the cheese and the sliced food items is dispensed evenly over the pizza crust.

According to yet another aspect, the present technology can include a computer method for operating a compact pizza assembly machine. The computer method can include the step of receiving, by a computer system including at least one processing unit, pizza parameters associated with a pizza order. The computer method can include the step of causing, by the computer system, movement of a platform unit that is supporting a pizza crust thereon in a horizontal direction within a chassis enclosure. The platform unit can be included with a platform moving assembly mountable within the chassis enclosure. The computer method can include the step of causing, by the computer system, rotation of the pizza crust within the chassis enclosure. The computer method can include the step of causing, by the computer system, movement of the platform unit in a vertical direction with the chassis enclosure. The computer method can include the step of causing, by the computer system and based on the pizza parameters, any one of or any combination of a sauce dispenser assembly to dispense a sauce on the pizza crust, a cheese dispenser assembly to dispense cheese on the pizza crust, and a slicer assembly to cut a food item to for sliced food items and dispense the sliced food items on the pizza crust. In some embodiments, the computer method can include the step of determining, by the computer system, thickness data associated with the pizza crust utilizing a time-of-flight sensor. The computer method can include the step of determining, by the computer system, weight data associated with the pizza crust utilizing a weight sensor associated with the platform unit.

Some or all embodiments of the present technology can include a step of controlling, by the computer system, the movement of the platform unit in the horizontal direction so that any one of or any combination of the sauce, the cheese and the sliced food items is dispensed evenly over the pizza crust.

Some or all embodiments of the present technology can include a step of controlling, by the computer system and based on any one of or any combination of weight data provided by a weight sensor associated with the platform unit, thickness data provided by a range finder sensor system, the movement of the platform unit in any one of or any combination of the horizontal direction and the vertical direction based on any one of or any combination of the weight data, the thickness data, horizontal position data provided by a horizontal position sensor, and vertical position data provided by a vertical position sensor so that any one of or any combination of the sauce, the cheese and the sliced food items is dispensed evenly over the pizza crust.

Some or all embodiments of the present technology can include a support frame mountable to frame members of the chassis enclosure and configured to support the sauce dispenser assembly at a first location on the support frame above the platform moving assembly, to support the cheese dispenser assembly at a second location on the support frame above the platform moving assembly, and to support the slicer assembly at a third location on the support frame above the platform moving assembly.

In some or all embodiments, the moving of the platform unit in the horizontal direction can be accomplished by controlling, by the computer system, an operation a travel motor that is configured to move the platform unit along a pair of travel tracks. The rotation of the pizza crust can be accomplished by controlling, by the computer system, an operation of a tray motor associated with a tray motor unit, the tray motor being configured to support the pizza crust. The moving of the platform unit in the vertical direction can be accomplished by controlling, by the computer system, an operation of a platform motor associated with the platform unit that operates a platform gear that is engageable with a rack gear of the tray motor unit.

Some or all embodiments of the present technology can include a step of controlling, by the computer system, the travel motor, the tray motor and the platform motor in part by any one of or any combination of weight data provided by a weight sensor associated with the platform unit, thickness data provided by a range finder sensor system.

Some or all embodiments of the present technology can include a step of controlling, by the computer system, a sauce motor operatively associated with a sauce pump configured to dispense the sauce on to the pizza crust by pumping the sauce from a sauce container through a discharge tube and spreading the sauce from the discharge tube on to the pizza crust utilizing a sauce spreader that is in part in contact with the pizza crust.

Some or all embodiments of the present technology can include a step of controlling, by the computer system, the sauce motor in part by any one of or any combination of weight data provided by a weight sensor associated with the platform unit, thickness data provided by a range finder sensor system.

Some or all embodiments of the present technology can include a step of controlling, by the computer system, an auger motor operatively associated with an auger configured to dispense the cheese on to the pizza crust by transferring the cheese from a cheese container utilizing the auger to a cheese spreader configured to dispense the cheese on to the pizza crust.

Some or all embodiments of the present technology can include a step of controlling, by the computer system, the auger motor in part by any one of or any combination of weight data provided by a weight sensor associated with the platform unit, thickness data provided by a range finder sensor system.

Some or all embodiments of the present technology can include a step of controlling, by the computer system, a disc motor operatively associated with a disc blade configured to cut the food item to form the sliced food items. The sliced food items can pass through a slicer spreader configured to dispense the sliced food items on to the pizza crust.

Some or all embodiments of the present technology can include a step of controlling, by the computer system, the disc motor in part by any one of or any combination of weight data provided by a weight sensor associated with the platform unit, thickness data provided by a range finder sensor system.

Some or all embodiments of the present technology can include a step of controlling, by the computer system, a revolver motor operatively associated with a revolver configured to store the food item and provide the food item to the disc blade to be cut.

Some or all embodiments of the present technology can include a step of controlling a thickness of the sliced food items by controlling a servo motor of the slicer assembly that is configured to adjust a distance of the disc blade to the food item to be sliced.

According to still another aspect, the present technology can include a non-transitory computer readable medium with an executable program stored thereon comprising instructions for execution by at least one processing unit for operating a compact pizza assembly machine, such that the instructions when executed by the at least one processing unit can cause the at least one processing unit to receive pizza parameters associated with a pizza order. The at least one processing unit can be caused to cause movement of a platform unit that is supporting a pizza crust thereon in a horizontal direction within a chassis enclosure. The platform unit can be included with a platform moving assembly mountable within the chassis enclosure. The at least one processing unit can be caused to cause rotation of the pizza crust within the chassis enclosure. The at least one processing unit can be caused to cause movement of the platform unit in a vertical direction with the chassis enclosure. The at least one processing unit can be caused to cause, based on the pizza parameters, any one of or any combination of a sauce dispenser assembly to dispense a sauce on the pizza crust, a cheese dispenser assembly to dispense cheese on the pizza crust, and a slicer assembly to cut a food item to form sliced food items and dispense the sliced food items on the pizza crust. In some embodiments, the at least one processing unit can be caused to determine thickness data of the pizza crust utilizing a time-of-flight sensor. The at least one processing unit can be caused to determine weight data of the pizza crust utilizing a weight sensor associated with the platform unit.

In some or all embodiments, the at least one processing unit can be caused to control the movement of the platform unit in the horizontal direction so that any one of or any combination of the sauce, the cheese and the sliced food items can be dispensed evenly over the pizza crust.

In some or all embodiments, the at least one processing unit can be caused to, based on any one of or any combination of weight data provided by a weight sensor associated with the platform unit, thickness data provided by a range finder sensor system, control the movement of the platform unit in any one of or any combination of the horizontal direction and the vertical direction so that any one of or any combination of the sauce, the cheese and the sliced food items can be dispensed evenly over the pizza crust.

Some or all embodiments of the present technology can include a support frame mountable to frame members of the chassis enclosure and configured to support the sauce dispenser assembly at a first location on the support frame above the platform moving assembly, to support the cheese dispenser assembly at a second location on the support frame above the platform moving assembly, and to support the slicer assembly at a third location on the support frame above the platform moving assembly.

In some or all embodiments, the movement of the platform unit in the horizontal direction can be accomplished by controlling an operation a travel motor that is configured to move the platform unit along a pair of travel tracks. The rotation of the pizza crust can be accomplished by controlling an operation of a tray motor associated with a tray motor unit, the tray motor being configured to support the pizza crust. The movement of the platform unit in the vertical direction can be accomplished by controlling an operation of a platform motor associated with the platform unit that operates a platform gear that is engageable with a rack gear of the tray motor unit.

In some or all embodiments, the at least one processing unit can be caused to control the travel motor, the tray motor and the platform motor in part by any one of or any combination of weight data provided by a weight sensor associated with the platform unit, thickness data provided by a range finder sensor system.

In some or all embodiments, the at least one processing unit can be caused to control a sauce motor operatively associated with a sauce pump configured to dispense the sauce on to the pizza crust by pumping the sauce from a sauce container through a discharge tube and spreading the sauce from the discharge tube on to the pizza crust utilizing a sauce spreader that is in part in contact with the pizza crust.

In some or all embodiments, the at least one processing unit can be caused to control the sauce motor in part by any one of or any combination of weight data provided by a weight sensor associated with the platform unit, thickness data provided by a range finder sensor system.

In some or all embodiments, the at least one processing unit can be caused to control an auger motor operatively associated with an auger configured to dispense the cheese on to the pizza crust by transferring the cheese from a cheese container utilizing the auger to a cheese spreader configured to dispense the cheese on to the pizza crust.

In some or all embodiments, the at least one processing unit can be caused to control the auger motor in part by any one of or any combination of weight data provided by a weight sensor associated with the platform unit, thickness data provided by a range finder sensor system.

In some or all embodiments, the at least one processing unit can be caused to control a disc motor operatively associated with a disc blade configured to cut the food item to form the sliced food items, wherein the sliced food items pass through a slicer spreader configured to dispense the sliced food items on to the pizza crust.

In some or all embodiments, the at least one processing unit can be caused to control the disc motor in part by any one of or any combination of weight data provided by a weight sensor associated with the platform unit, thickness data provided by a range finder sensor system.

In some or all embodiments, the at least one processing unit can be caused to control a revolver motor operatively associated with a revolver configured to store the food item and provide the food item to the disc blade to be cut.

In some or all embodiments, the at least one processing unit can be caused to control a thickness of the sliced food items by controlling a servo motor of the slicer assembly that is configured to adjust a distance of the disc blade to the food item to be sliced.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of one or more of the embodiments of present technology to provide a new and novel automated food article making system and method that has all of the advantages of the prior art automated pizza system and none of the disadvantages.

It is another object of one or more of the embodiments of the present technology to provide a new and novel automated food article making system and method that may be easily and efficiently manufactured and marketed.

An even further object of one or more of the embodiments of the present technology is to provide a new and novel automated food article making system and method that has a low cost of manufacture with regard to both materials and labor, and which accordingly is then susceptible of low prices of sale to the consuming public, thereby making such automated food article making system and method economically available to the buying public.

Still another object of embodiments one or more of the embodiments of the present technology is to provide a new automated food article making system and method that provides in the apparatuses and methods of the prior art some of the advantages thereof, while simultaneously overcoming some of the disadvantages normally associated therewith.

These together with other objects of embodiments one or more of the embodiments of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein with the phantom lines depicting environmental structure and cross-sectioned material depicted with solid light grey shading or cross-hatching line patterns.

The same reference numerals refer to the same parts throughout the various figures.

DETAILED DESCRIPTION OF THE EMBODIMENTS

Figure 1:
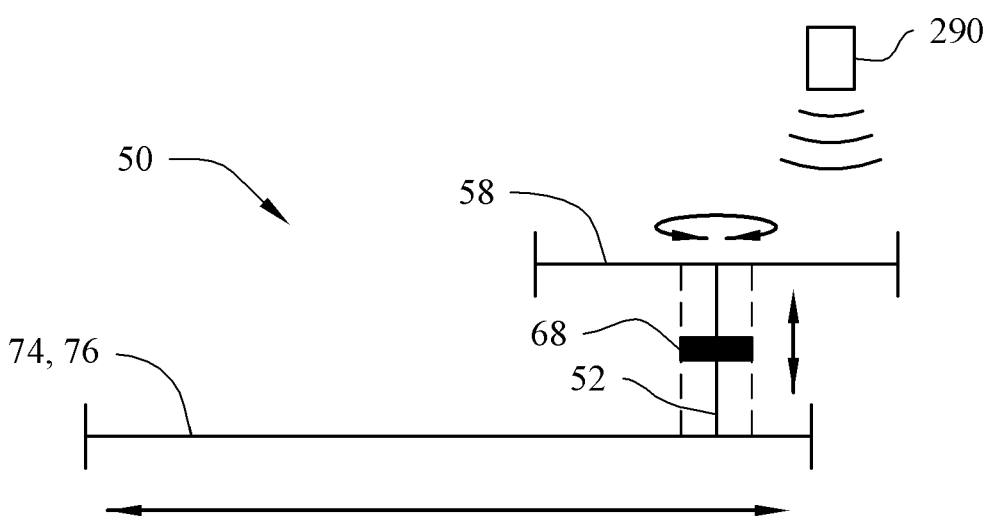
FIG. 1 is a general diagram illustrating the concept of the platform moving assembly system according to one aspect of the present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

As identified herein before, there is a group of patents with the invention of the pizza vending machine (U.S. Pat. No. 8,710,408B2, WO2017101015A1). However, the design of all these machines doesn't allow to cook restaurant quality pizza because of limited ingredients, frozen dough and a number of other quality constraints related to the vending format.

The disadvantages of existing technology include manual food assembly and processing, which results in mistakes in orders due to the human factor; Unreliable quality due to the variation of process as a result of human factor; low economic efficiency due to extremely high labor costs and labor-related costs;

Existing automatic food processing machines using universal robotics also have many disadvantages compared to the present technology, and are solved by the present technology. Some of the disadvantages of existing prior art include high costs of the machine due to the usage of universal robotics and low capacity in peak hours due to the waterfall process. That is, the waterfall process is defined by one universal robot is equal or even lower in speed than one employee. It is impossible to speed up the process except to add more universal robots in parallel. Due to the high prices of the robots, it is economically inefficient, space-consuming and increases the complexity of the system.

In the exemplary, the following description of food making systems and methods of the present technology is directed toward systems and methods for pizza making, and in no way limiting in scope. However, it can be appreciated that the present technology can be utilized with and for the preparation of other foods such as, but not limited to, quesadillas, tortillas, tacos, nachos, sandwiches, pancakes, crepes, and the like.

Technical features described in this application can be used to construct various aspects and embodiments of apparatus, systems and/or method for making food articles.

Technical features described in this application can be used to construct various aspects and embodiments of any one or any combination of platform moving assembly, a sauce dispenser, a cheese dispenser and a slicer assembly, for use with an automated food article making system and method.

Platform Moving Assembly

In one approach, according to some aspects of the present technology, a platform system for an automated food article making system is provided. As outlined in the general concept diagrams of FIGS. 1 and 2 of the accompanying drawings, the platform moving assembly 50 can include a platform 58, weight sensor 68, such as a scale, thickness scanner, such as a time-of-flight sensor 290, food elevator (Up/Down) (platform unit 52), food positioning rail system (Back/Forth) 52,74,76, and food rotation mechanism 52. In some embodiments, the platform moving assembly is configured to move dough, such as a pizza crust, for dispensing of food thereon. In some other embodiments, other types of food may be adopted instead of dough.

As will be explained in more detail below with reference to its implementation in automated food article making systems and methods, this platform moving assembly can be configurable to move dough to one or more dispenser nozzles and/or between dispenser nozzles of a food dispenser by rotating the dough and/or moving the dough in one or more linear directions. The platform moving assembly is configured to move dough under a dispenser's nozzle to the specific point of the pizza crust (rotation and X-axis allow it to reach any part of the crust) and the scale is configured to check ingredients' weight on the dough.

Range finder "Thickness scanner" is configured to scan and detect the thickness and may be a time-of-flight sensor system such as time-of-flight sensor 290 or other type or range finder sensor system. The food elevator is configured to adjust, either dynamically and/or after each dispensing, the height of the food rotator mechanism in response to the thickness scanner output in order to maintain stable dispensing. By detecting the thickness of the dough (and in some embodiments together with any food ingredients(s) dispensed thereon), and adjusting, according to the detected thickness, the platform to adjust the height at which the pizza crust dough is positioned for dispensing food thereon, stable dispensing is maintained every time food, such as sauce, cheese, and sausage slices, is dispensed onto the dough.

In some embodiments, scale 68 is configured to verify how the weight of the dough (together with any dispensed ingredients thereon) is changing during and/or after each dispensing process and provide a corresponding output control signal for use in improving control of the dispensing system. The dispensing can be configured to adjust the amount and/or rate of food ingredients such as cheese being dispensed in response to the weight detected by the scale in order to improve stability of the dispensing system. For example, with some food ingredients such as cheese, the amount of cheese that can be typically dispensed by the dispenser system is very unstable (for example +−50% error rate without use of the scale) because unstable cheese substance depends on temperature, slicing, and time spent in the container. The error rate reduces significantly (to for example +−3% error rate of the target weight of the portion) by adjusting the amount and/or rate of cheese dispensing according to the weight detected by the scale.

Sauce Dispenser

Figure 3:
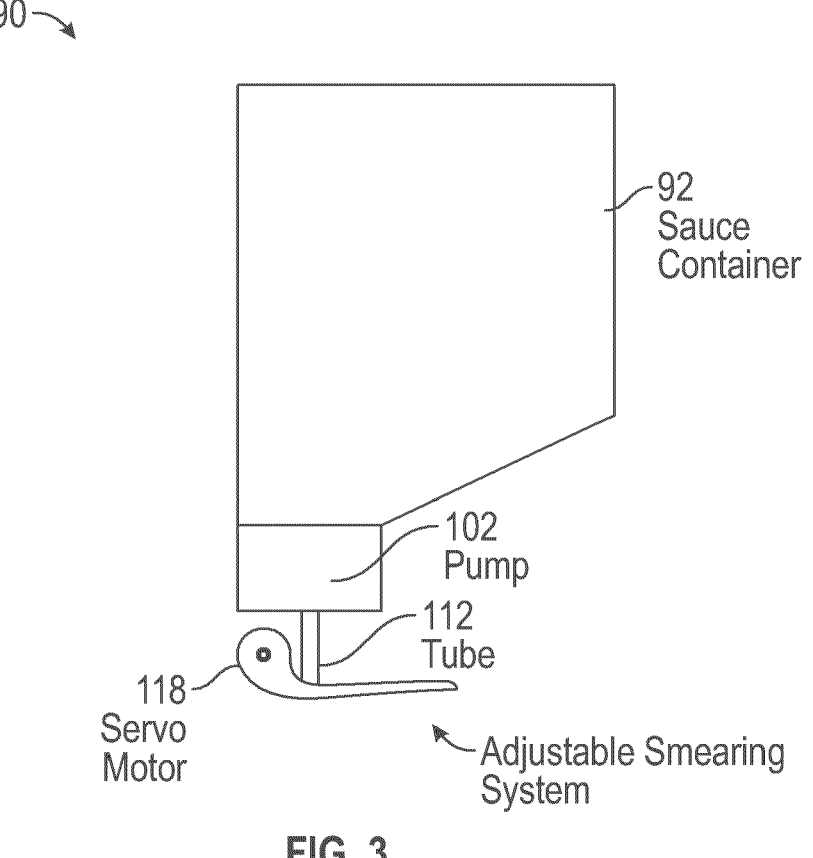
FIG. 3 is a general side view of the sauce dispenser according to one aspect of the present technology.
Figure 4:
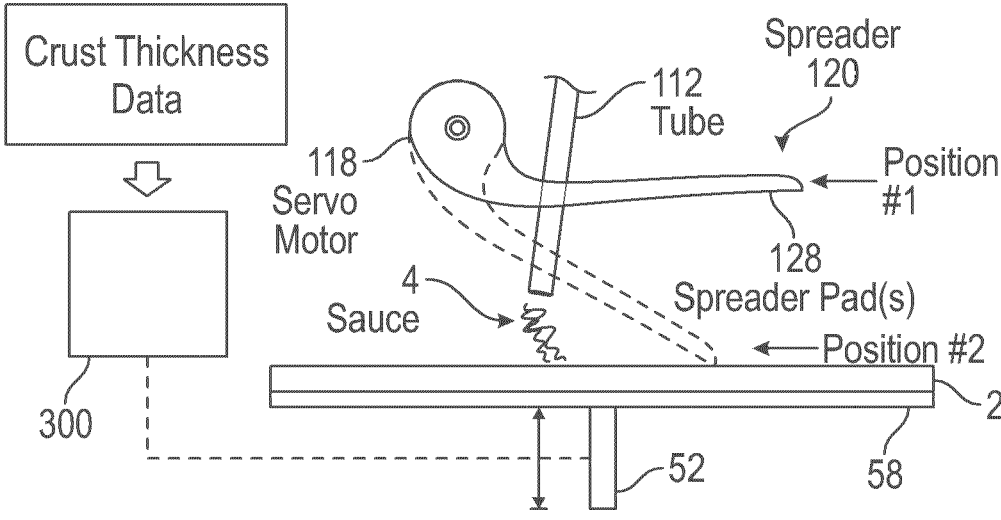
FIG. 4 is a side view of different spreader pad positions of the sauce smearing system of the sauce dispenser FIG. 3.

In another approach, a sauce dispenser assembly 90 according to some other aspects of the present technology is provided as outlined in the general diagram of FIG. 3. Sauce dispenser assembly 90 is configured to dose and smear sauce on a dough or other type of food. Sauce dispenser 90 comprises a sauce container 92, sauce pump 102, and a spreader smearing system. The spreader smearing system comprises a discharge tube 112, sauce smearing spreader 120 (which may be including a spreader pad(s) 128 ("Spatula") at the distal end of the spreader), and motor 118 (for changing smearing spreader pad angle). Motorized smearing spreader system is configured to allow a thin layer of sauce to be dispensed on to the dough. In order to smear the sauce, the spreader pad(s) 128 is fed with the sauce by the discharge tube 112 to a sauce discharge location under the spreader pad(s), right before the spreader pad to dough contact surface. In some embodiments, this is achieved by means of hole or opening in the middle region of the spreader through which sauce discharge tube 112 passes to the sauce discharge location. Sauce spreader 120 can include a discharge tube 112 opening configured to receive therethrough an end of discharge tube 112, and the spreader pad 128 adjacent the discharge tube opening, the spreader pad 128 being positionable downstream of the discharge tube opening so that the sauce dispensed from discharge tube 128 is spread out by spreader pad 128 in relation to a rotational direction of the pizza crust (or linear direction if the platform is configured to move the pizza crust in a linear motion (such as a conveyor) during dispensing). As indicated generally in FIG. 4, spreader 120 and discharge tube 112 are movable between a first configuration (Position #1) in which spreader pad 128 is raised and disabled and a second configuration (Position #1) in which the spreader pad 128 is lowered and presses against pizza crust 2 ready to smear the sauce which comes from the tube.

Sauce smearing spreader 120 is pivotable at a proximal end opposite the distal end between the first configuration and the second configuration by server/stepper motor 118. In the second configuration (spatula-like configuration), spreader pad(s) 128 is contacting with and pressing down on the upper surface of pizza crust 2 by operation of the motor. A computer 300 or other controller can be configured to control a movable platform 58 (such as that of the platform moving assembly 50) to adjust the height of platform 58 (and therefore the dispense operating height at which the upper surface of the pizza crust is positioned) according to the thickness data associated with pizza crust 2 such that the sauce spreader angle of inclination to pizza crust 2 surface, spreader pad(s) position, and/or spreader pad pressing force on the pizza crust surface is/are maintained in their normal operating range or in substantially the same operating range irrespective of whether the thickness of pizza crust 2 on the platform 58 is a smaller thickness or a larger thickness than an average thickness or predefined thickness for which sauce spreader 120 is normally configured to operate. In some embodiments, the amount of required adjustment of the height of the platform 58 according to the thickness data can be predetermined during system calibration for pizza crusts with regular thickness, smaller thickness and larger thickness.

Alternatively or additionally, in some embodiments the position of the pivot point of sauce spreader end is adjustable and this adjustment is controllable by computer 300 or other controller to allow adjustment of the vertical distance between the sauce spreader pivot point and platform 58 according to the thickness data such that the sauce spreader angle of inclination to the pizza crust surface, spreader pads position, and/or spreader pad pressing force on pizza crust surface is/are maintained in their normal operating range or in substantially the same operating range irrespective of whether the thickness of pizza crust 2 on platform 58 is a smaller thickness or a larger thickness than an average thickness or predefined thickness for which sauce spreader 120 is normally configured to operate. In some embodiments, the amount of required adjustment of the height of the pivot point of sauce spreader 120 according to the thickness data can be predetermined during system calibration for pizza crusts with regular thickness, smaller thickness and larger thickness.

Alternatively or additionally, in some embodiments, the computer 300 or other controller can be configured to control the sauce spreader angle of inclination to the pizza crust surface, spreader pads position, and/or spreader pad pressing force on the surface of pizza crust 2 on platform 58 (which may be moveable or fixed in height) according to the thickness data such that sauce spreader 120 is able to smear and spread the sauce being discharged into a substantially uniform and consistent layer irrespective of whether the thickness of pizza crust 2 on platform 58 is a smaller thickness or a larger thickness than an average thickness or predefined thickness for which sauce spreader 120 is normally configured to operate. In some embodiments, the amount of required adjusted of sauce spreader angle of inclination to the pizza crust surface, spreader pads position, and/or spreader pad pressing force on the surface of the pizza crust on the platform (which may be moveable or fixed in height) according to the thickness data can be predetermined during system calibration for pizza crusts with regular thickness, smaller thickness and larger thickness.

Figure 2:
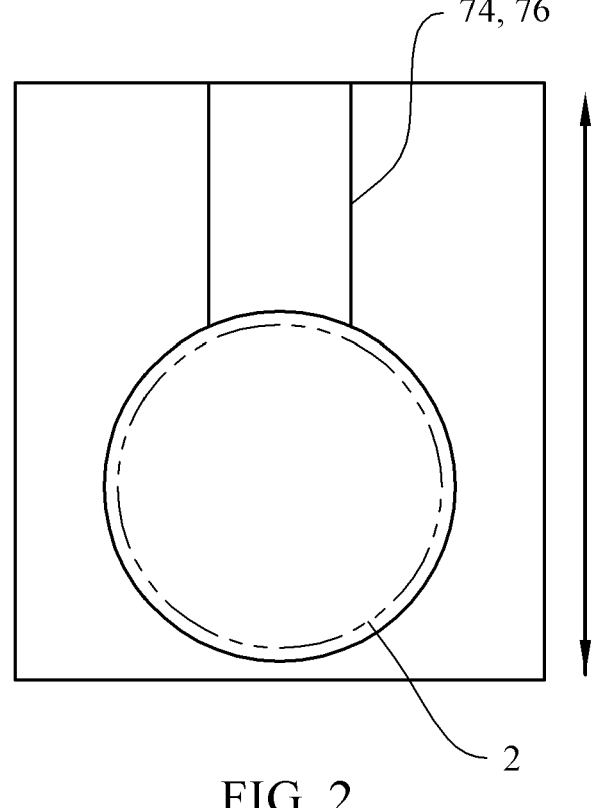
FIG. 2 is a diagram illustrating part of FIG. 1.

Additionally, the sauce dispenser system or platform of any one of the embodiments can include a range finder sensor configured to determine the thickness of the pizza crust or other food on the platform (as for example shown in FIG. 1). The range finder sensor can be operably coupled to the computer or other controller.

By controlling the platform height and/or sauce spreader 120 in the aforementioned manner, sauce dispenser 90 is configurable to smear the sauce being dispensed on the dough such that a substantially uniform thin layer of the sauce (without significant non-uniformities in the spread such as a bubbles or big sauce drops) is spread over the dough irrespective of the pizza crust thickness. This enables the sauce dispenser to spread uniform thin layers of sauce on the dough in a consistent manner.

Cheese Dispenser

Figures 5, 6:
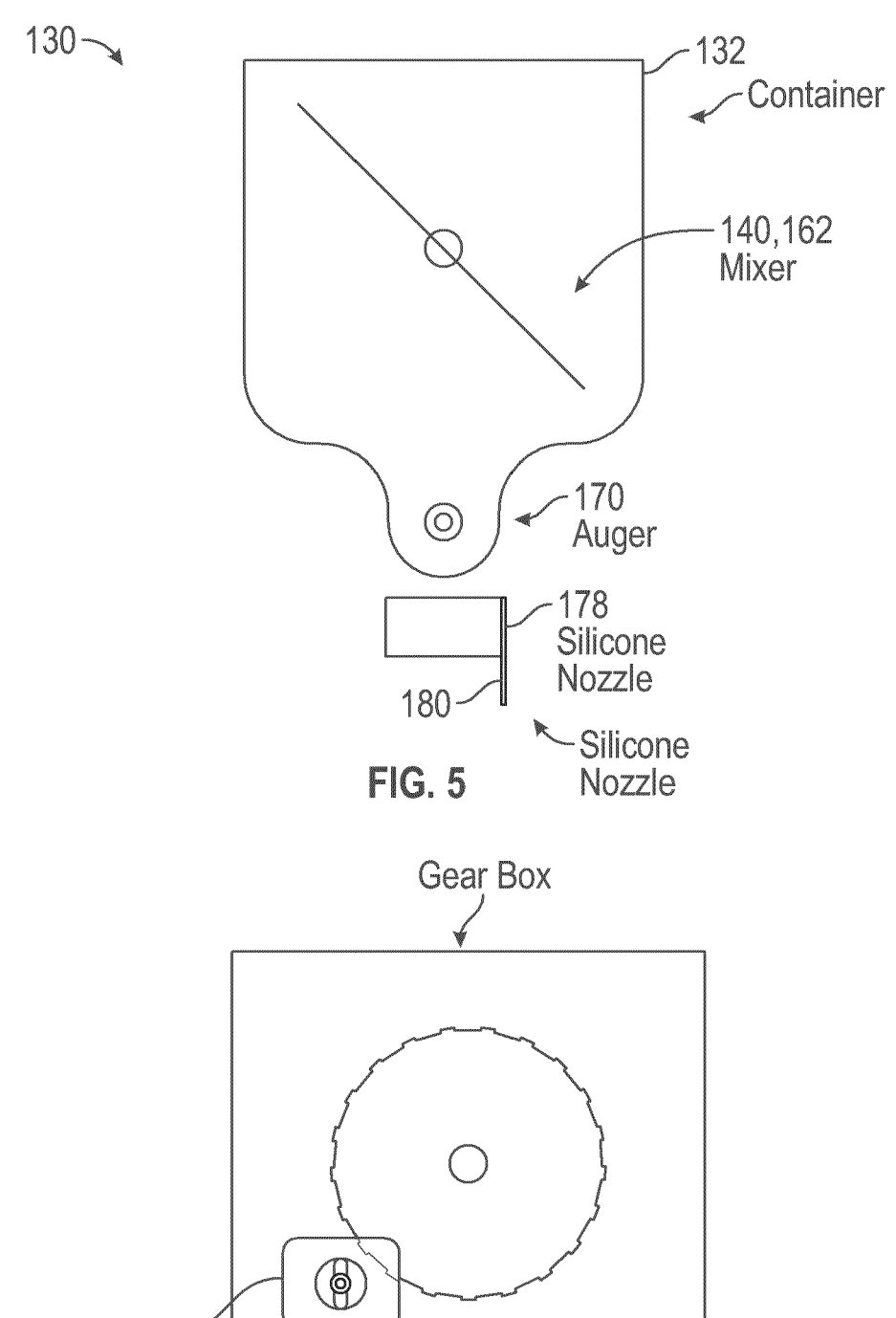
FIG. 5 is a general front view of inside the cheese dispenser according to one aspect of the present technology.
FIG. 6 is a general side view of the gearbox of the cheese dispenser of FIG. 5.

In yet another approach, a cheese dispenser is provided according to some aspects of the present technology as illustrated in a general diagram of FIGS. 5 and 6. Cheese dispenser 130 is configured to squeeze cheese onto dough or other food. Cheese dispenser 130 comprises a cheese container 132, Mixer 162,140, Auger 170, silicone nozzle 178 and Gearbox (Mixer motor #1 140', Auger motor #2 140).

Mixer is configured to stir cheese in container 132 so that it does not stick together while lying for several hours. In some embodiments, mixer is configured to stir cheese in container 132 in different directions and after predefined time intervals, such as every 5 minutes. Because cheese is quite a firm substance, cheese dispenser 130 is configured to enable very powerful mixing inside the container. Auger is separated from the mixer and two motors 140', 140, one for the mixer and the second for the auger are used to operate the augur and mixer. This approach generates high torque cheese dispensing system with a heavy force inside the container.

By providing heavy motors and transmission gears for both the mixer and auger operation, the cheese dispenser is capable of dispensing may types of cheese, even if the cheese is melted or stuck somewhere. Without this heavy mixer and auger set up, the cheese will stick within for example an hour, and it is not possible anymore to spread it. In some embodiments, cheese dispenser 130 is configured to operate in response to control signals corresponding to weight of the cheese dispensed on the food (for example as detected by weight/scale sensor 62 on platform movement assembly) and to vary dispensing according to detected weight changes in order dispense the cheese in a more stable and uniform manner. In some embodiments, cheese nozzle has small "tail" 180 extending from one side of the nozzle discharge opening to help distribute cheese on the crust.

Cheese dispenser is configured above the dough or other food (such as but not limited to dough supported on the platform assembly mentioned hereinbefore) such that tail 180 of the nozzles does not have contact with the dough but maintains a position slightly above the dough with an air gap therebetween. This allows the nozzle lip to spread out cheese "hills" that may be formed on the dough upstream of the lip as a result of the cheese being initially dispensed from the nozzle discharge opening onto the dough. In some embodiments, in order to spread cheese evenly over the entire dough, cheese dispenser 130 and/or a platform carrying the dough is configured to operate in response to control signals from a thickness scanner and set the relative position of the crust to the cheese dispenser nozzle according to the thickness of the dough together with cheese and/or other ingredients dispensed on the dough (either before dispensing begins and/or dynamically as dispensing is in progress). When using the cheese dispenser with the platform moving assembly, the scanner precisely scans the crust thickness and moves the Z axis or height of the platform to the right position.

Food Slice Dispenser

Figures 7, 8:
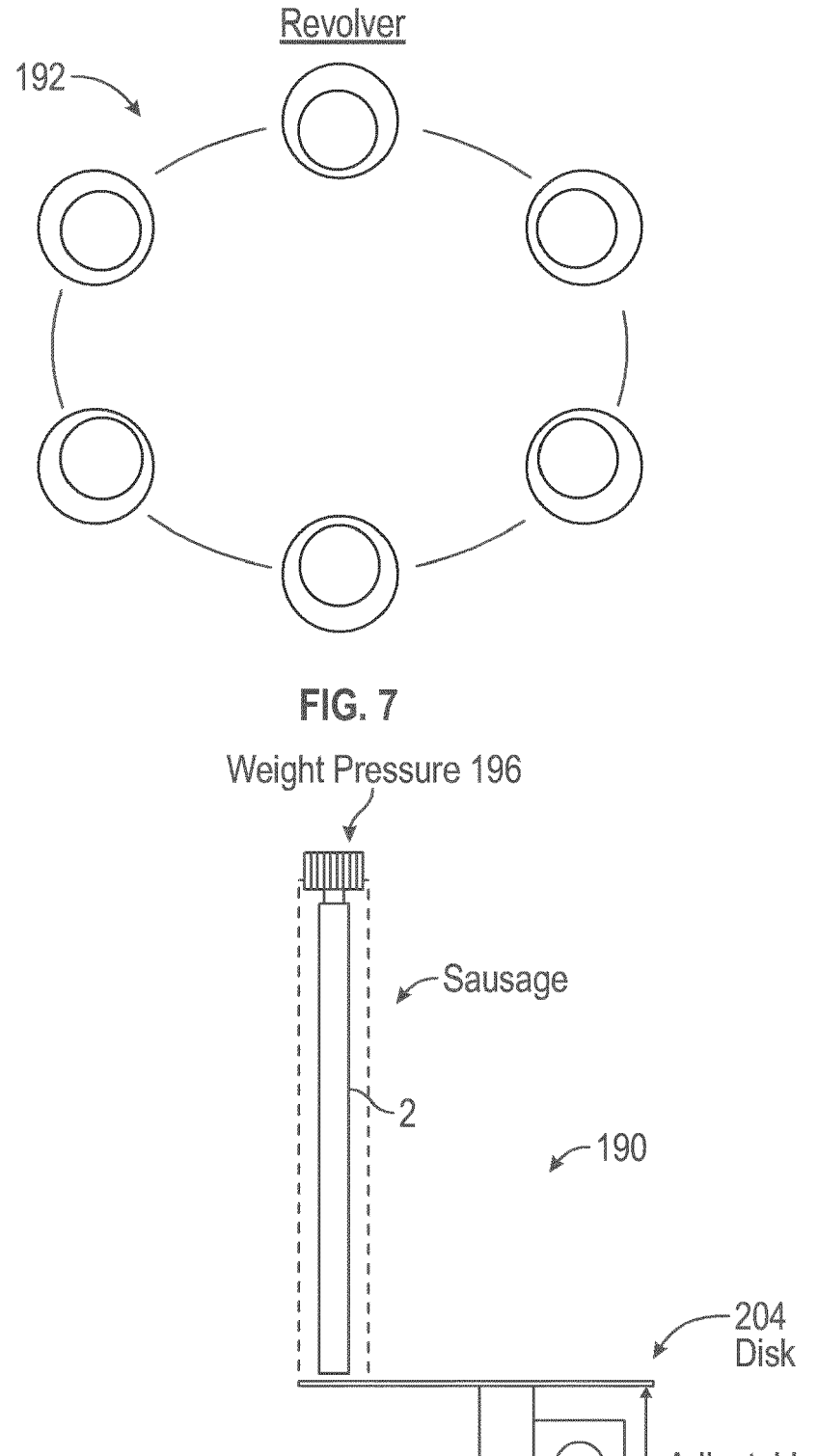
FIG. 7 is a general top plan view of a revolver of a slice dispenser according to one embodiment.
FIG. 8 is a general diagram illustrating the concept of the slicer dispenser system according to one aspect of the present technology.

In yet another approach, a food slice dispenser according to some aspects of the present technology is provided as illustrated in general concept form in FIGS. 7 and 8. The food slice dispenser comprises a slicer assembly 190 which is configured to cut the sausage or other tubular like food into slices and places the slices on the dough. Slicer assembly 190 has a weight system 196, circular knife or disc blade 204, motor 205 to adjust the thickness of the slices, slicer spreader or nozzle 212 (which may be an Anti-stick silicone nozzle and vibro-motor 230). The sausage or other tubular food storage tubes are arranged in a "Revolver" 192 (see FIG. 7).

Each cylindrical holder of the "revolver style" sausage storage includes a weight system that is slidably mounted inside the cylindrical tube of the holder. Motor 205 is configurable by the system first to adjust the knife to make a larger cut to level the surface of the sausage after refilling the revolver and to set up slice thickness for different sausages. As the sausage is cut into slices by the knife, the sausage reduces in length and the sausage urged by the weight system slides down the tube together with the weight system.

When it is time to remove any uncut left over sausage from the holder tube, weight system 196 (together with the leftover sausage secured therein) can be removed from the holder tube and a mechanism of the weight system can be operated so as to release the left over sausage from the weight. Weight system 196 ensures left over sausage can be removed with ease from the holder tube.

By storing the sausage in a "Revolver" style system and adopting a slicing technique of rotating the revolver near a circular knife, sausage can be stored and slices thereof distributed as needed. Furthermore, by providing an anti-stick silicone nozzle with a vibro motor, slices being dispensed are prevented from sticking in the dispensing nozzle thereby avoiding entire shut down of the system.

Implementations in Automated Food Article Making Systems and Methods

Figure 53:
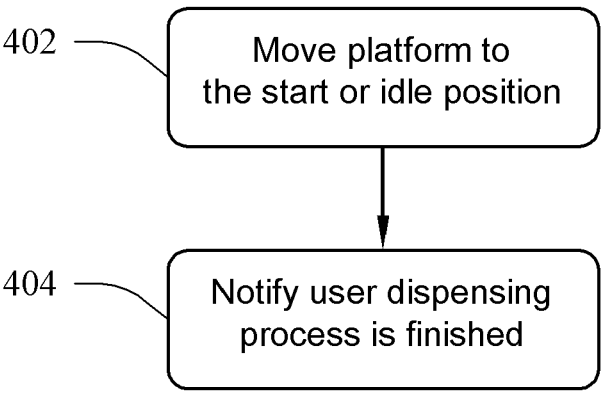
FIG. 53 is a flow chart of an example of the final process utilized in the present technology.

Reference will now be made to FIGS. 1-53 of the accompany drawings to explain automated food article making systems and methods according to aspects of the present technology that can comprise or include any one of the embodiments of the platform moving assembly 50, sauce dispenser 90, cheese dispenser 132 and slicer assembly 190 outlined in FIGS. 1-8. Furthermore, it would be fully appreciated that any one or combination of the platform moving assembly, dispensers and slicer assembly may, in some aspects, be implemented in automated food article making systems and methods described herein or may be implemented in other automated food article making systems.

The automated food article making system and method according to some aspects and embodiments of the present technology is shown and generally designated by the reference numeral 10. In the exemplary, the automated food article making system 10 can include several main parts: a chassis or unit 12, a paddon or catch tray 40, a platform moving assembly 50, a sauce dispenser assembly 90, a cheese dispenser assembly 130, a slicer assembly 190 and a cooling unit 240. It can be appreciated that the sauce dispenser assembly 90, the cheese dispenser assembly 130 and the slicer assembly 190 can be utilized separately and independently of each other, with or without the unit 12, catch tray 40, the platform moving assembly 50 and/or the cooling unit 240 or any combination thereof.

Figure 9:
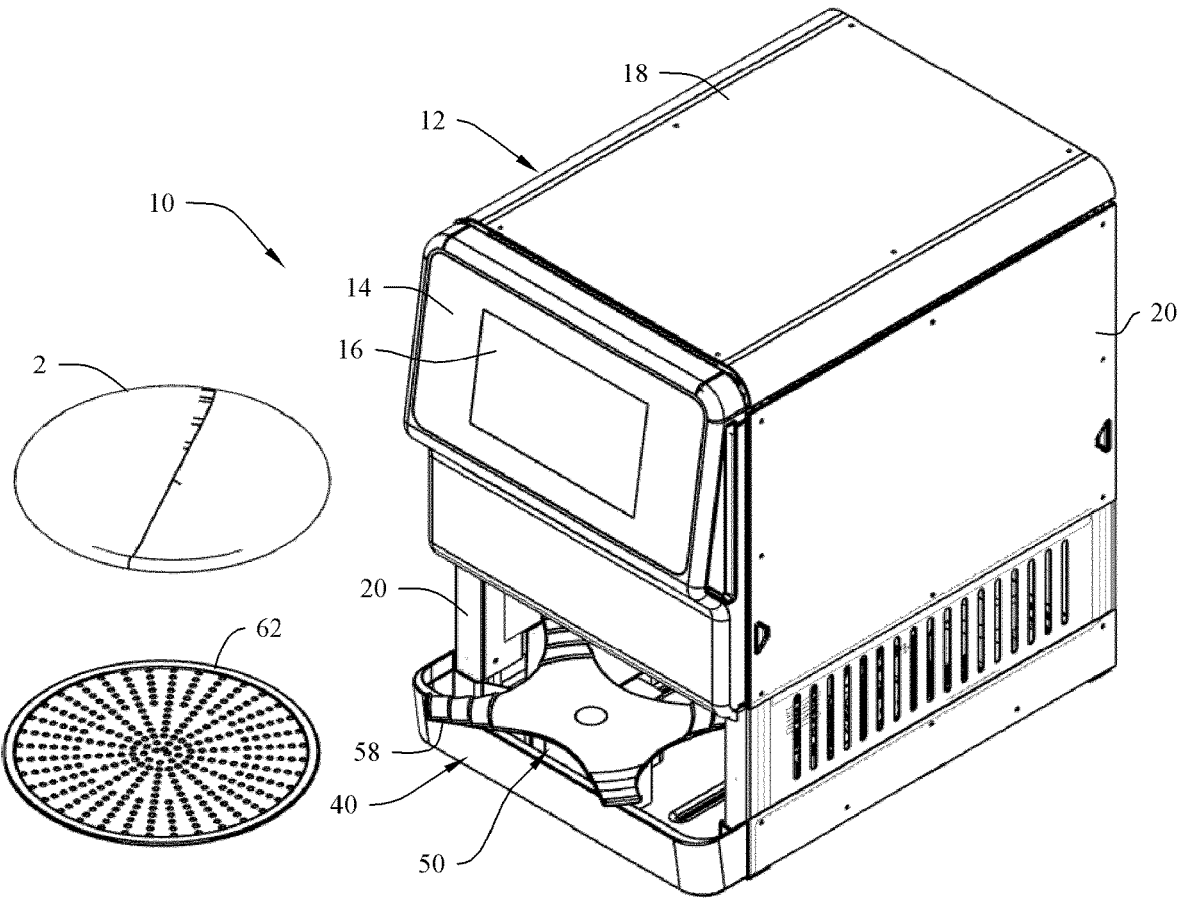
FIG. 9 is a front perspective view of an embodiment of the automated food article making system in an idle configuration and constructed in accordance with the principles of the present technology with the pizza crust and pizza tray exploded.
Figure 10:
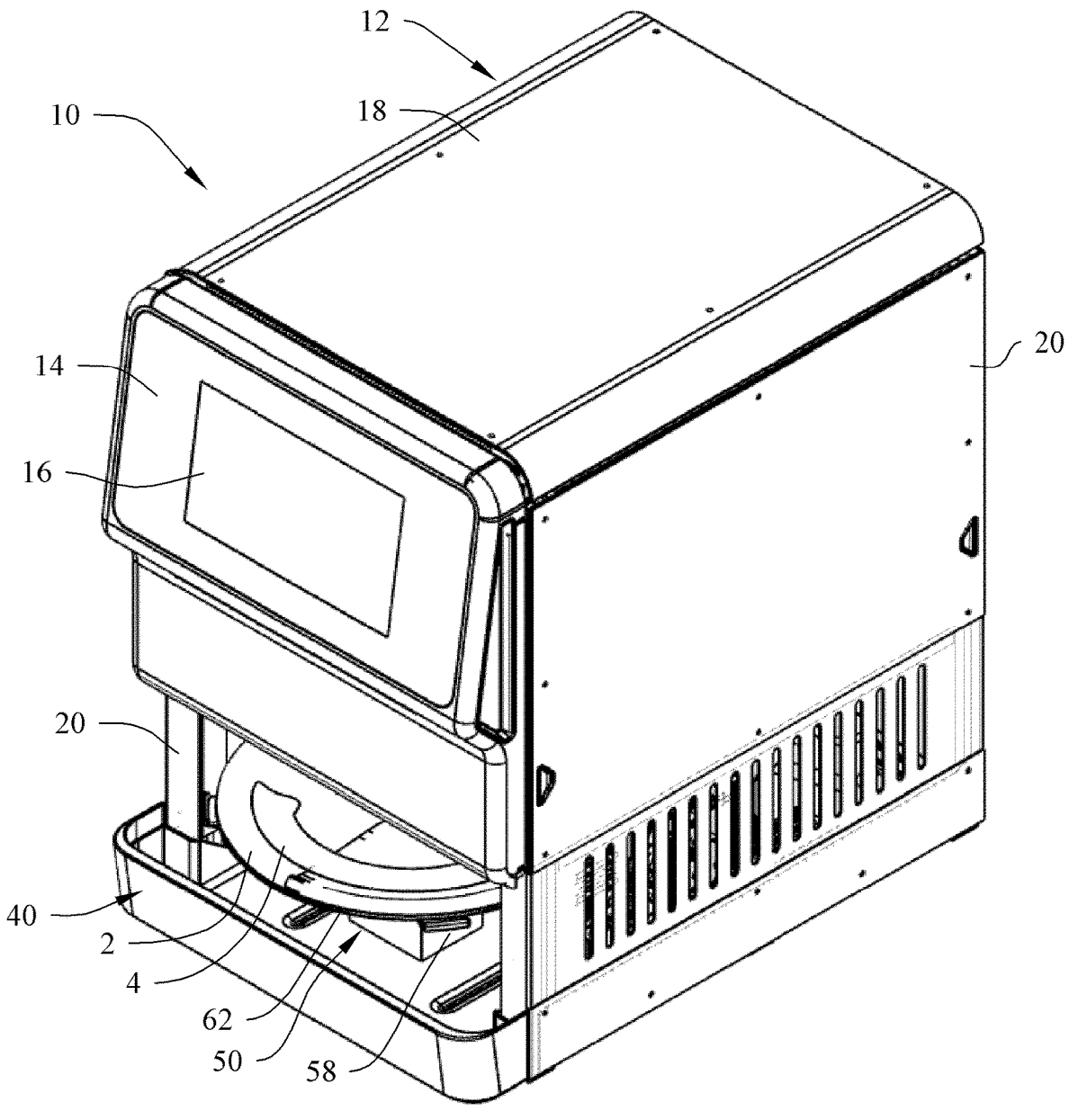
FIG. 10 is a front perspective view of the compact automated pizza assembly machine in an operational configuration with the pizza crust and pizza tray operationally in the present technology.
Figure 11:
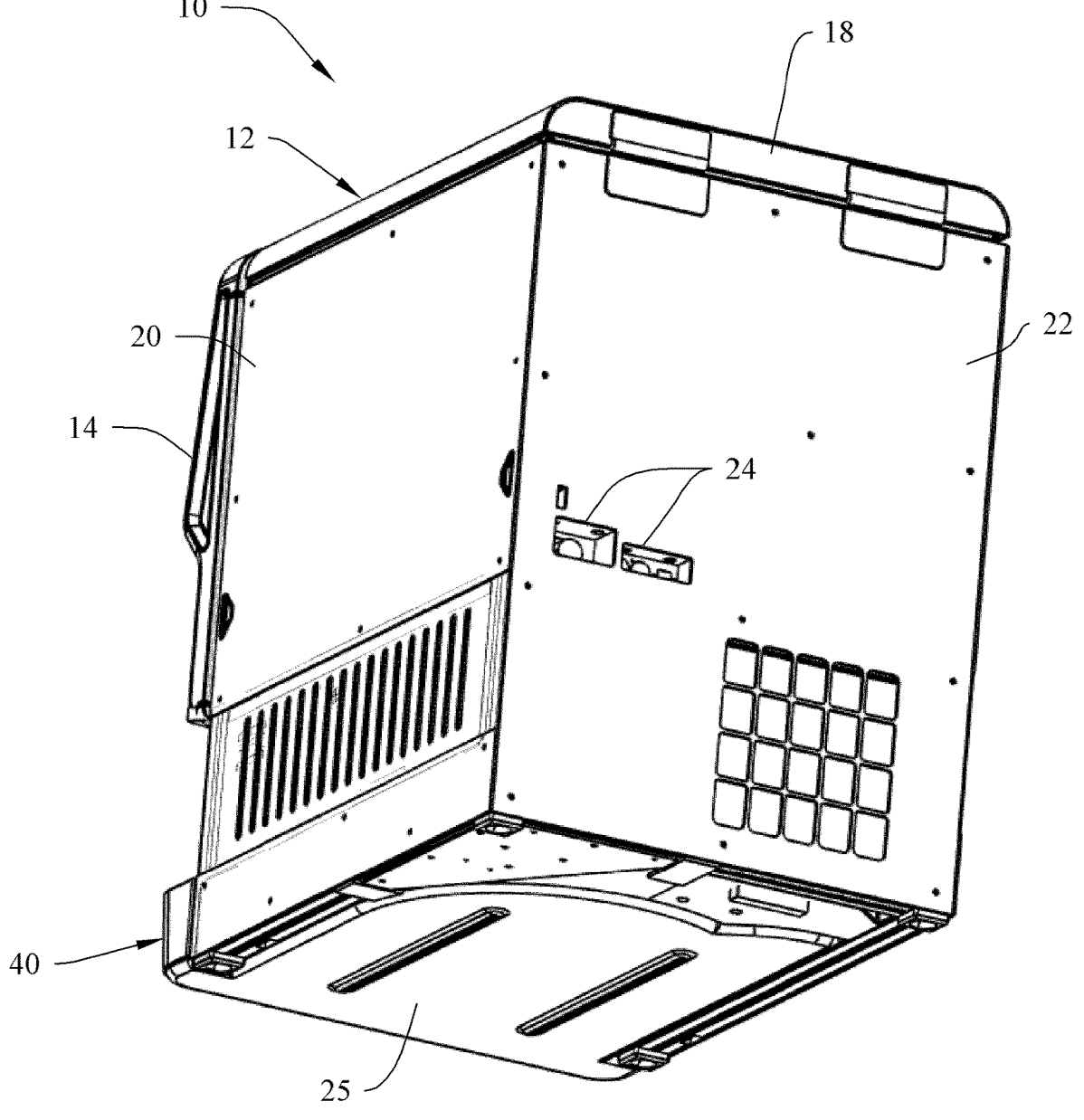
FIG. 11 is a rear perspective view of the compact automated pizza assembly machine of the present technology.
Figure 12:
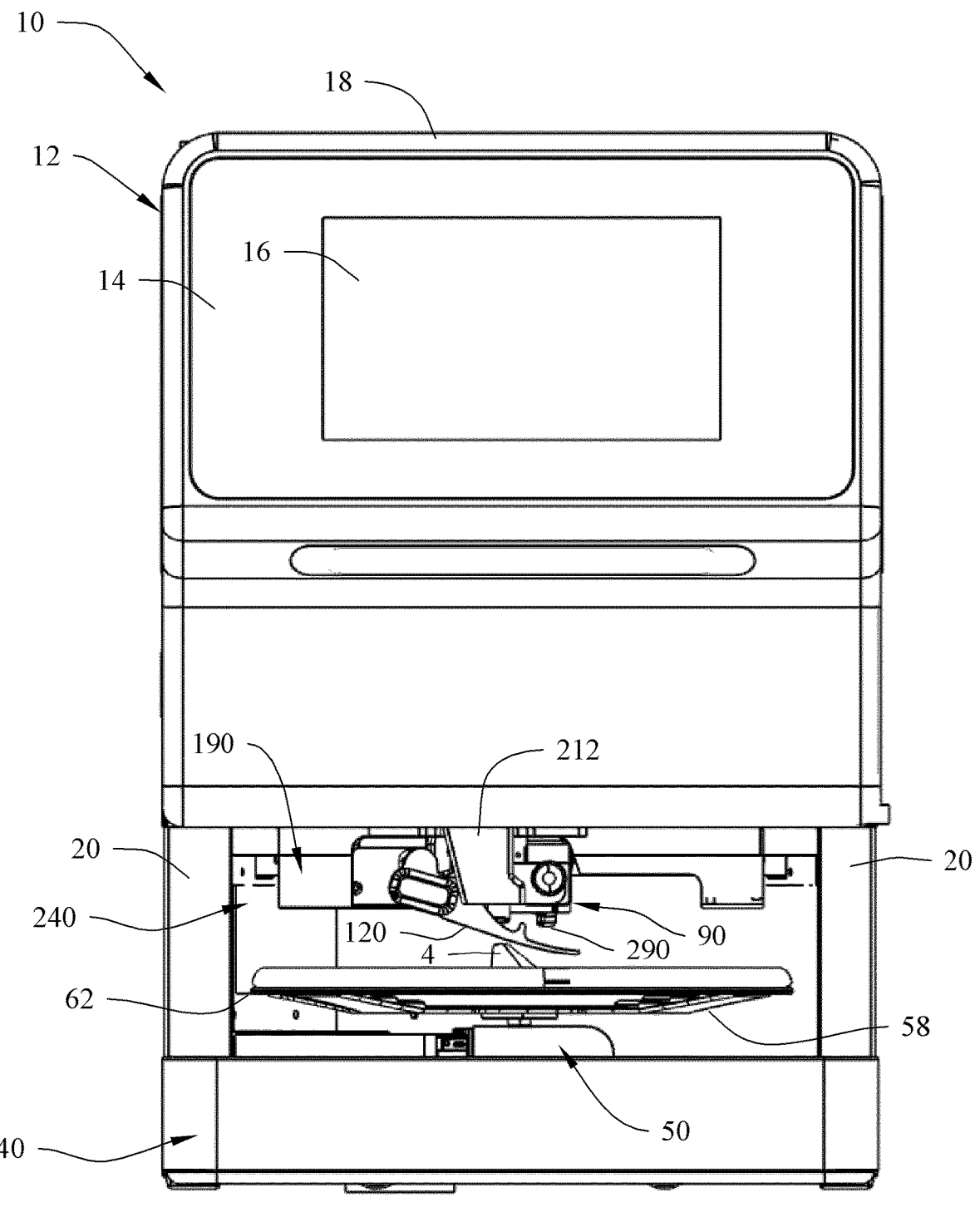
FIG. 12 is a front plane view of the compact automated pizza assembly machine of the present technology.

Referring to FIGS. 9-13, the automated food article making system 10 can include a chassis or unit 12 featuring an openable or removable front panel 14, an openable or removable top panel 18, side panels 20, a rear panel 22, and a bottom panel 25. A front section of the unit 12 can include a front opening located below the front panel 14 that is sized to receive a pizza tray 62 that supports a pizza crust 2. In an idle configuration, as best illustrated in FIG. 9, the pizza crust can be placed on the pizza tray 62, which can then be placed on a tray support platform 58. In an operational configuration, as best illustrated in FIGS. 10 and 12, the pizza crust 2 and the pizza tray 62 can then be moved into a cavity of the unit 12 for receiving dispensed sauce 4, cheese and/or sliced food. The front opening can be defined between the front panel 14 and the bottom panel 25.

The front panel 14 can include a display 16 such as, but not limited to, a touch-sensitive display, a display and/or input buttons. The front panel 14 and/or the top panel 18 can be opened or removed to allow access to internal components of the unit 12 for maintenance, replacement, repair, cleaning, refilling, etc.

It can be appreciated that the side panels 20 can be removable to allow additional access to the internal components of the unit 12, and can include ventilation holes.

The rear panel 22, as best illustrated in FIG. 11, can include ventilation holes, data input and/or output connectors or connections ports 24, and other suitable power ports. It can be appreciated that ventilation holes, or data input and/or output connectors or connections port 24 can be located on other sides or portions of the unit 12.

Figure 13:
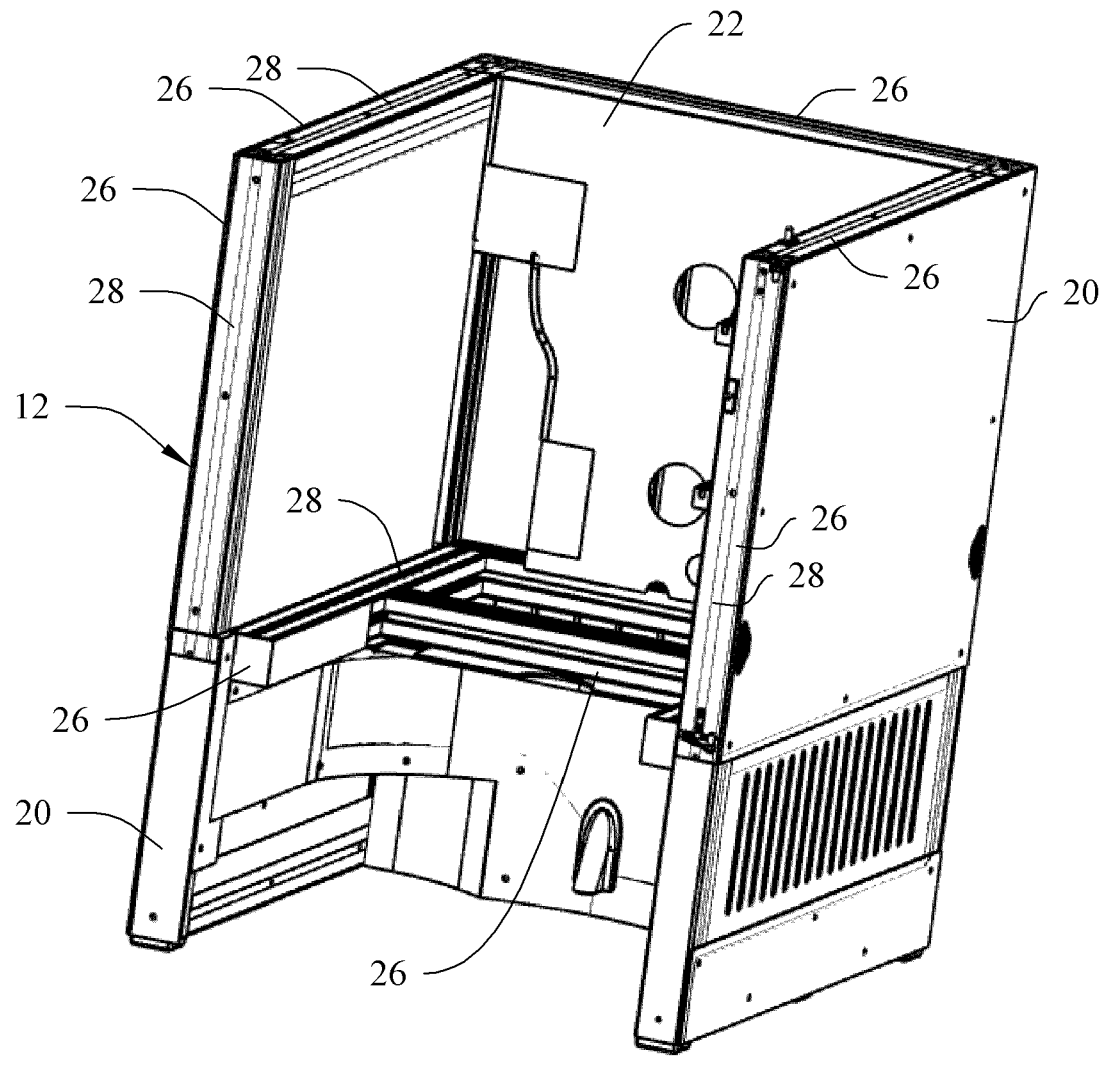
FIG. 13 is a front perspective view of the chassis utilizable with the compact automated pizza assembly machine of the present technology.

Referring to FIG. 13, the unit 12 can include internal frame members 26 that include one or more grooves or tracks 28. The internal frame members 26 can be interconnected with each other to form a skeletal frame that provides rigidity and support for all the panels and internal components. The front, top, side, rear and bottom panels 14, 18, 20, 22 and 25 can include detents that are engageable with the tracks 28 of corresponding frame members 26, respectively. Alternatively, the front and top panels 14, 18 can include pivot or hinge elements that pivotably connect the front and top panels to corresponding frame members 26, respectively. With the front, top, side, rear and bottom panels 14, 18, 20, 22 and 25 attached to the frame members 26, accordingly forming an enclosure while defining the front opening.

Figure 14:
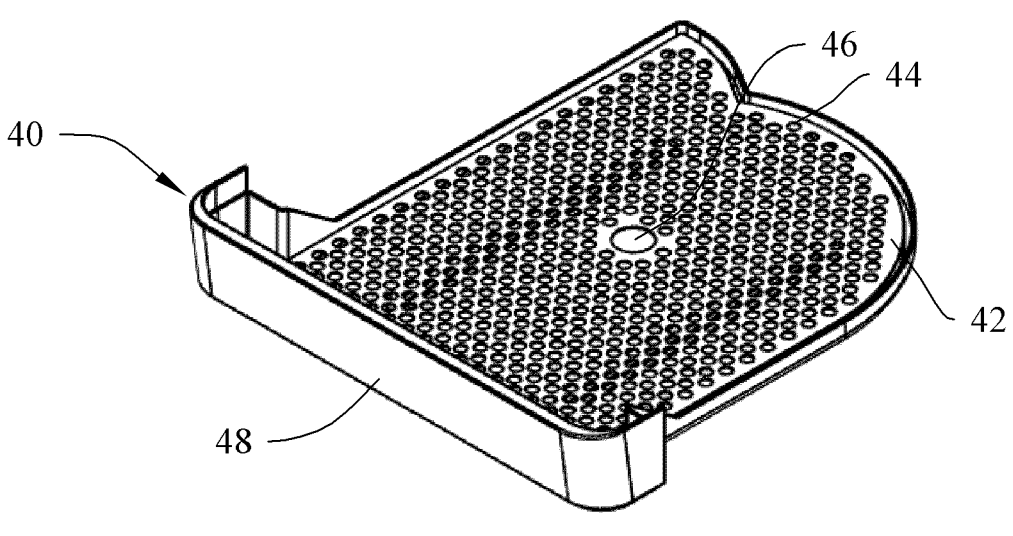
FIG. 14 is a front perspective view of the catch tray utilizable with the compact automated pizza assembly machine of the present technology.
Figure 15:
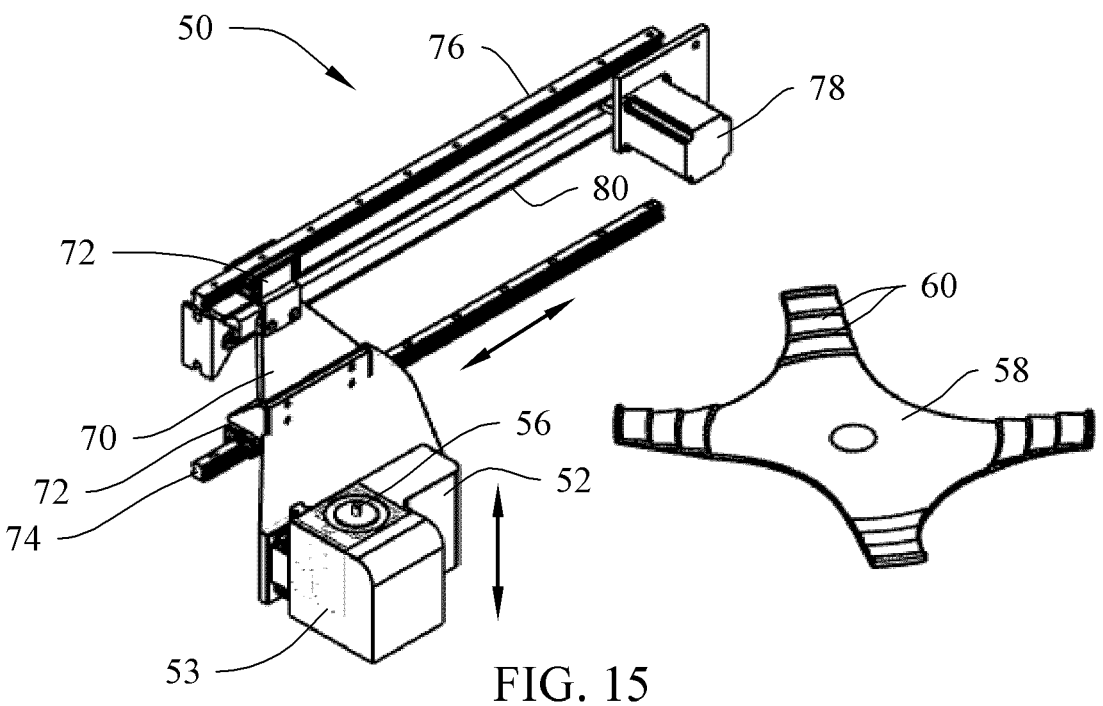
FIG. 15 is a front perspective view of the platform assembly of the present technology.

Referring to FIG. 14, the catch tray 40 can be slidably received in the unit 12 through the front opening and above the bottom panel 25. Any debris or food items that falls off the pizza crust or from the dispensers can be caught by the catch tray 40. The catch tray 40 can include a planar member 42 featuring a plurality of holes 44 surrounding a central hole 46, and can include a handle ledge 48 along an edge of the planar member 42. The handle ledge 48 can be configured so as to be capable of being grasped by a user for removal or insertion of the catch tray 40 with the unit 12. Removing the catch tray 40 from the unit 12 allows for cleaning and disposal of debris caught on the catch tray 40. The holes 44 can be utilized for ventilation of air withing the internal cavity of the unit 12.

Referring to FIGS. 15-19, the platform moving assembly 50 can be removably received in the unit 12, and can be configured for horizontal movement (forward/backward) along an X-axis or longitudinal axis of the unit 12 and vertical movement (up/down) along a Z-axis, while providing rotational movement of the tray support platform 58 that inherently rotates the pizza tray 62 and pizza crust 2. It can be appreciated that the platform moving assembly 50 can be utilized or operated as standalone unit separate and independent of the unit 12, the sauce dispenser assembly 90, the cheese dispenser assembly 130, the slicer assembly 190, the catch tray 40, and/or the cooling unit 240 or any combination thereof.

Figure 16:
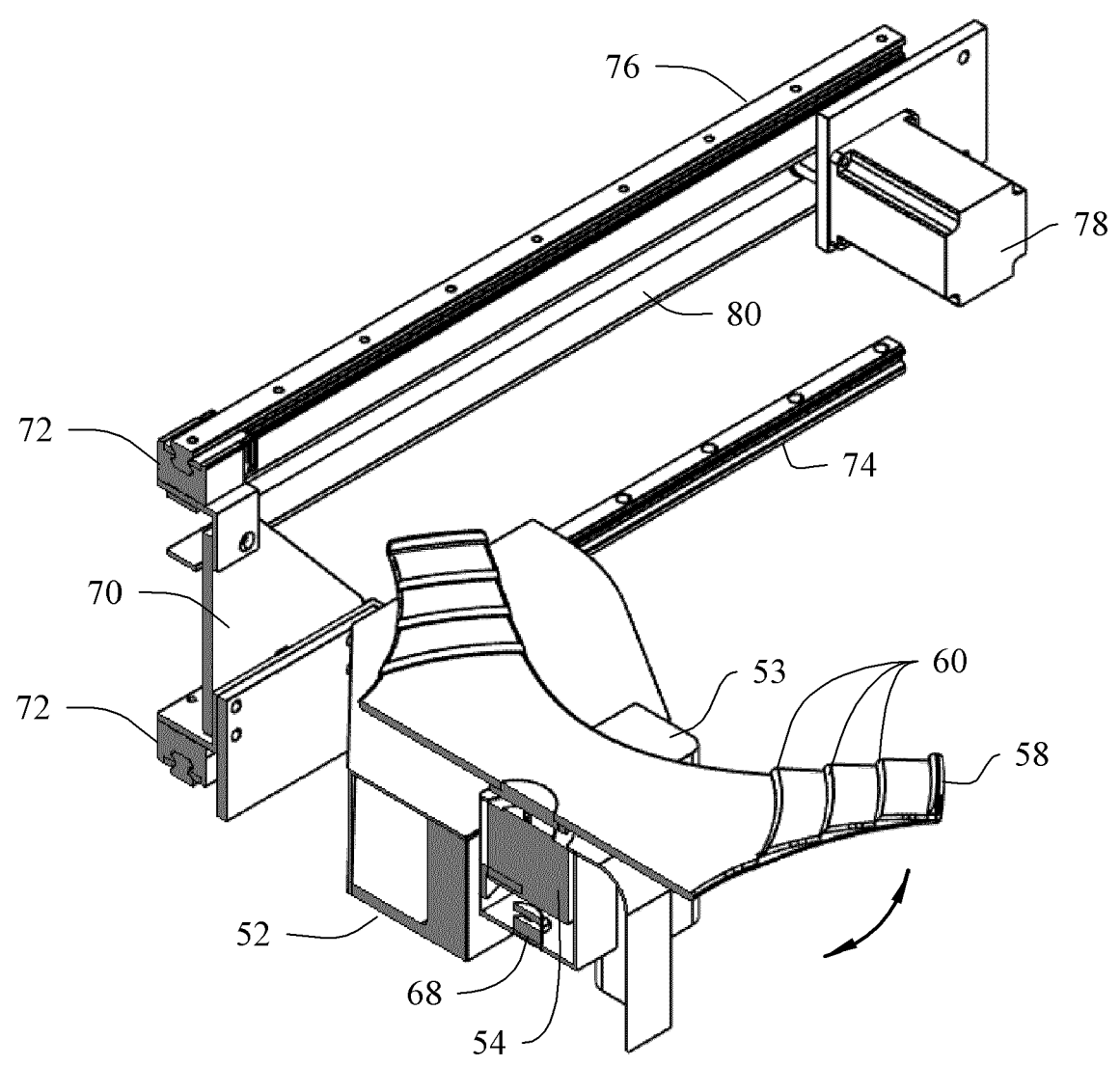
FIG. 16 is a lateral cross-sectional perspective view of the platform unit, the tray motor unit and the travel guides of the platform assembly of the present technology.

A platform unit 52 can include a tray motor unit 53 that includes a tray motor 54 featuring a shaft or coupling 56 that engages with the tray support platform 58. Operation of the tray motor 54 rotates the tray support platform 58 and thus the pizza tray 62 and pizza crust supported thereon, as best illustrated in FIG. 16. In some embodiments, a speed range of rotation of the tray support platform 58 can be for example but not limited to between about 0 and 20 radians/second.

The tray support platform 58 can include one or more radially arrange notches or ledges 60 spaced from a central point of the tray support platform 58. The ledges 60 are each configured to create different diameter support features that can receive different diameter tray support platforms 58. Each ledge 60 can be vertically offset from the ledge therebefore so that a first diameter tray support platform can be received and supported in a first radial ledge, a second diameter tray support platform can be received and supported in a second radial ledge, and a third diameter tray support platform can be received and supported in a third radial ledge. It can be appreciated that any number of ledges 60, diameters and vertical offsets of the ledges can be utilized with the tray support platform 58.

Figure 17:
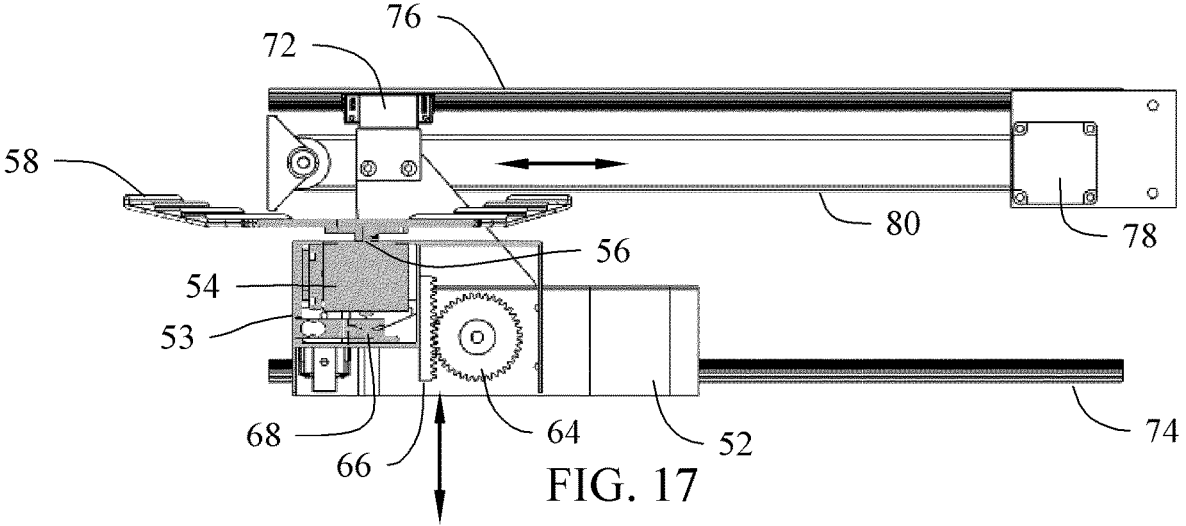
FIG. 17 is a longitudinal cross-sectional view of the tray motor unit of the platform assembly of the present technology showing the horizontal (X-axis) and vertical (Z-axis) movement.

Vertical movement of the tray motor unit 53 and thus the tray support platform 58 can be accomplished by a food elevator system. In this embodiment, the food elevator system can comprise a platform motor and platform gear 64 associated with the platform unit 52 and that is engageable with a rack gear 66 associated with the tray motor unit 53. The platform gear 64 and rack gear 66 are configured so that rotation movement of the platform gear 64 results in vertical movement of the rack gear 66, consequently resulting in raising or lowering the tray motor unit 53 and the tray support platform 58 coupled to the tray motor 54, as best illustrated in FIG. 17.

A weight sensor 68 can be operatively associated or attached to the tray motor 54 configured to determine a weight or force placed on the tray motor unit 53. It can be appreciated that the tray motor 54 can be fully or partially supported by the weight sensor 68, or the weight sensor can be a tensile sensor operatively arranged to determine a weight placed on the tray motor 54 or the tray motor unit 53.

Figure 18:
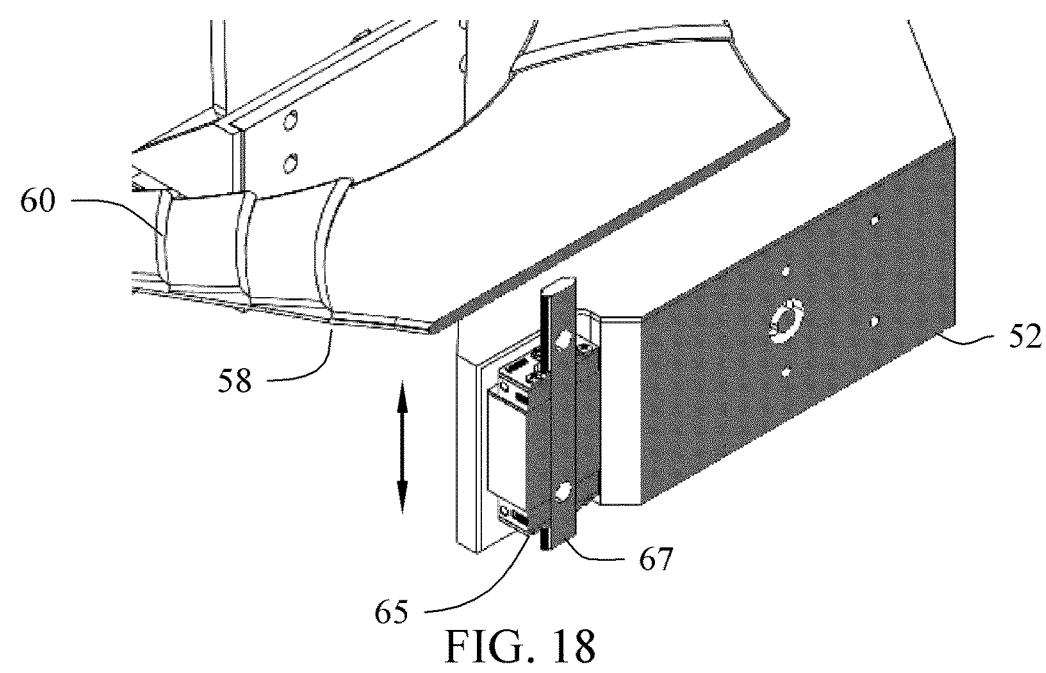
FIG. 18 is a cross-sectional perspective view of the platform vertical movement mechanism of the platform assembly.
Figure 19:
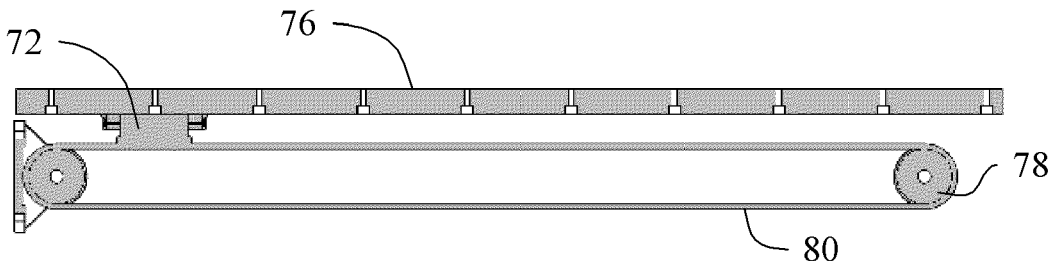
FIG. 19 is a longitudinal cross-sectional view of the platform horizontal movement mechanism of the platform assembly.
Figure 19:
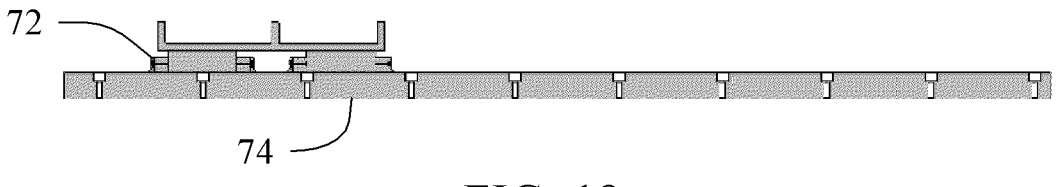

A travel sensor 65, as best illustrated in FIG. 18, can be utilized with a vertical guide track 67 to determine the exact position of the tray motor unit 53 and/or the pizza crust 2 that is placed on the pizza tray 62 that is supported by the tray support platform 58 that is rotatably supported by the tray motor unit 53. The vertical guide track 67 can be stationary and attached to the platform unit 52 while allowing the tray motor unit 53 to travel in the vertical movement without lateral movement of the tray motor unit 53.

A positioning rail system is provided to allow back and forth horizontal movement of the platform unit 52 along one or more rails or tracks. In one embodiment shown in the figures, the position rail system comprises the platform unit 52 and tracks 74,76. Platform unit 52 can include a platform mount 70 featuring one or more travel guides 72 that are configured to allow the horizontal movement of the platform unit 52 along first track 74 and second travel track 76, as best illustrated in FIGS. 15, 16, 17 and 19. The first and second travel tracks 74, 76 can be oriented along the X-axis or longitudinal axis of the unit 12, thereby allowing the platform unit 52 to travel in and out of the cavity of the unit 12 and thus in the idle or operational configuration. In some embodiments, one track can be used.

A horizontal travel motor 78 can be operatively arranged or configured to operate a belt 80 that is configured to move the platform mount 70 of the platform unit 52 along the first and second tracks 74, 76. The horizontal travel motor 78 and belt 80 can be associated with the first track 74 or the second track 76. With the at least one of the travel guides 72 being engageable with the belt 80 so as to transfer movement of the belt 80 to the horizontal movement of the platform unit 52.

A horizontal travel sensor can be utilized with the platform unit 52, the first track 74, the second track 76, at least one of the travel guides 72, the belt 80 or the horizontal travel motor 78 to determine the exact horizontal or X-axis position of the platform unit 52.

In some embodiments, the linear motion mechanism utilizing the travel motor 78 can be employed without the rotation mechanism utilizing the tray motor 54 and vice versa.

It can be appreciated that in some embodiments a different linear movement mechanism can be used in place of the travel motor and belt that is capable and configured to move the platform unit in a forward and backward motion along the X-axis. It can further be appreciated that in some embodiments a different rotator mechanism can be used in place of the tray motor that is capable and configured to rotate the pizza crust or any support structure the pizza crust is placed thereupon. In some alternative embodiments, a linear mechanism rather than the rotator mechanism can be used to move the pizza crust during the dispensing operation (like for example using a conveyor or back and forth linear platform)

Referring to FIGS. 20-26, the sauce dispenser assembly 90 can be utilized and operated independently of the unit 12 and/or the cheese dispenser assembly 130, the slicer assembly 190, the catch tray 40, the platform moving assembly 50 and/or the cooling unit 240 or any combination thereof.

In the exemplary, it can be appreciated that the sauce dispenser assembly 90 can be removably received in the unit 12 and is configured to dispense a sauce 4 on to the pizza crust 2 supported on the pizza tray 62, which is supported by the tray support platform 58, and which is supported by the platform unit 52. It can be appreciated that the sauce dispenser assembly 90 can be a module configured to be placed in different locations in the unit 12, and can include modular components for repair and/or upgrading to other components.

Figures 26, 27:
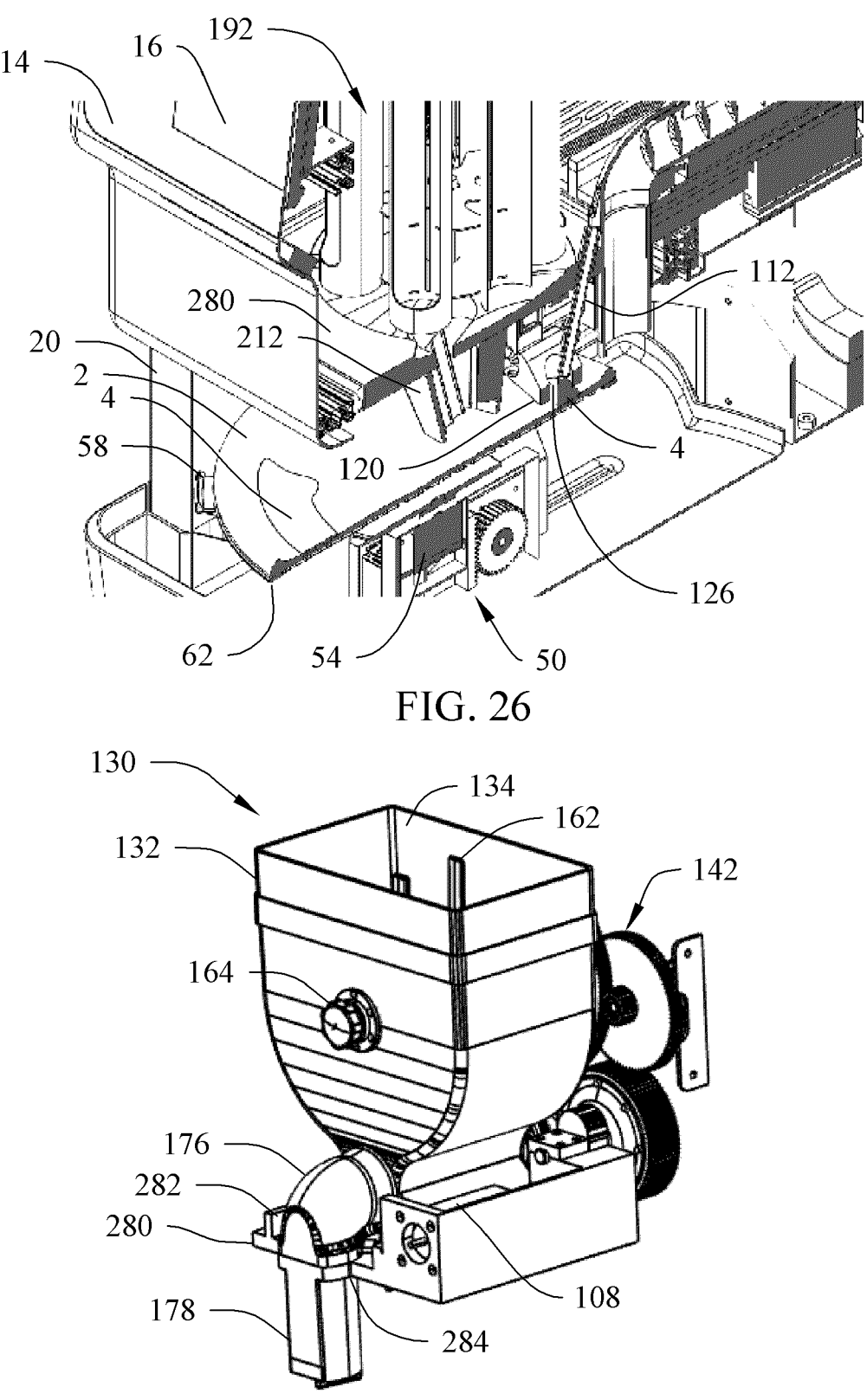
FIG. 26 is a longitudinal cross-sectional perspective view of the sauce dispenser assembly showing sauce dispensed through the sauce spreader nozzle on to the pizza crust.
FIG. 27 is a front perspective view of the cheese dispenser assembly of the present technology.
Figure 28:
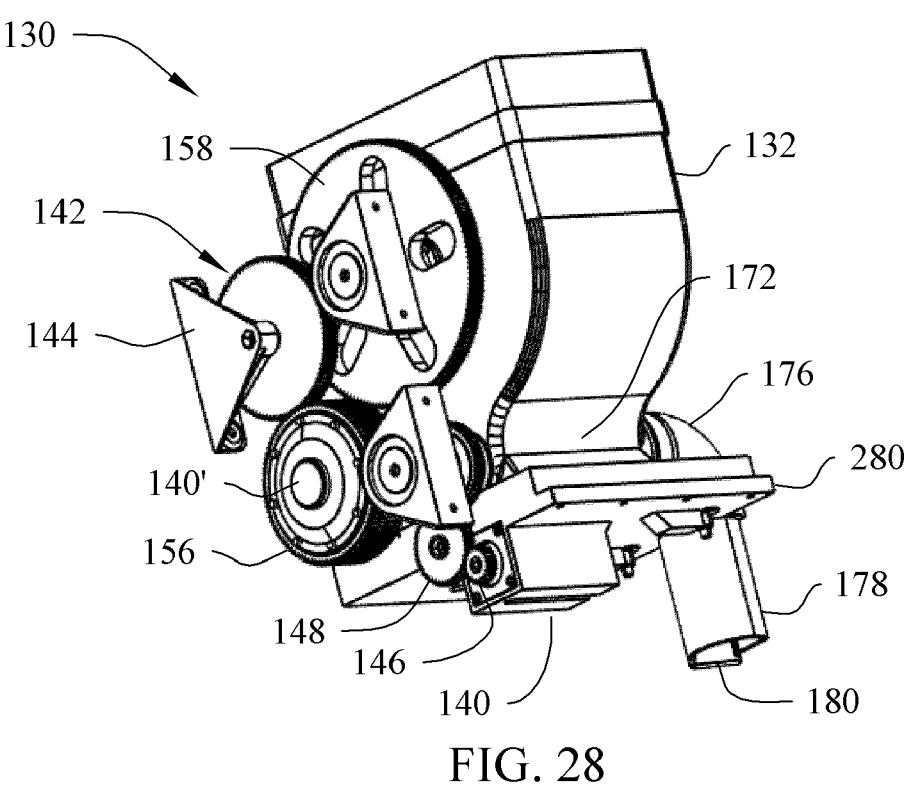
FIG. 28 is a rear perspective view of the cheese dispenser assembly of the present technology.
Figure 29:
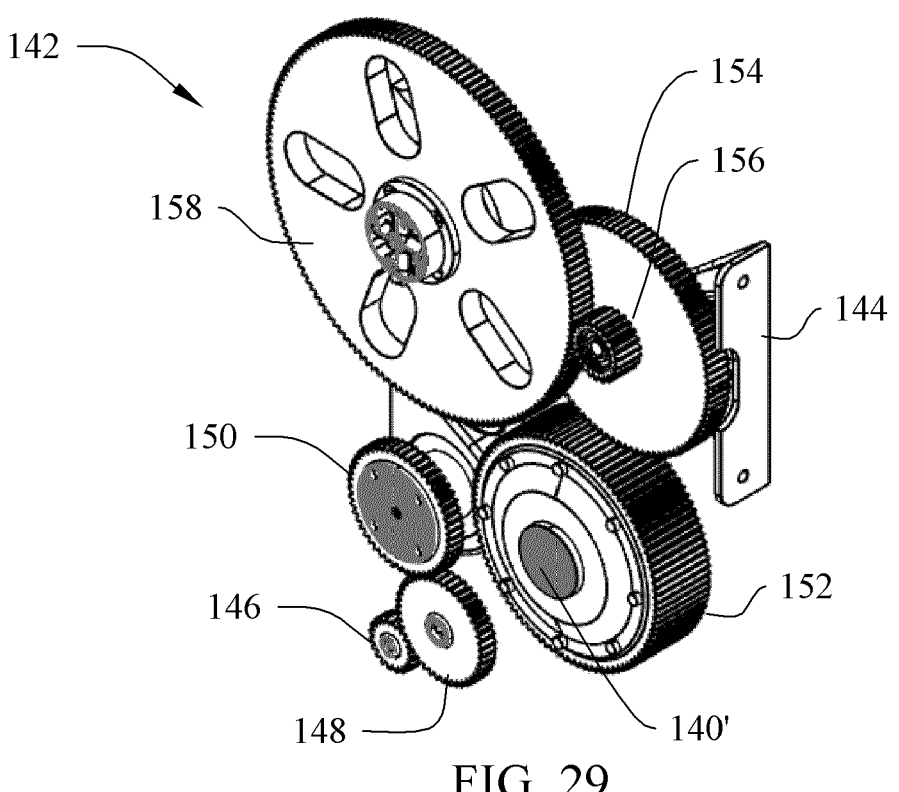
FIG. 29 is a perspective view of the gear assembly of the cheese dispenser assembly.

The sauce dispenser assembly 90 can include a sauce container 92 featuring an internal cavity 94 configured to receive and store the sauce 4. The sauce container 92 can include one or more mounting members 96 that extend from an exterior of the sauce container 92. The mounting members 96 can be configured to engage with or be receive in the tracks 28 of corresponding frame members 26, thereby supporting and/or positioning the sauce container 92 in a predetermined location within the unit 12. Further, a support frame 280 can be utilized to provide a predetermined location section for receiving and supporting the sauce motor 108 of the sauce dispenser assembly 90, as best illustrated in FIG. 27.

A sauce tube holder 98 can be positioned on a top section of the sauce container 92 for recirculating sauce back into the internal cavity 94 or recirculating cleaning fluid.

Figures 21, 22:
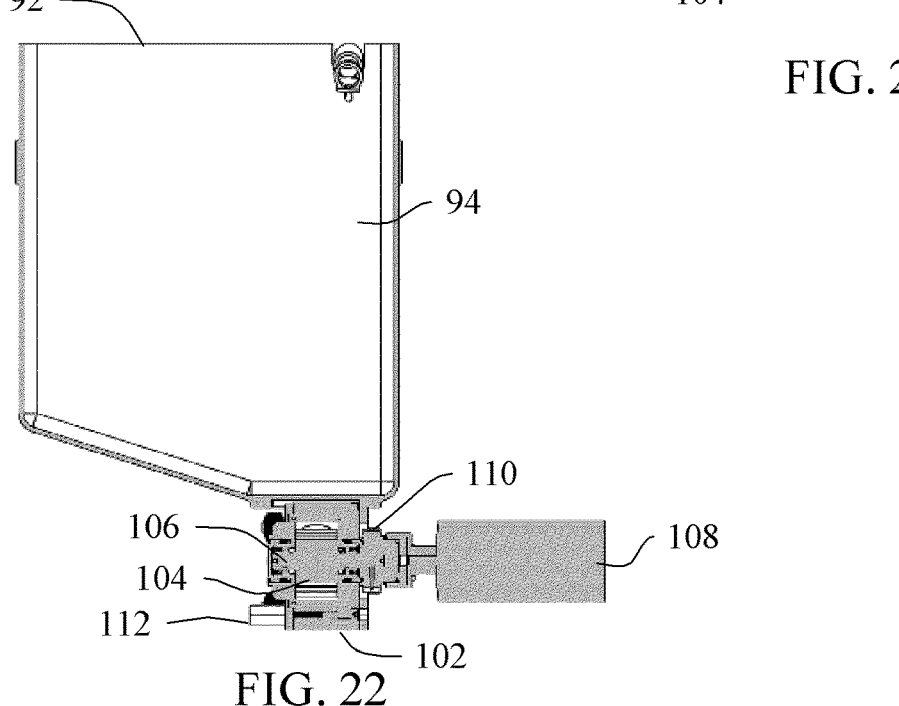
FIG. 21 is a lateral cross-sectional perspective view of the sauce dispenser assembly of the present technology.
FIG. 22 is a cross-sectional view of the sauce dispenser assembly of the present technology.
Figure 23:
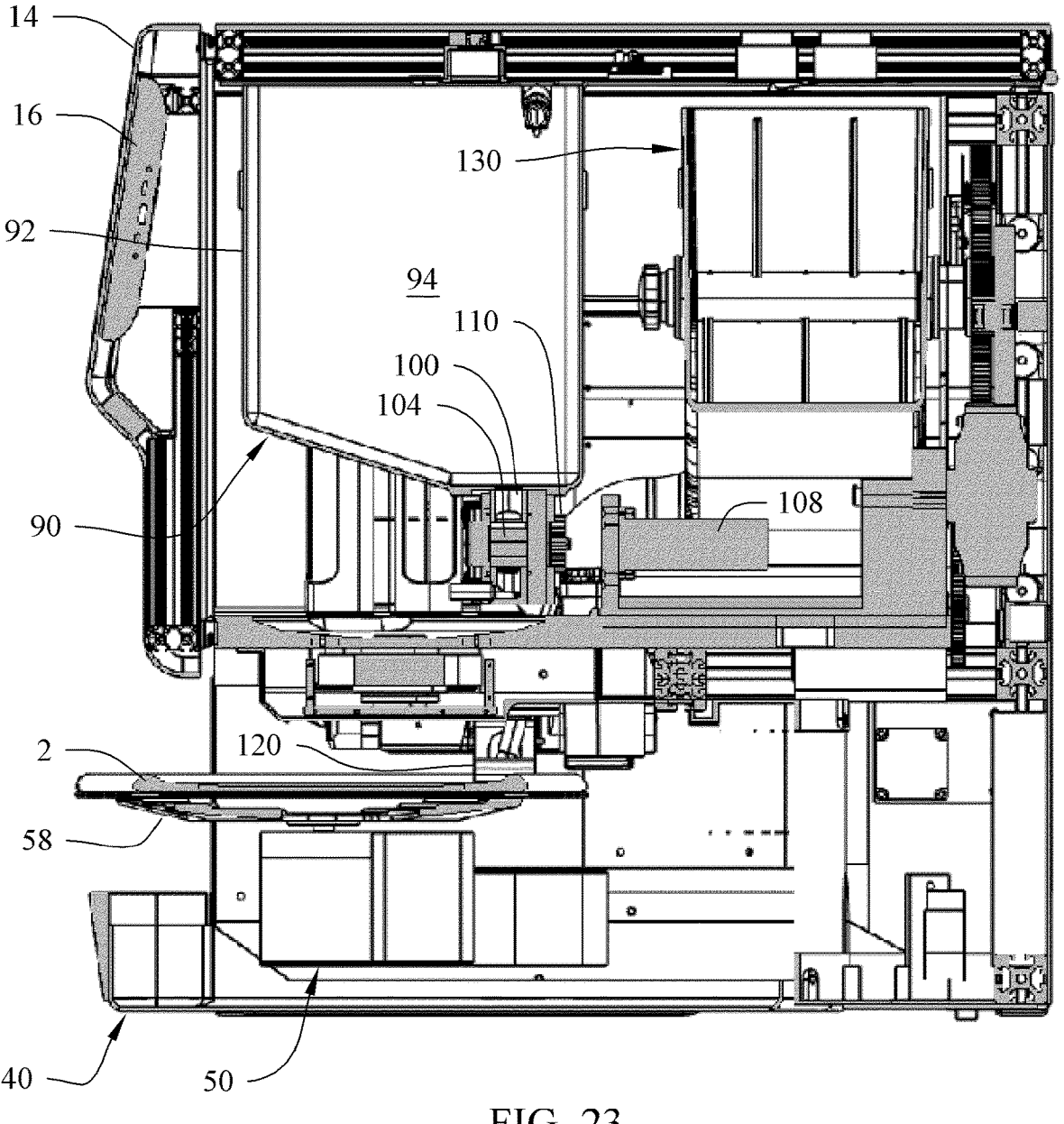
FIG. 23 is a longitudinal cross-sectional view of the automated food article making system showing the sauce dispenser assembly.

A sauce motor 108 is operatively coupled with a sauce pump unit 102 and configured to rotate impellers 104. Sauce stored in the internal cavity 94 enters the sauce pump unit 102 by way of an inlet 100, as best illustrated in FIG. 21. The sauce motor 108 can be connected to impeller shafts 106 associated with each impeller 104 by way of a pump gear 110. The pump gear 110 can be configured to rotate the impellers 104 in a counter rotating manner thereby drawing sauce from the inlet 100 into the sauce pump unit 102 and pumping the sauce out a discharge channel or tube 112, as best illustrated in FIGS. 21-23.

Figure 25:
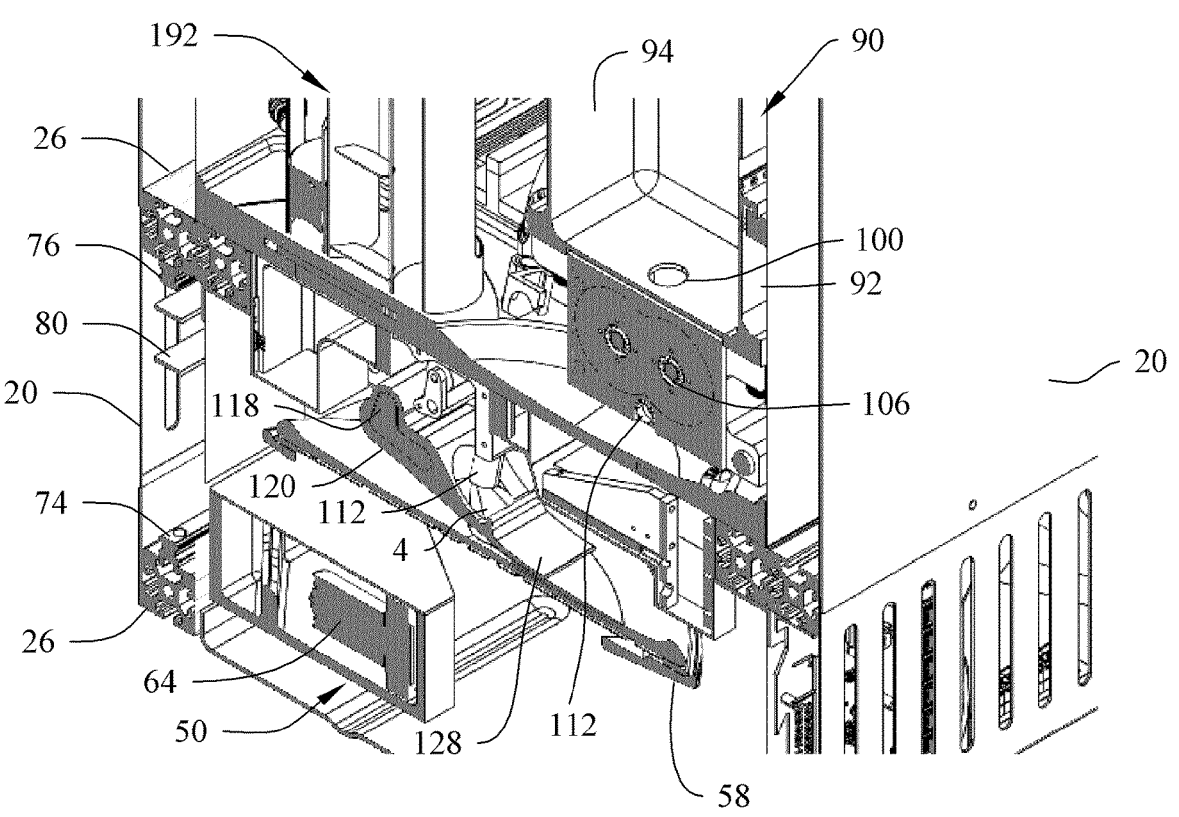
FIG. 25 is a lateral cross-sectional perspective view of the sauce dispenser assembly showing sauce dispensed through the sauce spreader nozzle on to the pizza crust.
Figure 24:
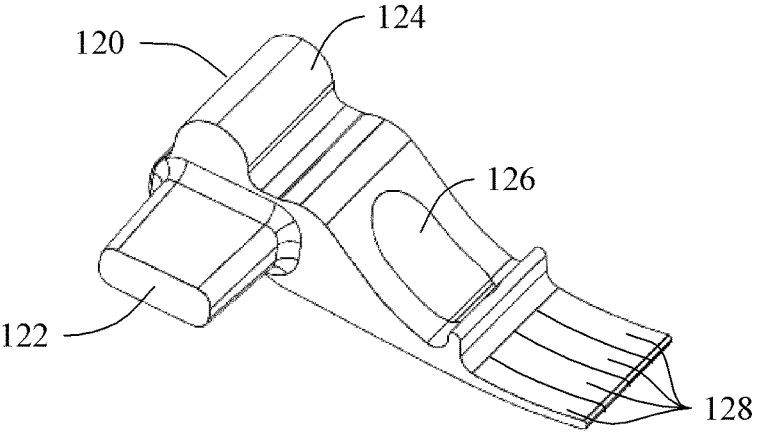
FIG. 24 is a front perspective view of the sauce spreader of the sauce dispenser assembly.

The discharge tube 112 can be orientated to a sauce dispensing location over the pizza the crust when in the operational configuration. A sauce spreader 120, as best illustrated in FIGS. 24-26, can be utilized to assist in spreading the sauce 4 dispensed from the discharge tube 112 on to the pizza crust 2 rotating therebelow. The sauce spreader 120 can include an activation section 122 and an attachment section 124 that can be configured to pivot the sauce spreader 120 in relation to the sauce dispenser assembly 90. It can be appreciated that the sauce spreader 120 can be located at a location separate to that of the sauce dispenser assembly 90 to further assist in the compact nature of the unit 12.

The sauce spreader 120 can further include a discharge tube opening 126 and one or more spreader pads 128. The discharge tube opening 126 can be configured to receive an end section of the discharge tube 112 upstream of the spreader pads 128. The spreader pads 128 can be a single pad or multiple independently flexible pads that can flex in response to variations of or objects on the pizza crust 2, as best illustrated in FIG. 25. The sauce spreader 120 can be made from, but not limited to, silicone, rubber, plastics, metals and the like.

In an exemplary operable use, the pizza crust 2 is positioned under the sauce spreader 120 by way of the platform moving assembly 50. The platform moving assembly 50 can then raise the pizza crust 2 via the platform motor and gear arrangement 64 so that the pizza crust 2 contacts the spreader pads 128, while the tray motor 54 rotates the pizza crust 2. The sauce motor 108 can be activated and configure to counter rotate the impellers 104 to pump the sauce 4 from the internal cavity 94 and into the discharge tube 112. The dispensing end of the discharge tube 112 can be positioned through the discharge tube opening 126 of the sauce spreader 120 so that the sauce 4 is dispensed upstream of the spreader pads 128 and on to the top of the pizza crust 2 while the pizza crust is rotated.

The spreader pads 128 can evenly spread the dispensed sauce 4 onto the pizza crust, while the platform moving assembly 50 adjusts the horizontal (X-axis) position of the pizza crust 2 in relation to the sauce spreader 120. The spreader pads 128 can have a spatula-like configuration which pushes down on the rotating pizza crust 2 and serves to spread out the sauce 4 being dispensed. The sauce spreader 120 can be orientated at a first position where the sauce spreader 120 is raised and disabled, and a second position where the sauce spreader 120 is lowered at an angle to the horizontal X-axis.

The adjustment of the horizontal location of the pizza crust 2 allows for the sauce 4 to be dispensed and spread on to the entire or predetermined top surface of the pizza crust 2. Pumping rotation of the sauce motor 108 for the sauce 4 can be calibrated each time according to the weight of the pizza curst 2 with sauce 4 spread thereon as monitored by the weight sensor 68.

Figure 20:
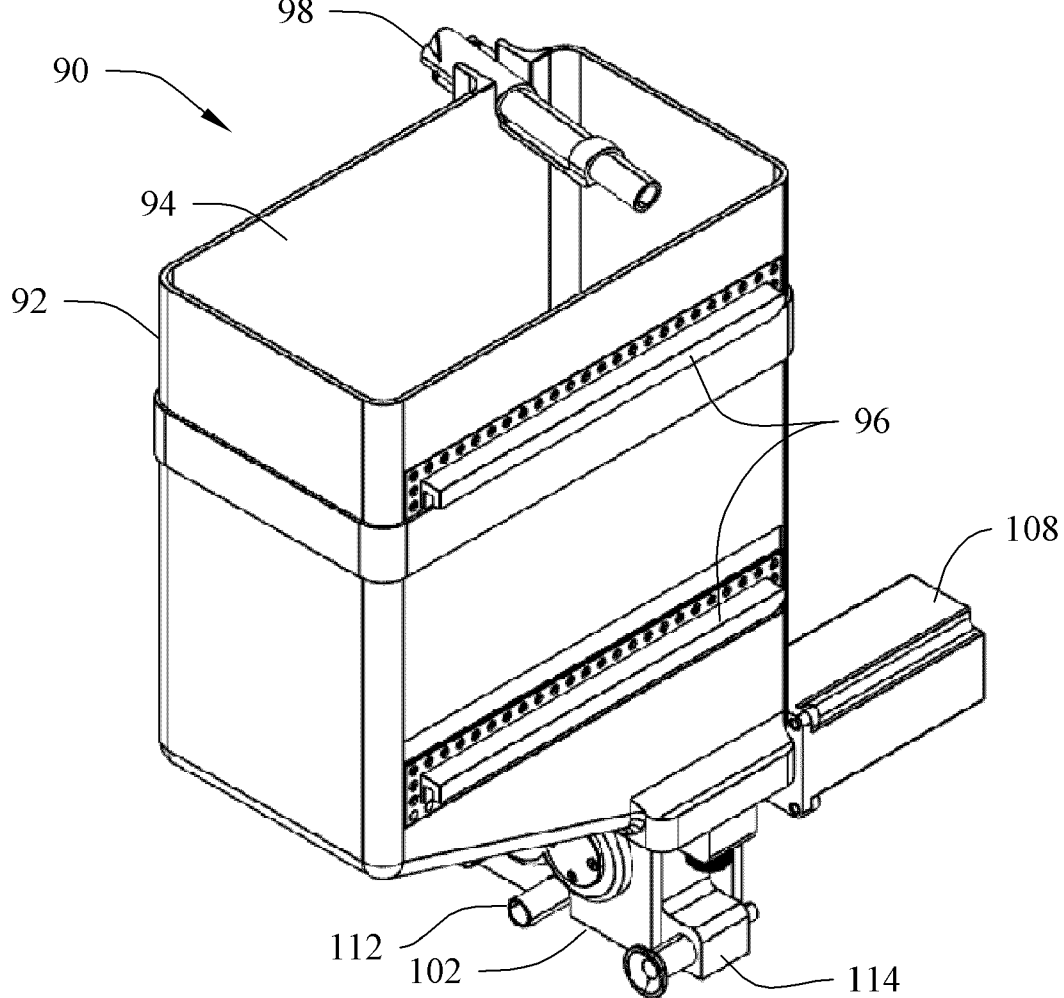
FIG. 20 is a front perspective view of the sauce dispenser assembly of the present technology.

A motorized vibration device 114, as best illustrated in FIG. 20, can be utilized to assist in movement of the sauce 4 from the sauce pump unit 102 and/or the discharge tube 112 and/or the sauce spreader 120. Still further, a biasing element, servo motor or stepper motor 118, as best illustrated in FIG. 25, can be utilized to pivot the sauce spreader 120 so that the spreader pads 128 contact the pizza crust 2 rotating therebelow. To provide a sufficient contact pressure between the spreader pads 128 and the pizza crust 2 or a sufficient space between the spreader pads 128 and the pizza crust 2, the vertical position (Z-axis) of the pizza crust 2 can be adjusted by way of operation of the platform motor and gear arrangement 64 and or the angle of the sauce spreader 120 can be adjust utilizing the stepper motor 118.

In the exemplary, the pressure on the "smearing spatula" or sauce spreader 120 can depend by a viscosity of the sauce 4. The angle and height to a surface of the pizza crust 2 can be different for different types of sauces. Accordingly, this can mean that the present technology is capable and configurable to adjust a change of sauce being used, for example from a different supplier, in the sauce dispenser assembly 90. Data relating to sauce characteristics and/or parameters from different types of sauces can be store on the machine memory or in a remote database accessible by the computer system 300 of the present technology.

It can be appreciated that the stepper motor 118 controls the angle of the sauce spreader pads 120 in relation to the pizza crust 2. Controlling the angle of the sauce spreader can be provided to sufficiently spread sauces of different density, consistency, types, etc. Because with different pressure of spatula or sauce spreader it is smeared in different ways. The vertical position adjustment of the pizza crust 2 can be provided based on thickness data of the pizza crust 2 as determined by an image or time-of-flight (ToF) sensor 290, which helps to keep the same pressure of the spreader pads 128 for every type of pizza crust 2. In some embodiments, other range finders can be used instead of a ToF sensor. In the exemplary, a scan of the pizza crust 2 by the ToF sensor 290 to obtain thickness data and/or topographical data of the pizza crust 2 can be obtained to assist in calibrating the sauce dispensing assembly 90 for proper horizontal positioning of the pizza crust 2, vertical positioning of the pizza crust 2 and/or angle of the sauce spreader 120 in relation to the pizza crust 2.

Sauce smearing spreader 120 is pivotable at a proximal end opposite the distal end between an idle configuration (first configuration) and the spatula-like configuration (second configuration) by server/stepper motor 118. In the spatula-like configuration, spreader pad(s) 128 are contacting with and pressing down on the upper surface of the pizza crust by operation of the motor. Computer 300 or other controller can be configured to control the platform moveable assembly to adjust the height of platform according to the thickness data associated with pizza crust 2 such that the sauce spreader angle of inclination to pizza crust 2 surface, spreader pad(s) position, and/or spreader pad pressing force on the pizza crust surface is/are maintained in their normal operating range or in substantially the same operating range irrespective of whether the thickness of pizza crust 2 on the platform 52 is a smaller thickness or a larger thickness than an average thickness or predefined thickness for which sauce spreader 120 is normally configured to operate. In some embodiments, the amount of required adjustment of the height of the platform 52 according to the thickness data can be predetermined during system calibration for pizza crusts with regular thickness, smaller thickness and larger thickness.

It can further be appreciated that the controlling of the angle of the sauce spreader 120 and/or the vertical height of the pizza crust 2 in relation to the discharge tube 112 can be based on weight data from the weight sensor 68 and/or any other sensors capable or configured to determine amount of sauce 4 being applied to the pizza crust 2. In the exemplary, weight data of the pizza crust 2 by the weight sensor 68 can be obtained to assist in calibrating the sauce dispensing assembly 90 for proper horizontal positioning of the pizza crust 2, vertical positioning of the pizza crust 2 and/or angle of the sauce spreader 120 in relation to the pizza crust 2.

Referring to FIGS. 27-33, the cheese dispenser assembly 130 can be utilized and operated independently of the unit 12 and/or the sauce dispenser assembly 90, the slicer assembly 190, the catch tray 40, the platform moving assembly 50 and/or the cooling unit 240 or any combination thereof.

In the exemplary, it can be appreciated that the cheese dispenser assembly 130 can be removably received in the unit 12 and is configured to dispense a shredded cheese 6 on to the pizza crust 2 supported on the pizza tray 62, which is supported by the tray support platform 58, and which is supported by the platform unit 52. It can be appreciated that the cheese dispenser assembly 130 can be a module configured to be placed in different locations in the unit 12, and can include modular components for repair and/or upgrading to other components.

The cheese dispenser assembly 130 can include a cheese container 132 featuring an internal cavity 134, a gear train assembly 142, a mixer unit including mixing paddles 162 and a mixer motor 140' and a cheese nozzle or spreader 178.

Figure 34:
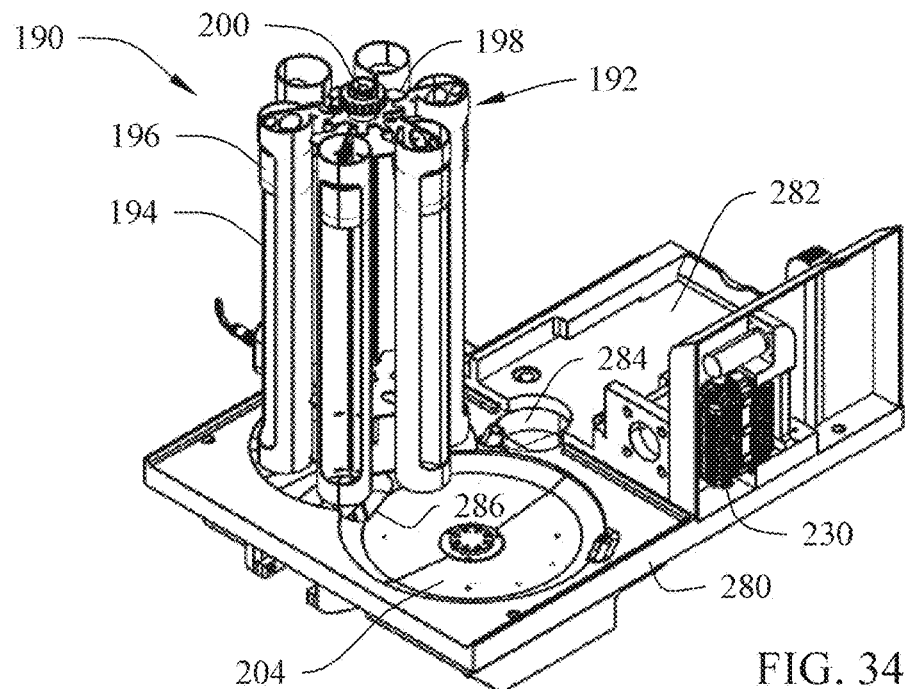
FIG. 34 is a front perspective view of the slicer assembly of the present technology.
Figure 35:
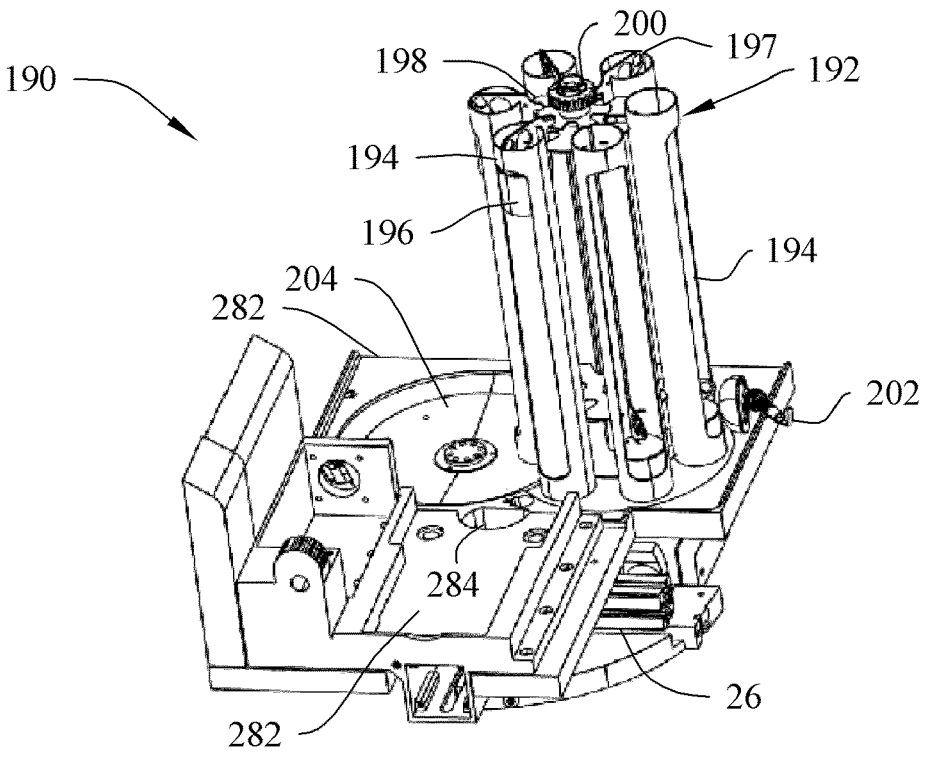
FIG. 35 is a rear perspective view of the slicer assembly of the present technology.

The internal cavity 134 can be configured to receive and store the shredded cheese 6. One or more mounting members can extend from an exterior of the cheese container 132 that can be configured to engage with or be receive in the tracks 28 of corresponding frame members 26, thereby supporting and/or positioning the cheese dispenser assembly 130 in a predetermined location within the unit 12. Further, the support frame 280 can be utilized to provide a predetermined location section 282 for receiving and supporting the cheese dispenser assembly 130, as best illustrated in FIG. 34.

An auger motor 140, as best illustrated in FIGS. 28 and 30-32, can be operatively arranged to drive gears of the gear train assembly 142, which in turn operates the paddles 162 and a feed auger 170. The auger motor 140 and the gear train 142 are located exterior of the cheese container 132, with the gear train 142 being located on a rear side of the cheese container 132. The auger motor 140 is operably coupled to a drive gear 146 that is engageable with a first transfer gear 148 that is engageable with an auger gear 150. The drive gear 146 can have a diameter less than the first transfer gear 148 and/or the auger gear 150.

The mixer motor 140' is configured to drive a second transfer gear 152 that is engageable with a reducing transfer gear 154. The second transfer gear 152 can have a diameter greater than the auger gear 150. The reducing transfer gear 154 includes a pinion gear 156 that is engageable with a paddle gear 158, with the pinion gear 156 having a diameter less than a diameter of the reducing transfer gear 154. The paddle gear 158 can have a diameter greater than the reducing transfer gear 154 and/or the second transfer gear 152 and/or the auger gear 150 and/or the first transfer gear 148 and/or the drive gear 146.

In some embodiments, a minimum force of applied by the mixing paddles 162 of the cheese mixer can be for example about −300 kg/cm, or other force sufficient to mix the type of shredded cheese in the cheese container 132.

One or more gear mounting brackets 144 can be utilized to support any of the gears in the gear train 142 to the cheese dispenser assembly 130, to the frame members 26 or one of the panels of the unit 12.

Figure 30:
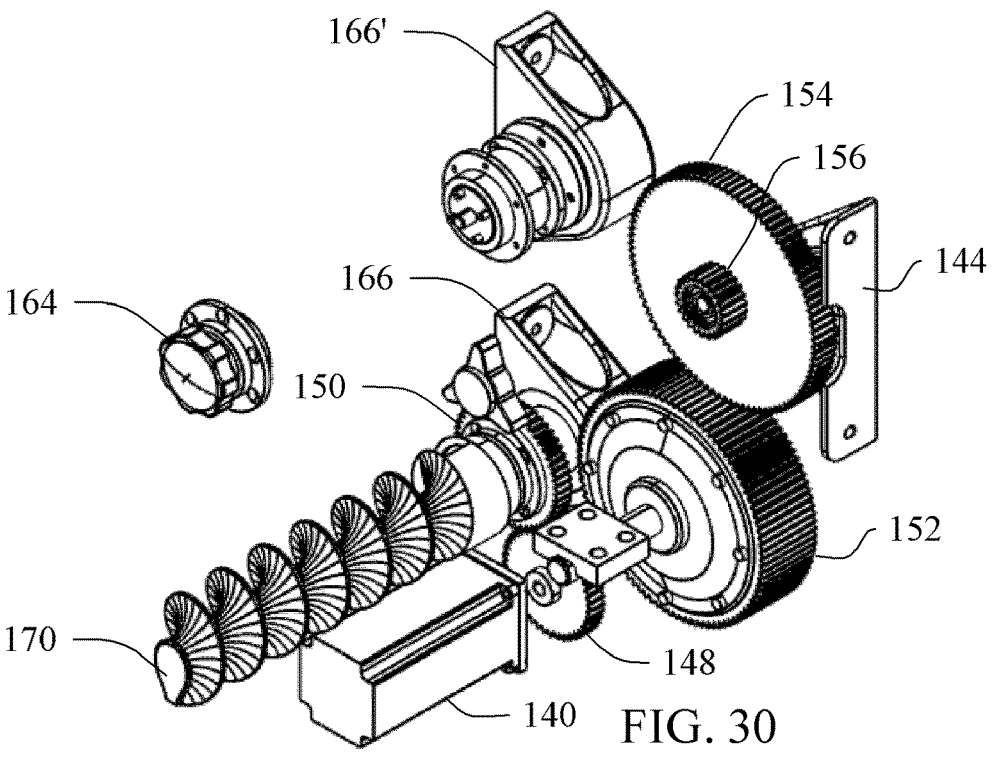
FIG. 30 is a perspective view of the auger and motor utilized with the gear assembly of the cheese dispenser assembly.
Figure 32:
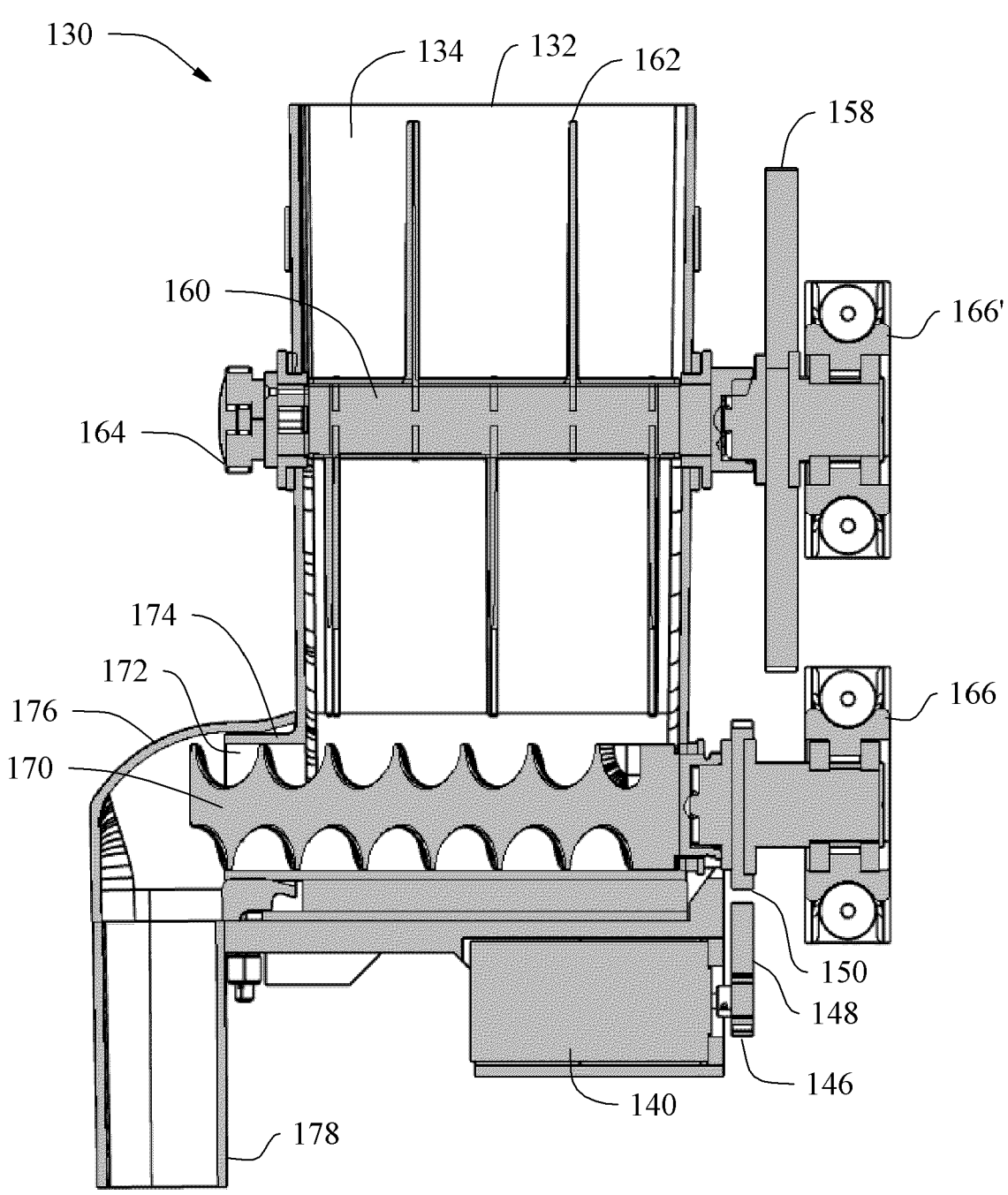
FIG. 32 is a longitudinal cross-sectional view of the cheese dispenser assembly.

As best illustrated in FIGS. 30 and 32, a first bearing mechanism 166 can be utilized to control the engaging or disengaging of the auger 170 with the auger gear 150. A second bearing mechanism 166' can be utilized to control the engaging or disengaging of a paddle shaft 160 with the paddle gear 158. Further, the first and second bearing mechanisms 166, 166' can be utilized to support the auger gear 150 and the paddle gear 158 to the cheese dispenser assembly 130, to the frame members 26 or one of the panels of the unit 12, respectively. It can be appreciated that the first and second bearing mechanisms 166, 166' can each include a clutch to control the power provided to the auger 170 and paddle shaft 160, respectively.

The paddle shaft 160 extends from the second bearing mechanism 166' through the cheese container 132, with the paddles 162 extending from the paddle shaft 160 in the internal cavity 134. A paddle shaft bearing cap 164 can be utilized in a front section of the cheese container 132 to receive an end of the paddle shaft 160 and rotatably support the paddle shaft. The paddles 162 can be multiple offset paddles that extend from the paddle shaft 160 in different directions. The paddles 162 can be configured to rotate within the internal cavity 134 and configured to mix the shredded cheese stored in the cheese container 132.

Figure 31:
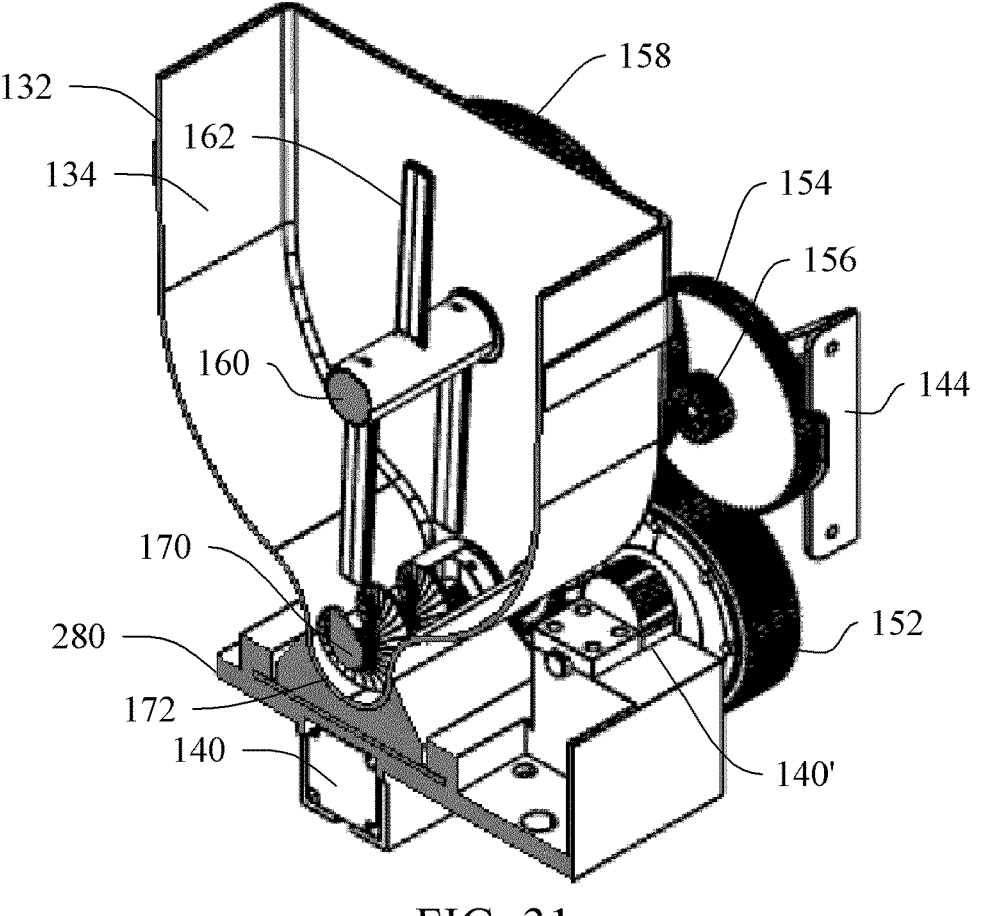
FIG. 31 is a lateral cross-sectional view of the cheese dispenser assembly.

As best illustrated in FIG. 32, the auger 170 extends from the first bearing mechanism 166 into an auger cavity 172 of the cheese container 132, as best illustrated in FIGS. 31 and 32. The auger cavity 172 can have a portion shaped to rotatably receive the auger 170 therein, with an opened top that is in communication with the internal cavity 134. Shredded cheese stored in the cheese container 132 can inherently fall toward the auger cavity 172, while rotation of the auger 170 advances portions of shredded cheese from the cheese container 132 toward an auger cavity output 174.

An auger cavity output 174 can extend from the cheese container 132, and a pipe joint 176 can be attachable to the auger cavity output 174. The cheese spreader 178 can extend from the pipe joint 176 in a direction toward the pizza crust 2 positioned therebelow.

Figure 33:
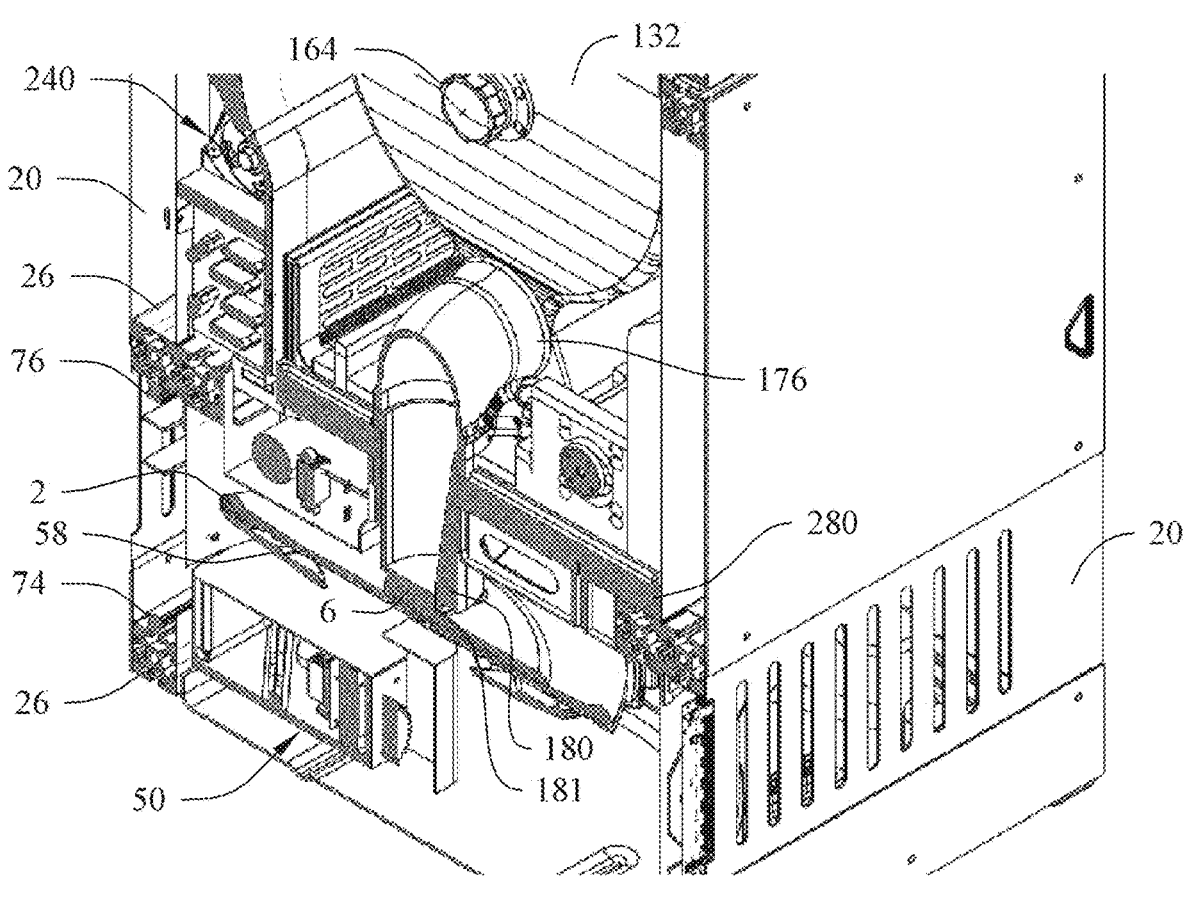
FIG. 33 is a lateral cross-sectional perspective view of the automated food article making system showing cheese dispensed through the cheese spreader nozzle on to the pizza crust.

The cheese spreader 178 can be shaped as a tubular nozzle with an enlarged section or an angle internal lip 180, as best illustrated in FIG. 33. The internal lip 180 can decrease a size of an internal channel so that an exit opening of the cheese spreader 178 has a size less than an entrance opening that receives shredded cheese from the pipe joint 176. The pipe joint 176 and/or the cheese spreader 178 can be made from, but not limited to, silicon, rubber, plastics, metals and the like.

Further, the cheese spreader 178 can include a tail 181 extending down from the internal lip 180 that assists in evenly spreading out the cheese 6 on the pizza crust 2. The tail does not contact with the pizza crust 2, but can stay a little bit over it to spread out on the dough any clumps of cheese 6. The tail does not contact with the pizza crust 2, but stays a distance thereabove to create an air gap between the pizza crust and the tail. The air gap between the tail and pizza crust is sufficiently small to enable the tail to spread out clumps or hills of the cheese 6 formed upstream of the lip as a result of dispensing the cheese onto the dough through the discharge end opening of the cheese spreader. The distance between a discharge end of the cheese spreader 178 (and/or the tail 181) and the pizza crust can be adjusted by movement of the pizza crust 2 in the vertical direction, which can be based on the thickness of the pizza crust 2 from the ToF sensor 290. In some embodiments, other range finders can be used instead of a ToF.

In an exemplary operable use, the pizza crust 2 can be positioned under the cheese spreader 178 by way of the platform moving assembly 50. The platform moving assembly 50 can then raise the pizza crust 2 via the platform motor and gear arrangement 64 so that the pizza crust 2 is below and not in contact with the exit opening of the cheese spreader 178, while the tray motor 54 rotates the pizza crust 2. The auger motor 140 can be activated to rotatably operate the auger gear 150 that drives the auger 170, and the mixer motor 140' can be activated to rotatably operate the paddle gear 158 that drives the paddle shaft 160 and consequently rotates the paddles 162 to mix the shredded cheese stored in the cheese container 132. The paddles 162 can be rotated in different directions per a preset time schedule to prevent the shredded cheese 6 from sticking together in the cheese container 132. It can be appreciated that the reducing transfer gear 154 and the pinion gear 156 provide sufficient torque to the paddle shaft 160 to mix the cheese.

Shredded cheese is advance through the auger cavity 172 by way of the rotating auger 170. An inherent nature of the auger 170 can create pulses or sections of advancing cheese into the pipe joint 176 and down into the cheese spreader 178. To achieve a consistent dispensing of cheese 6 on to the pizza crust 2, the internal lip 180 of the cheese spreader 178 reduces the internal size of the cheese spreader 178 thereby creating a backlog of cheese in the cheese spreader 178 prior to exiting. Further in achieving a consistent dispensing of cheese 6 on to the pizza crust 2, the pizza crust 2 is not in contact with the cheese spreader 178, thereby creating a gap that permits a predetermined amount of cheese 6 to be spread on to the pizza crust 2, as best illustrated in FIG. 33.

The lip 180 or tail can evenly spread the dispensed cheese 6 onto the pizza crust 2, while the platform moving assembly 50 adjusts the horizontal (X-axis) position of the pizza crust 2 in relation to the cheese spreader 178. It can be appreciated that the pipe joint 176 and/or the cheese spreader 178 can be flexible so as avoid a jamming effect against the rotating pizza crust 2 if a hard or large portion of cheese 6 gets stuck in the gap between the pizza crust 2 and the cheese spreader 178.

The adjustment of the horizontal location of the pizza crust 2 allows for the cheese 6 to be dispensed and spread on to the entire or predetermined top surface of the pizza crust 2. Operation of the auger motor 140 and/or control of the first and second bearing mechanisms 166, 166' can be calibrated each time according to the weight of the pizza curst 2 with any combination of sauce 4 and/or cheese 6 spread thereon as monitored by the weight sensor 68. Further, for operation of the cheese dispenser assembly 130 the present system can precisely scan the thickness of the pizza crust 2 utilizing the ToF sensor 290 and vertically move the pizza tray 62 along the Z-axis to the proper position. In some embodiments, other range finders can be used instead of a ToF.

The slicer assembly 190, as best illustrated in FIGS. 34-43, can be utilized and operated independently of the unit 12 and/or the sauce dispenser assembly 90, the cheese dispenser assembly 130, the catch tray 40, the platform moving assembly 50 and/or the cooling unit 240 or any combination thereof.

The slicer assembly 190 can be utilized for slicing any food item 8 in a tubular-like or cylindrical-like shape such as, but not limited to, sausage, olives, salami, mushrooms, pickles, cucumbers, carrots, shallots, onions, garlic, tomatoes, cheese, pepperoni, and the like. After slicing, the slicer assembly 190 can be configured to lay or dispense the sliced food item on the pizza crust 2 supported on the pizza tray 62 that is supported on the tray support platform 58.

In the exemplary, the slicer assembly 190 can be removably attachable to the frame members 26 or the support frame 280 allowing the slicer assembly 190 to be removed for cleaning, repair or replacement. It can be appreciated that the slicer assembly 190 can be a module configured to be placed in different locations in the unit 12, and can include modular components for repair and/or upgrading to other components.

The slicer assembly 190 can include a food revolver 192 that includes multiple food tubes 194 that rotate and a disc blade 204. Rotation of the food revolvers 192 allows the feeding of a food item 8 on the disc blade 204. Slices of the food item 8 can fall down through a slice opening 286 on the pizza crust 2. A passing sensor can be utilized can configured to detect a pass of the food item slice 8. Computer vision can be utilized and configured to check the even spreading of the slices on the pizza crust 2. Electrical connections 234 can be utilized to connect electrical components of the slicer assembly 190 to other electrical components and/or control or computer system of the present technology.

Each revolver 192 can include a plurality of food tubes 194 featuring a first end accessible by opening the top panel 18 of the unit 12. Each of the revolvers 192 can be rotatably supported by a dispenser base 288 of the support frame 280 so that a second end of at least one of the food tubes 194 is positioned above the disc blade 204. The revolvers 192 can include multiple tube racks 198 configured to receive and secure the multiple food tubes 194. It can be appreciated that the food tubes 194 can be removable from their tube racks 198 for cleaning and/or replacement.

Each food tube 194 includes a hollow interior to receive the food item 8, and a weight 196 slidably received in the food tube 194. The weight 196 can be configured to press the food item 8 received in the food tube 194 toward a bottom opening of the food tube 194.

The weight 196 can further include a latch member 197 pivotably connected to the weight. The latch member can feature a detent that is engageable with and releasable from the tube rack 198. Each end of the revolver 192 can include a revolver drive gear 200 so that the revolver 192 can be placed in a vertical position in the slicer assembly 190 in either direction.

A recess can be defined in an end of the weight 196 that contacts the food item 8, with a needle that can extend from the pivoting latch member 197 and configured to pass through the weight 196 and into the recess. The needle can be configured to impale or hold the food item 8 in the recess of the weight 196. This allows to keep any leftover food item 8 not able to be cut by the disc blade 204 inside the food tube 194 for easy removal of the leftover from the food tube 194, as best illustrated in the enlarged section in FIG. 37.

The revolver 192 can be rotated simultaneously with rotation of the disc blade 204. The revolver 192 can be rotated by a revolver motor 208 and a cog or gear 210 that is engageable with the revolver drive gear 200. Upon rotation of the revolver 192 an end of the food item 8 will fall into a cutting opening defined adjacent to and above the disc blade 204. A size of the cutting opening or a distance from the food tube 194 and the disc blade 204 can be adjusted thereby controlling the thickness of the sliced food item 8.

Rotation of the disc blade 204 can be rotated by a disc motor 205. The disc blade 204 and disc motor 205 can be vertically adjusted to adjust the thickness of the sliced food item 8. This can be accomplished by a servo motor and rack gear system 207.

Upon placing a new food item 8 in any one of the food tubes 194, the computer system 300 can implement a setup slice thickness operation. After refilling the food tube 194 with a food time 8, a large cut of the bottom section of the food item 8 can be carried out to level an end surface of the food item 8. Consequently, this setup operation provides a clean portion of the food item that is sized equal to most of the remaining portion of the food item 8. This provides evenly thick slices to be obtained from the remaining portion of the food item 8. This setup operation further assists to setup slice thickness for different types of food items 8.

The continuous rotation of the revolver 192 and thus the food tube 194 allows for pressing the food item 8 against the rotating disc blade 204 thereby slicing the food item 8 to a predetermined thickness dependent on the vertical location of the disc blade 204. The weight 196 ensures that the food item 8 is always forced downward in the food tube 194 and thus always in a proper position for slicing by the disc blade 204 when that particular food tube 194 is rotated over the cutting opening.

After the food item 8 is sliced by the disc blade 204, the sliced food item then falls through a discharge opening 286 defined in the support frame 280, as best illustrated in FIG. 34. The discharge opening 286 can be configured to receive the sliced food item from the disc blade 204 and aligned with or offset with the second end of the food tube 194 positioned for a slicing operation.

Figure 36:
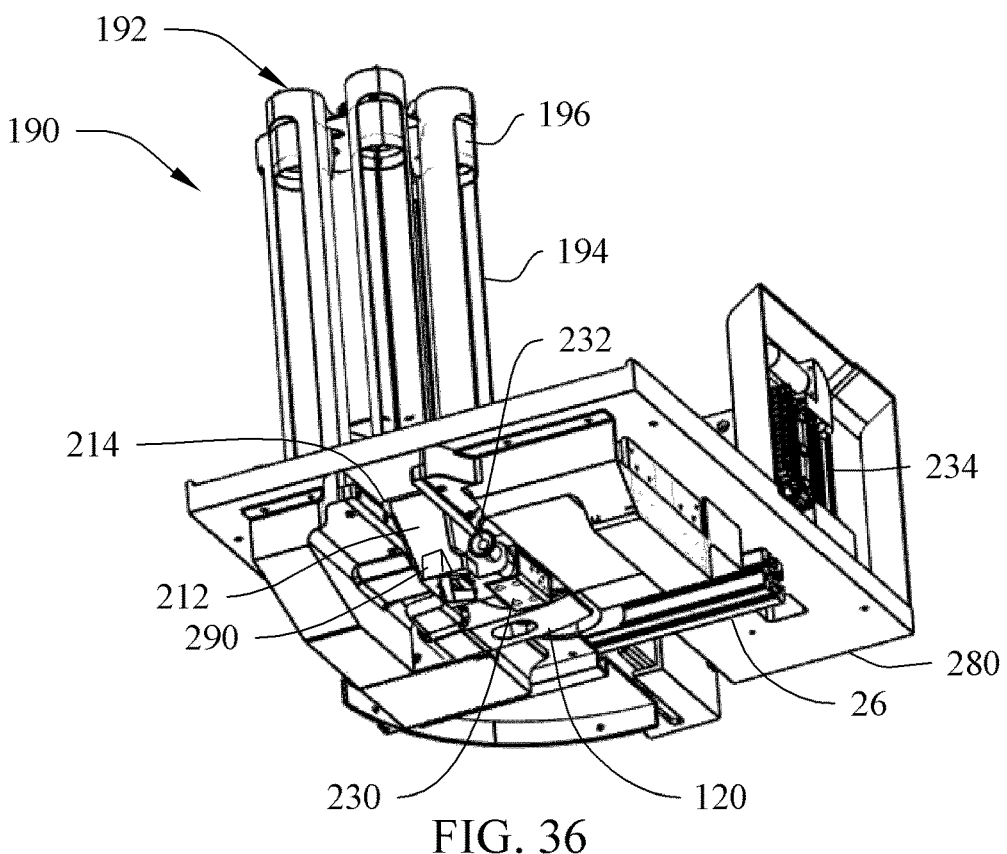
FIG. 36 is a bottom perspective view of the slicer assembly of the present technology.
Figure 42:
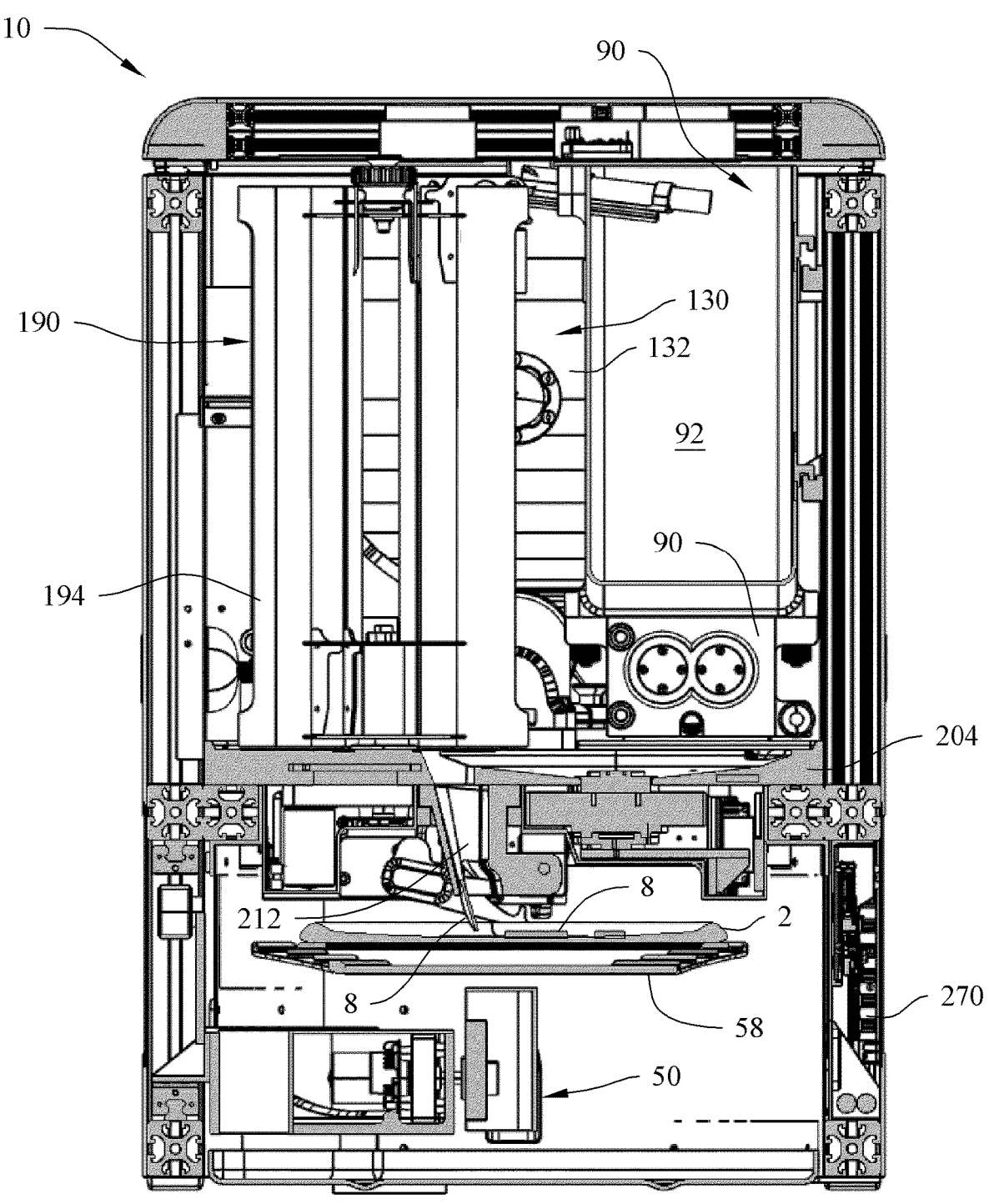
FIG. 42 is a lateral cross-sectional view of the sauce dispenser assembly showing pepperoni dispensed through the sliced food spreader nozzle on to the pizza crust.

A slicer nozzle or spreader 212 can be positioned below the disc blade 204 and below the discharge opening 286 to receive the sliced food item 8, as best illustrated in FIGS. 36 and 42. The slicer spreader 212 can be made from, but not limited to, silicon, rubber, plastics, metals and the like. The material of the slicer spreader 212 is preferred to provide a non-stick means so that the sliced food item does not stick thereto.

Figure 37:
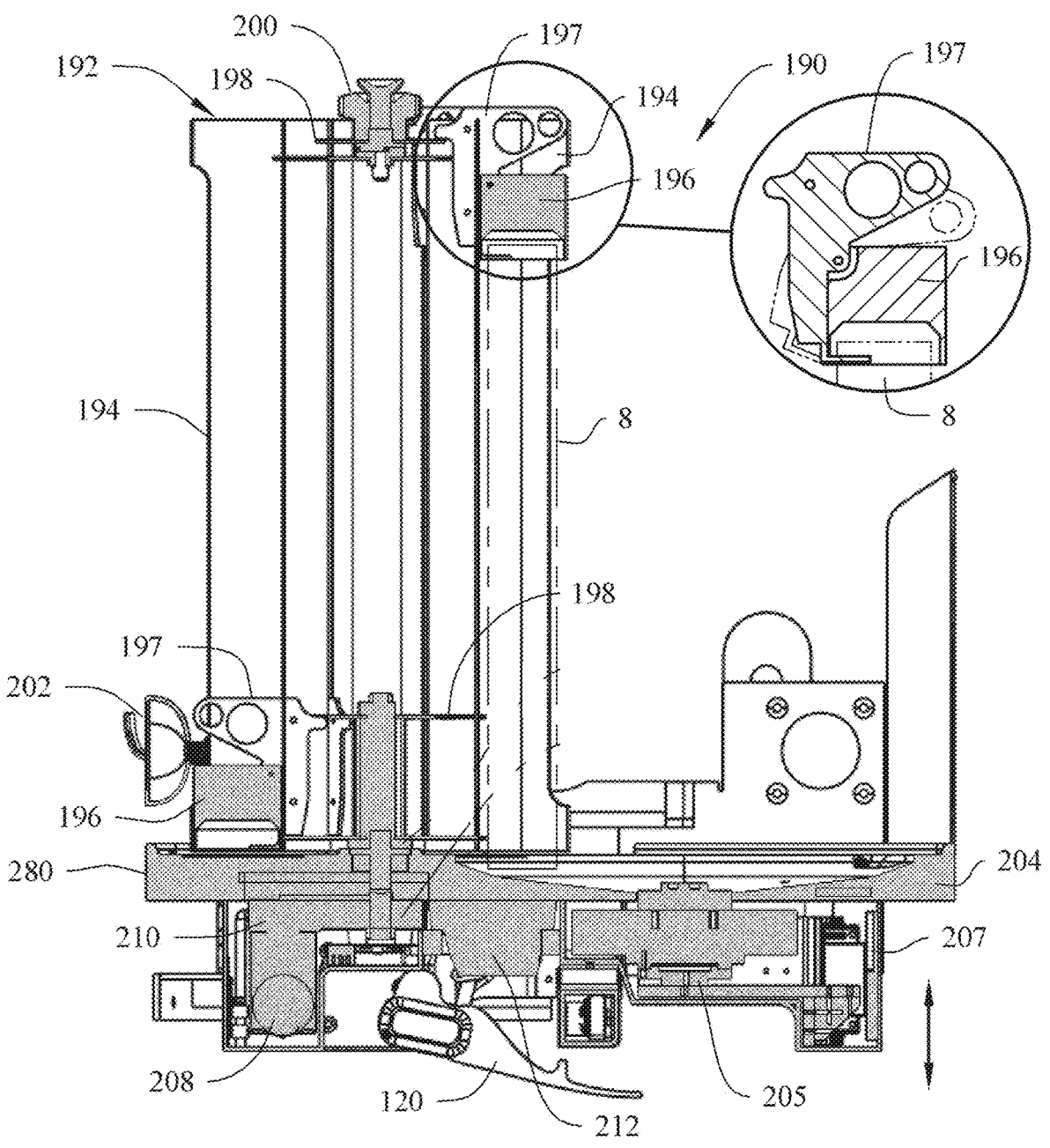
FIG. 37 is a lateral cross-sectional view of the slicer assembly down along a longitudinal axis of the food tubs showing a weight pressing against a food time toward the disc blade, and a weight down in an empty food tube. The enlarge portion of FIG. 29 shows the pivoting ability of the latch member with the needle impaled in the food item received in the recess of the weigh.
Figures 38, 39, 40, 41, 43:
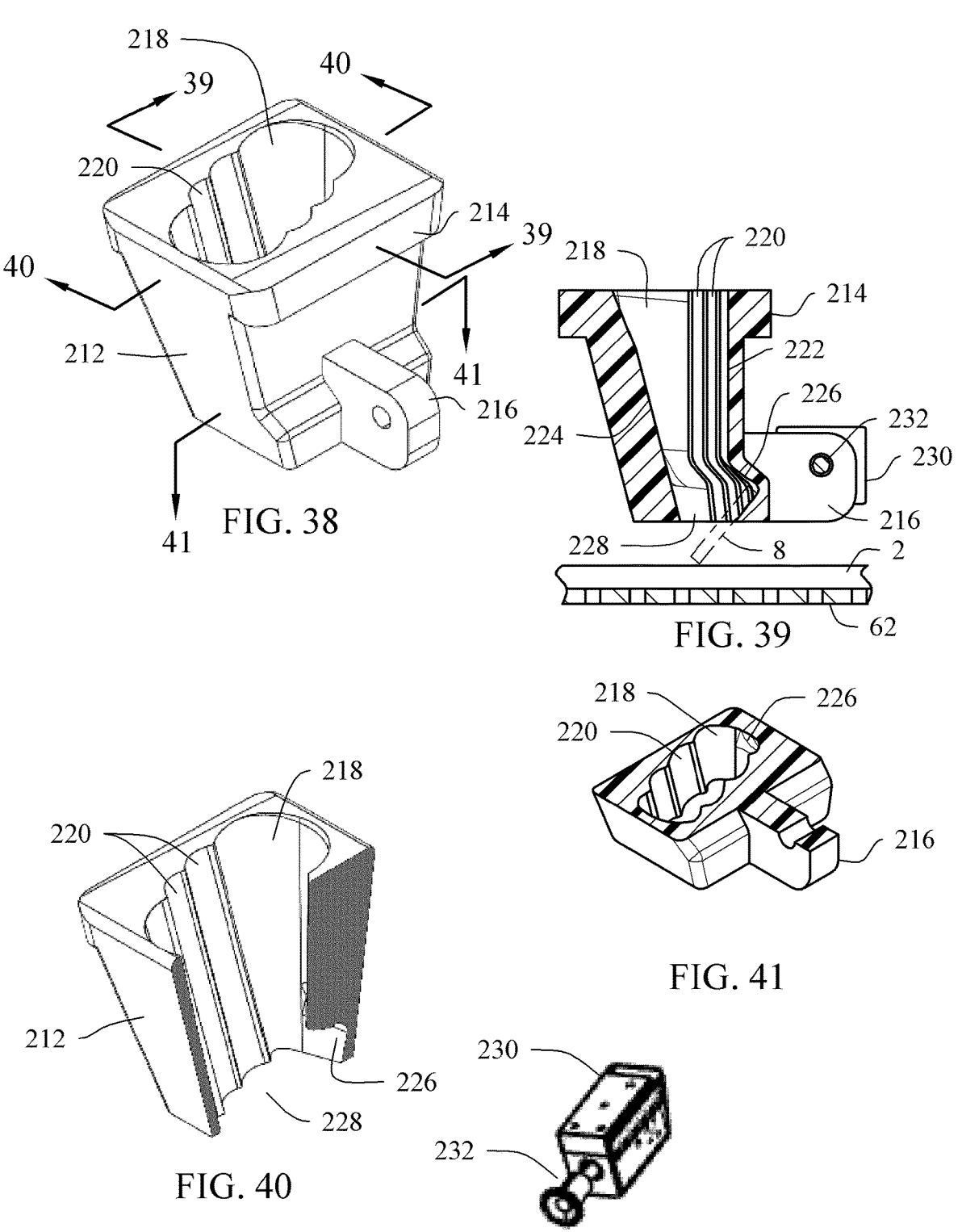
FIG. 38 is a perspective view of the sliced food spreader nozzle of the slicer assembly.
FIG. 39 is a cross-sectional view of the sliced food spreader nozzle taken along line 39-39 in FIG. 38.
FIG. 40 is a cross-sectional view of the sliced food spreader nozzle taken along line 40-40 in FIG. 38.
FIG. 41 is a cross-sectional view of the sliced food spreader nozzle taken along line 41-41 in FIG. 38.
FIG. 43 is a perspective view of the vibrator of the present technology.

The slicer spreader 212 can include ledges 214 configured to be received in tracks or grooves of the support frame 280, as best illustrated in FIGS. 36-38. The ledges can extend from an upper section of the slicer spreader 212. A vibrator extension 216 can extend from the slicer spreader 212 for engagement with a motorized vibration device 230.

Referring to FIGS. 38-41, a longitudinal slicer bore 218 can be defined through the slicer spreader 212. Multiple grooves or slots 220 can be defined in the bore 218. A first side 222 of the bore 218 can be substantially vertical, with an opposite second side 224 can be angled converging toward a discharge end 228 of the bore 218. An angled indention or notch 226 can be near the discharge end 228 of the bore 218. The notch 226 can be an enlarged area of the bore 218 defined by a pair of angled walls that concave outwardly from the bore 218.

The bore 218 can have a substantially oval shape with the slots 220 defined in both long sides or co-vortex sides of the bore 218. The widest part of the bore 218 is the entrance opening that receives the sliced food item 8 from the slice opening 286.

The motorized vibration device 230, as best illustrated in FIG. 43, includes a vibrating shaft 232 that is received in a bore defined through the vibrator extension 216 of the slicer spreader 212. When activated, the vibration device 230 imparts vibratory motion to the slicer spreader 212 to prevent the sliced food items 8 passing through the bore 218 from being stuck therein.

The slots 220 guide the sliced food items 8 down the bore 218 so that an edge of the sliced food item 8 is received in the notch 226 and contacts a lower most angle wall of the notch 226, thereby creating a pivot point for the sliced food item 8. Accordingly, the sliced food item 8 pivots about the notch with an edge of the food item 8 opposite the notch 226 landing on the pizza crust 2 therebelow. The rotational movement of the pizza crust 2 then pivots the sliced food item 8 so that it lands flat on the pizza crust, as best illustrated in FIGS. 39 and 42.

In an exemplary operable use, the pizza crust 2 can be positioned under the slicer spreader 212 by way of the platform moving assembly 50. The platform moving assembly 50 can then raise the pizza crust 2 via the platform motor and gear arrangement 64 so that the pizza crust 2 is below and not in contact with the discharge end 228 of the slicer spreader 212, while the tray motor 54 rotates the pizza crust 2. The disc motor 205 and the revolver motor 208 can be activated to rotatably operate the disc blade 204 and the revolver 192, respectively. The servo motor and rack gear system 207 can be operated to adjust the distance of the disc blade 204 and the discharge end of the food tube 194, thereby setting the thickness of the food item 8 to be sliced.

As the revolver 192 rotates, the weight 196 in each food tube 194 presses the food item 8 therein down toward the rotating disc blade 204, thereby cutting a slice of the food item 8, which then drops down the discharge opening 286 of the support frame 280 and enters the bore 218 of the slicer spreader 212.

As the sliced food item 8 falls down the slicer spreader 212, the slots 220 guide and position the sliced food item 8 so that an edge thereof is received in the notch 226 and pivots the sliced food item 8 for landing on the rotating pizza crust 2. At the same time the food item 8 travels through the bore 218, the motorized vibration device 230 vibrates the slicer spreader 212 to prevent the sliced food item 8 from being trapped in the bore 218.

The rotation of the pizza crust 2 and the pivoting action of the sliced food item 8 by the slicer spreader 212 can evenly spread the sliced food item 8 onto the pizza crust 2, while the platform moving assembly 50 adjusts the horizontal (X-axis) position of the pizza crust 2 in relation to the slicer spreader 212.

The adjustment of the horizontal location of the pizza crust 2 allows for the sliced food item 8 to be dispensed and spread on to the entire or predetermined top surface of the pizza crust 2. Operation of the disc motor 205, the revolver motor 208 and/or the servo motor and rack gear system 207 can be calibrated each time according to the weight of the pizza crust 2 with any combination of sauce 4, cheese 6 and/or sliced food items 8 spread thereon as monitored by the weight sensor 68.

Figures 44, 45:
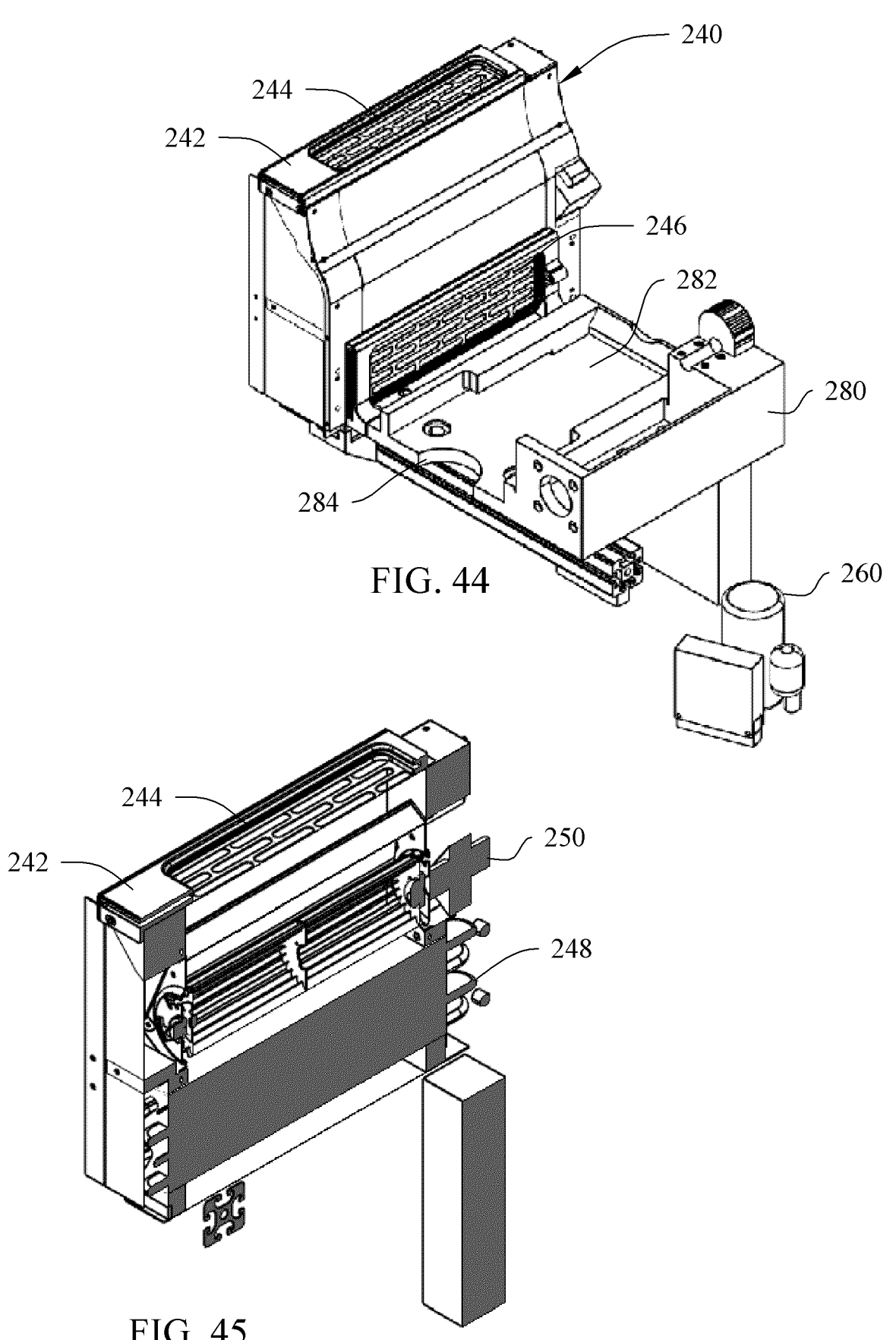
FIG. 44 is a front perspective view of the cooling assembly of the present technology.
FIG. 45 is a longitudinal cross-sectional perspective view of the cooling assembly of the present technology.

Referring to FIGS. 44 and 45, the cooling unit 240 can be associated with any or all of the unit 12, the sauce dispenser assembly 90, the cheese dispenser assembly 130, the slicer assembly 190.

In the exemplary, it can be appreciated that the cooling unit 240 can be a module configured to be placed in different locations in the unit 12, and can include modular components for repair and/or upgrading to other components. The cooling unit 240 can be configured to engage with or be receive in the tracks 28 of corresponding frame members 26, thereby supporting and/or positioning the cooling unit 240 in a predetermined location within the unit 12. Further, the support frame 280 can be utilized to provide a predetermined location section for receiving and supporting the cooling unit 240, as best illustrated in FIG. 44.

A cooling unit housing 242 can be configured to include an outlet 244 and an inlet 246 that can be perpendicular and below the outlet 244. Cooling coils 248 can be located in the cooling unit housing 242 adjacent the inlet 246, while a fan 250 located between the cooling coils 248 and the outlet 244 provides force air circulation across the cooling coils 248.

A compressor 260 provides compressed refrigerant to the cooling coils 248 to cool the air from the inlet 246 to be exhausted out the outlet 244, thereby providing cooled air to the interior of the unit 12.

Figure 46:
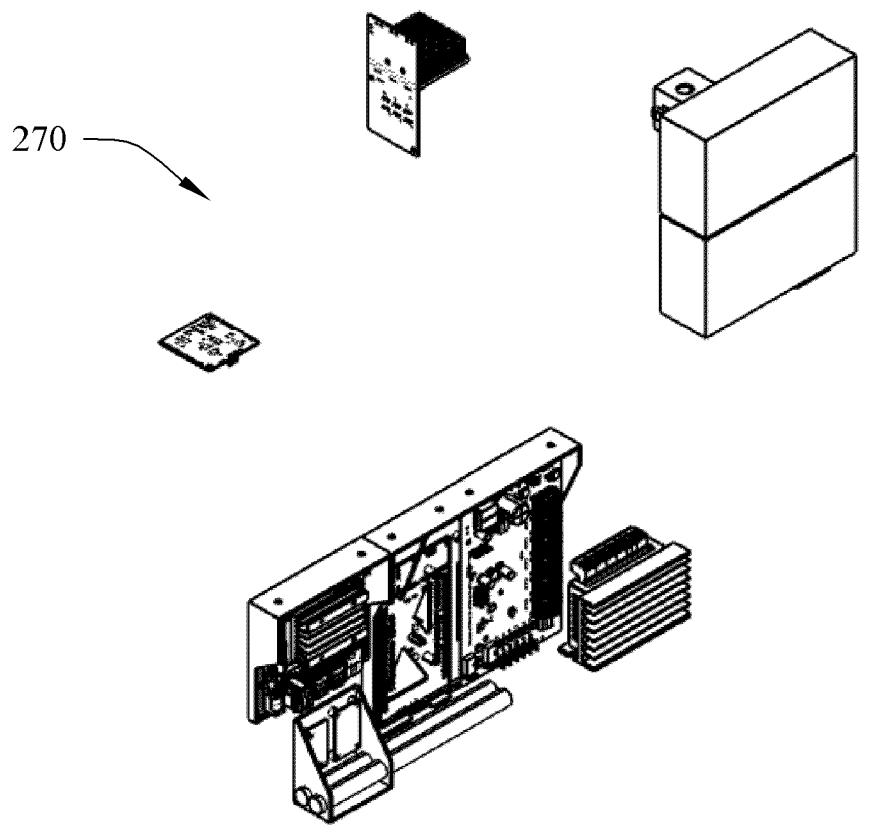
FIG. 46 is a perspective view of the electronic unit of the present technology.

The unit 12 can include electrical components 270 to provide operational functionality to all the units of the present technology, as best illustrated in FIG. 46.

The cheese dispenser assembly 130 can include a cheese container 132 featuring an internal cavity 134, a gear train assembly 142, mixing paddles 162 and a cheese nozzle or spreader 178.

The image sensor or time-of-flight (ToF) camera 290 can be positioned behind the slicer spreader 212 and configured to scanning the pizza crust 2. The ToF camera 290 can use infrared light (lasers invisible to human eyes) to determine depth information. The ToF camera 290 emits a light signal, which hits the pizza crust 2 and returns to the sensor. The time it takes to bounce back is then measured and provides depth-mapping capabilities. In some embodiments, other types of range finders and distance or thickness measuring systems can be used instead of a ToF, and the ToF or other range finders can be associated or implemented with any one of or any combination of the sauce dispenser assembly 50, the cheese dispenser assembly 130 and/or the slicer assembly 190.

Figure 47:
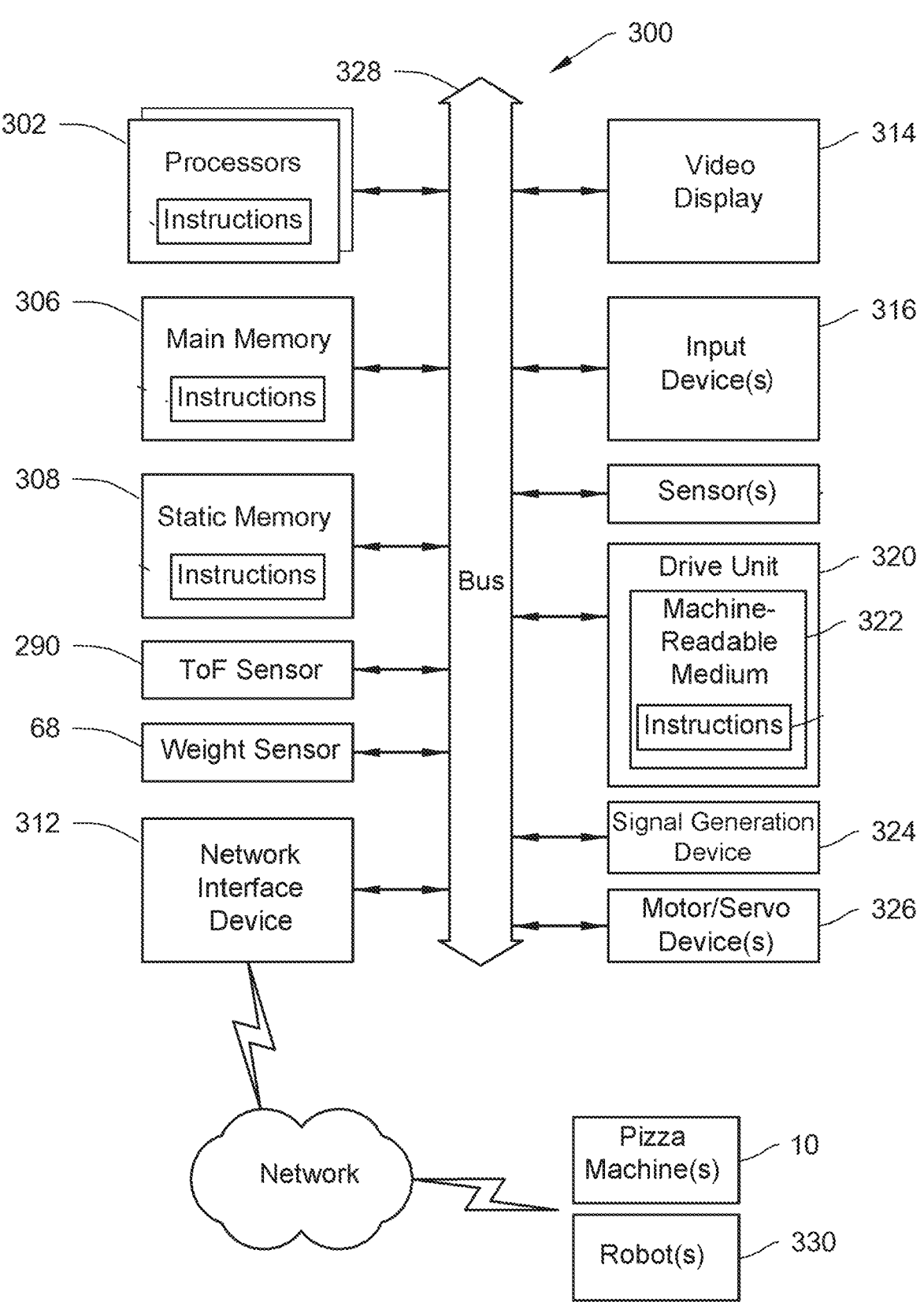
FIG. 47 illustrates an exemplary electronic computing device that may be used to implement an embodiment of the present technology.

FIG. 47 is a diagrammatic representation of an example machine in the form of a computer system 300 which is an example of one or more of the computers referred to herein and, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor or multiple processors 302 (e.g., a central processing unit (CPU), a graphics processing unit (GPU), or both), and a main memory 306 and optional static memory 308, which communicate with each other via a bus 328. The computer system 300 may further include a video display 314 (e.g., a liquid crystal display (LCD), touch sensitive display). The computer system 300 may also include an alpha-numeric input device(s) 296 (e.g., a keyboard, keypad, touchpad, touch display, buttons), a cursor control device (e.g., a mouse), a voice recognition or biometric verification unit (not shown), a drive unit 320 (also referred to as disk drive unit), a signal generation device 324 (e.g., a speaker), and a network interface device 312. The computer system 300 may further include a data encryption module (not shown) to encrypt data. The drive unit 320 includes a computer or machine-readable medium 322 on which is stored one or more sets of instructions and data structures (e.g., instructions 284) embodying or utilizing any one or more of the methodologies or functions described herein. The instructions 284 may also reside, completely or at least partially, within the main memory 306 and/or within the processors 302 during execution thereof by the computer system 300. The main memory 306 and the processors 302 may also constitute machine-readable media.

The computer system 300 may further include the weight sensor 68, the ToF sensor 290, position or other sensors 316, motors or servo devices 326 such as but not limited to the tray motor 54, the platform motor 64, the pump motor 108, the auger motor 140, the mixer motor 140', the disc motor 205, the servo motor 207, the revolver motor 208 and/or the compressor 260.

The instructions 284 may further be transmitted or received over a network via the network interface device 312 utilizing any one of a number of well-known transfer protocols (e.g., Hyper Text Transfer Protocol (HTTP)). While the machine-readable medium 322 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

An example machine system of the present technology including the computer system 300 in combinational and/or operational use with components of the present technology. In the exemplary, any or all of the platform moving assembly 50, the sauce dispenser assembly 90, the cheese dispenser assembly 130, the slicer assembly 190, the cooling unit 240, and the electrical components 270 can include a processor 302, memory 306, a network interface device 312, a display 314, an input device(s) 316, and/or sensor(s) 316.

It can be appreciated that additional and/or multiple automated food article making systems 10 can communicate with each other via the network. It can further be appreciated that robots 330 can be utilized and configured to transfer a pizza tray with a pizza crust thereon to and from the unit 12, and/or be utilized and configured to provide ingredients to refill the sauce container, the cheese container and/or the food tubes. The robots 330 can be in communication with each other and the unit 12 via the network.

Referring to FIGS. 48-53, an exemplary use of the present technology is illustrated in flow charts. In an exemplary operation, a user can input in desired pizza parameters for a pizza order utilizing the touch-display 16 or any other input device 316. Additionally, the user can enter in the pizza parameters utilizing a software/program application on a computer or a smart device connected directly to the unit 12 or wirelessly utilizing a wireless network. The pizza parameters can be, but not limited to, a size of the pizza crust, if sauce is to be dispensed on the pizza crust and an amount of sauce, if cheese is to be dispensed on the pizza crust and an amount of cheese, and if sliced food items are to be dispensed on the pizza crust and an amount of sliced food.

It can be appreciated that the computer system 300 can implement a graphical user interface (GUI) on the display 16, thereby providing selection of the pizza parameters. Further, the computer system 300 can store pizza parameters and/or pizza orders for subsequent calling and implementation.

The computer system 300 can be configured or configurable to utilize the pizza parameters, along with the weight data from the weight sensor 68 and/or the thickness data from the ToF sensor 290, to calculate and provide command and control signals to any of the electrical components of the present technology. The computer system 300 can be configured or configurable to generate control signals based on the pizza parameters of the pizza order, and provide the control signals to the corresponding electrical component. The control signals can be in part based on the weight data from the weight sensor, the thickness data from the ToF sensor, position data of the platform unit, the tray motor unit, and/or the sauce spreader.

Figures 48, 49:
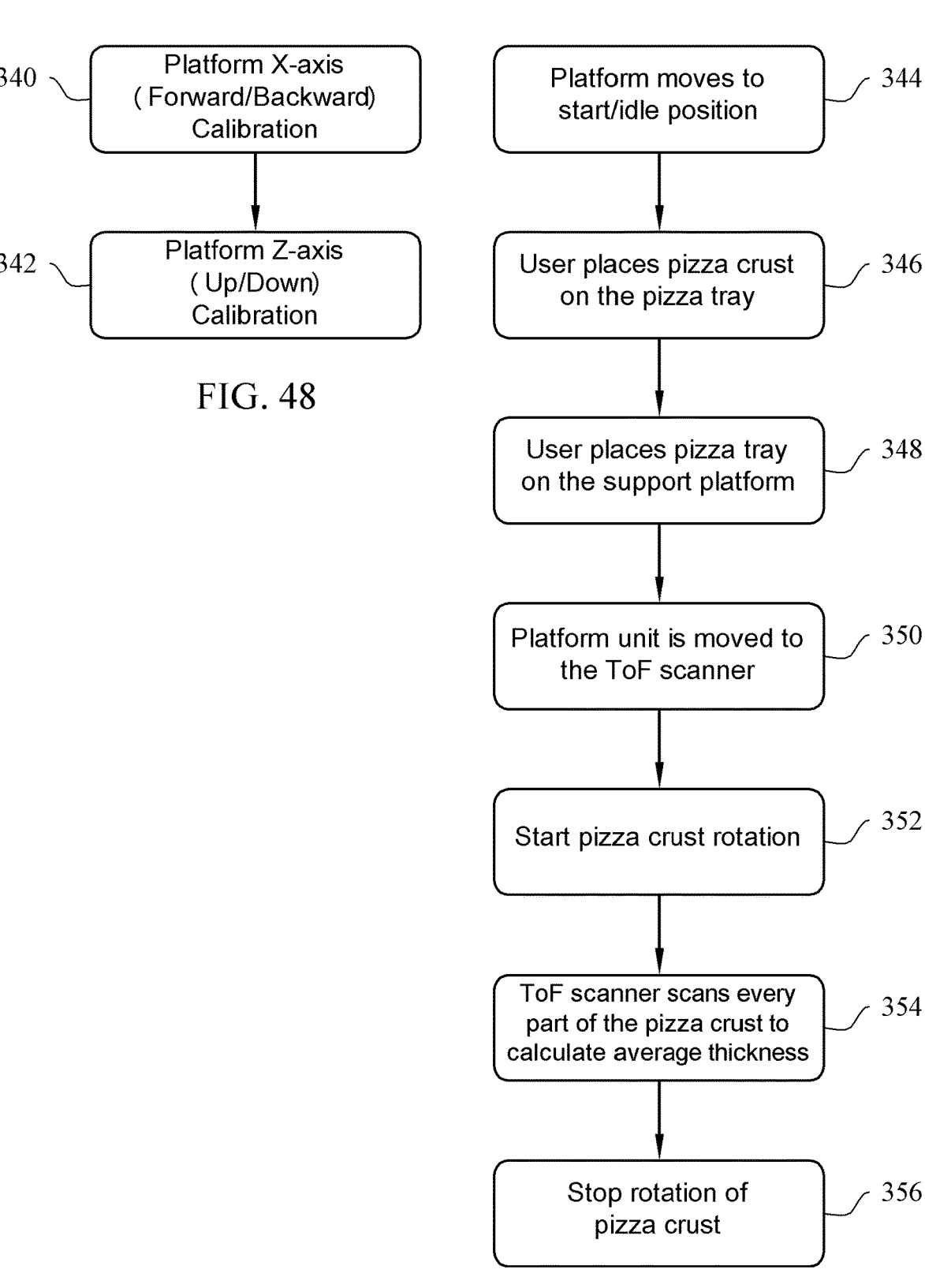
FIG. 48 is a flow chart of an example of the platform initialization process utilized in the present technology.
FIG. 49 is a flow chart of an example of the start dispensing process for each new pizza crust utilized in the present technology.

With reference to FIG. 48, an example of a platform initialization process is illustrated and will be described, which provides a flow chart process for position calibration of the platform unit. The X-axis (forward/backward) position of the platform unit is calibrated (step 340). After which, the Z-axis (up/down) position of the platform unit is calibrated (step 342).

With reference to FIG. 49, an example of a start dispensing process is illustrated and will be described, which provides a flow chart process for starting the dispensing operation for each new pizza crust placed on the pizza tray that is support by the platform unit. The platform unit is moved to the start or idle position (step 344). In this start or idle position, the user can place the pizza curst on the pizza tray (step 346), and then place the pizza tray on to the tray support platform of the platform unit (step 348). The platform unit can then be moved under the ToF scanner (step 350). After which, the pizza crust is rotated by activating the tray motor (step 352). The ToF scanner is activated to scan every part of the pizza crust to calculate the average thickness of the pizza crust (step 354). After completion of step 354, the rotation of the pizza crust is stopped (step 356).

Figure 50:
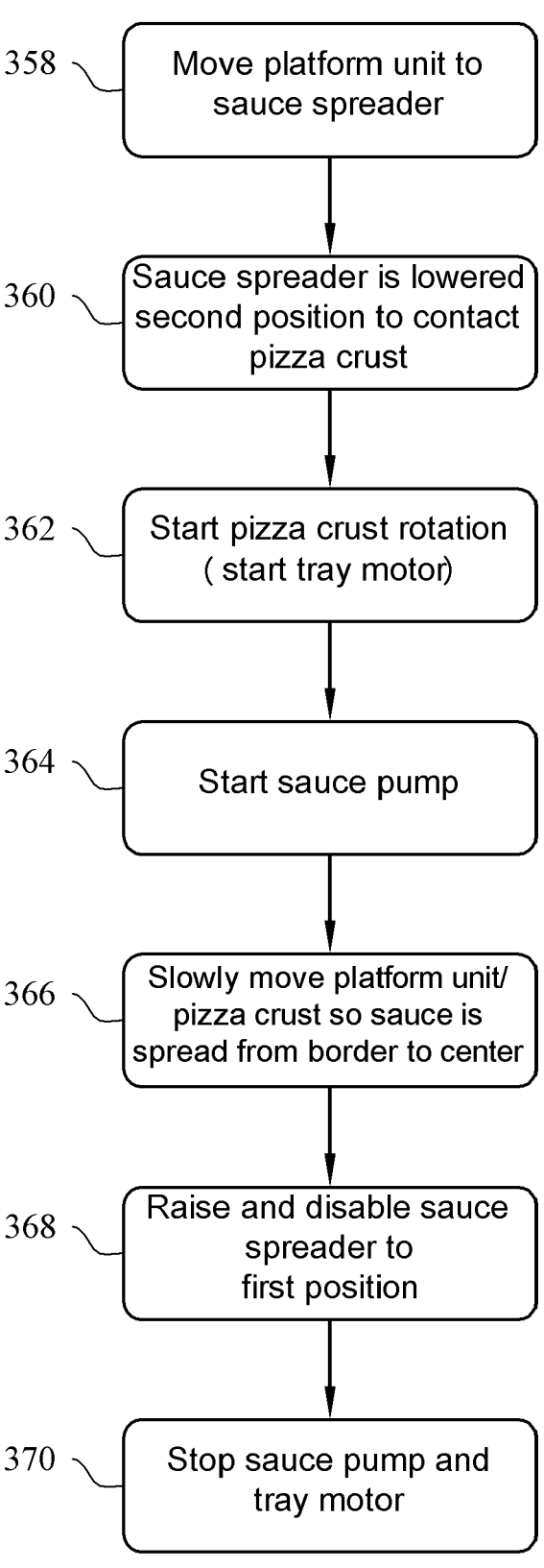
FIG. 50 is a flow chart of an example of the sauce dispensing process utilized in the present technology.

With reference to FIG. 50, an example of a sauce dispensing process is illustrated and will be described, which provides a flow chart process for the dispensing of sauce on to the pizza crust. The platform unit is moved so the pizza crust is below the sauce spreader (step 358). Then the sauce spreader is lowered to the second position so the pads are in contact with the pizza crust (step 360). The pizza crust starts to rotate by activating the tray motor (step 362). While the pizza crust is rotating, the sauce pump is started (step 364). While the sauce is being dispensed, the platform unit is slowly moved so sauce is spread from the border of the pizza crust to a center of the pizza crust (step 366). After completion of step 366, the sauce spreader is raised and disabled to the first position (step 368). After which, the sauce pump and tray motor are stopped (step 370).

Figure 51:
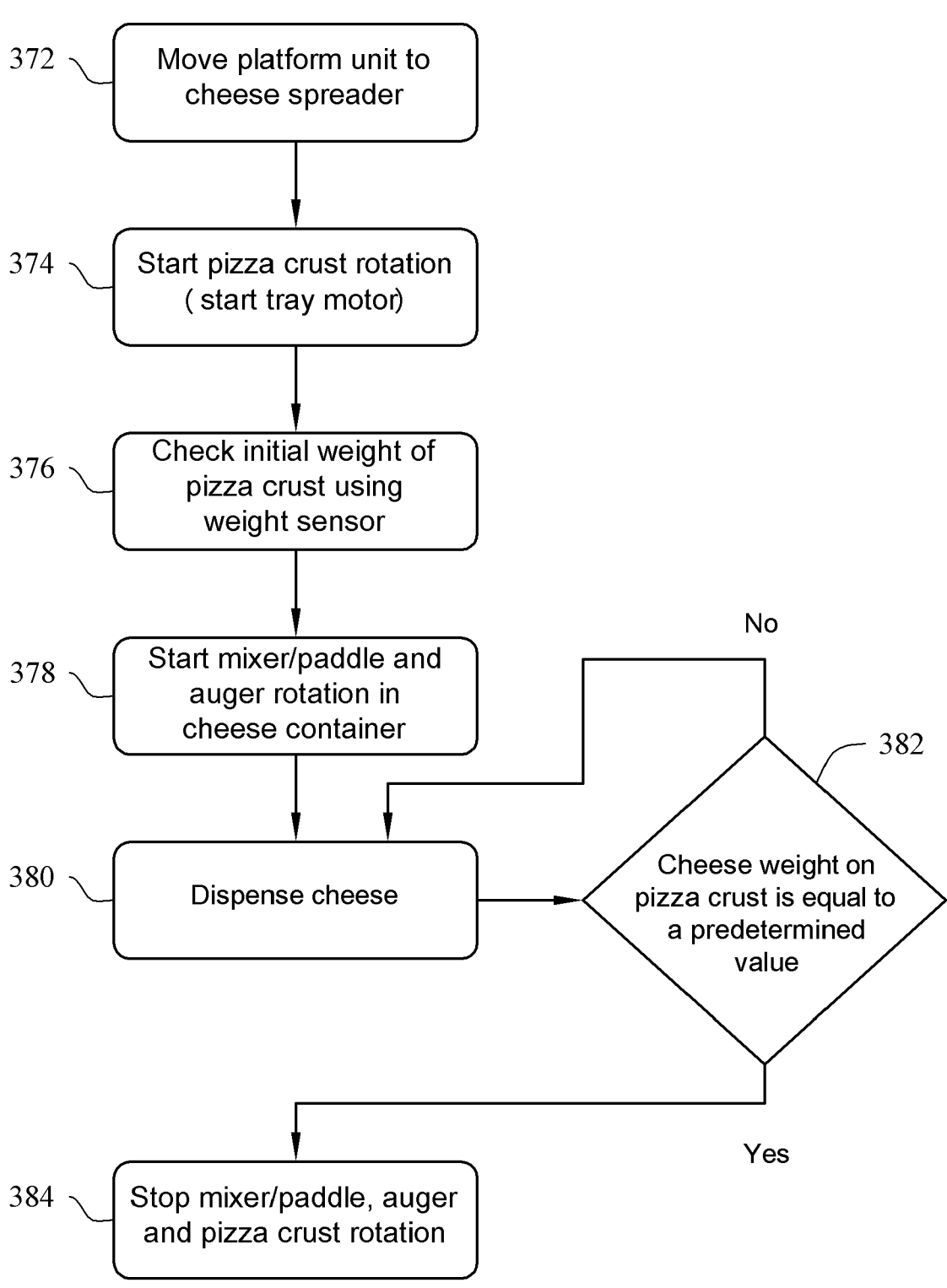
FIG. 51 is a flow chart of an example of the cheese dispensing process utilized in the present technology.

With reference to FIG. 51, an example of a cheese dispensing process is illustrated and will be described, which provides a flow chart process for the dispensing of cheese on to the pizza crust. The platform unit is moved so the pizza crust is below the cheese spreader (step 372). The pizza crust starts to rotate by activating the tray motor (step 374). While the pizza crust is rotating, an initial weight of the pizza crust is checked or determined utilizing the weight sensor (step 376). After which, the mixer paddle and auger are rotated in cheese container by activating the mixer motor and auger motor, respectively (step 378). While the mixer and auger are activated, the cheese in the cheese container is dispensed through the cheese spreader (step 380). During the dispensing of cheese, the weight of the cheese is calculated utilizing the current weigh of the pizza crust compared to the initial weigh (step 382). If the cheese weight calculated in step 382 is not equal to a predetermined value, then the step of dispensing cheese is continued. If the cheese weight calculated in step 382 is equal to a predetermined value, then the process proceeds to stop the mixer, auger and pizza crust rotation (step 384).

Figure 52:
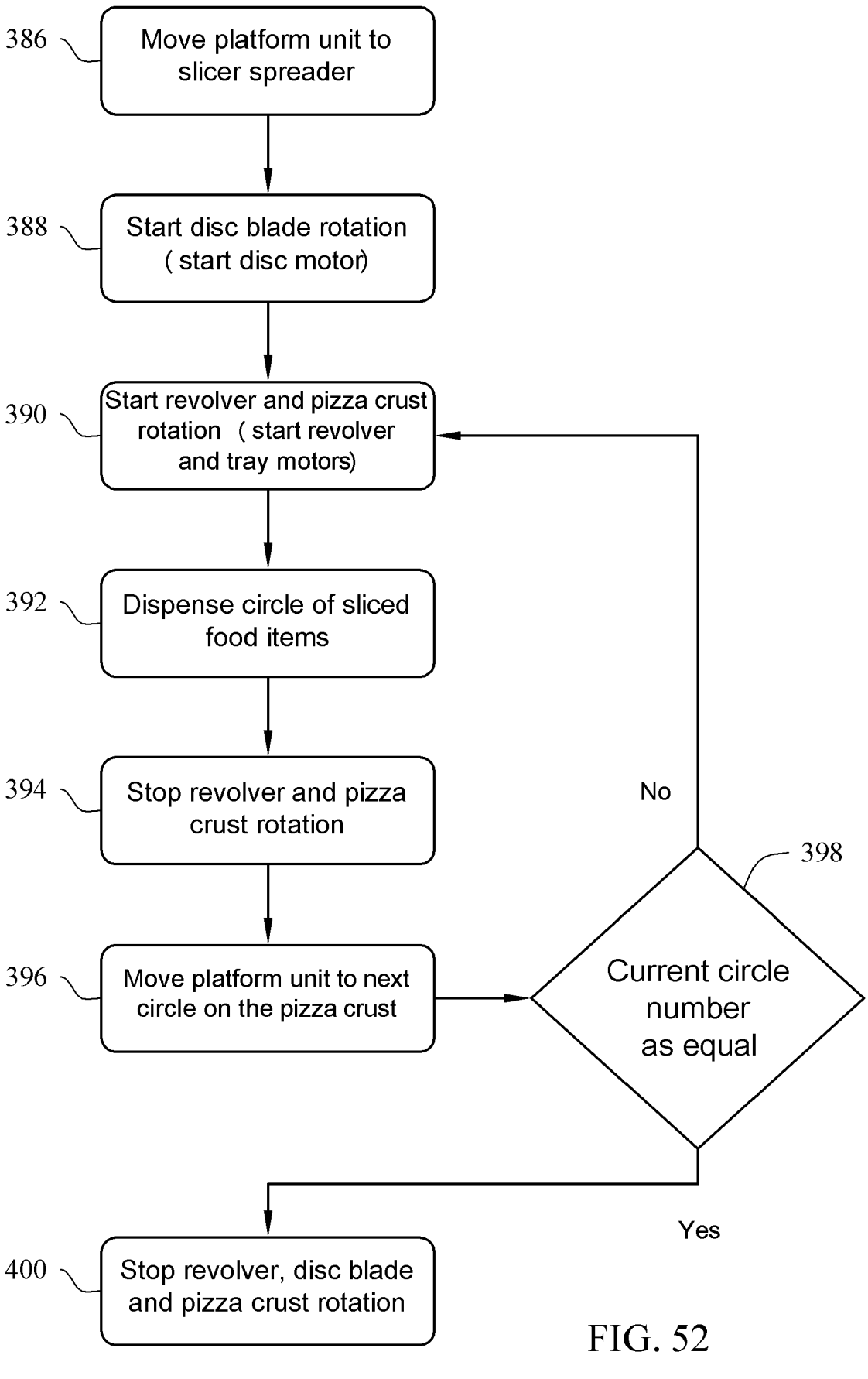
FIG. 52 is a flow chart of an example of the sliced food item dispensing process utilized in the present technology.

With reference to FIG. 52, an example of a sliced food item dispensing process is illustrated and will be described, which provides a flow chart process for the dispensing of sliced food items on to the pizza crust. The platform unit is moved so the pizza crust is below the slicer spreader (step 386). The disc blade starts to rotate by activating the disc motor (step 388). Further, the revolver and pizza crust start to rotate by activating the revolver motor and tray motor (step 390). While the pizza crust is rotating, a circle or radial row of sliced food items cut by the disc blade are dispensed on the pizza crust (step 392). After completion of one full dispensed circle, rotation of the revolver and pizza crust is stopped (step 394). After which, the platform unit is moved to another or next circle position of the pizza crust (step 396). The process the proceeds to step 398 to determine if the current circle number is equal to a predetermined value for that sized pizza crust. If the circle number is not equal to the predetermined value, then the process proceeds back to step 390 to dispense another circle or radial row of sliced food items. This process continues until the circle number equals the predetermined value, and after which proceeds to stop revolving the revolver, the disc blade and the pizza crust (step 400).

It can be appreciated that the sliced food item dispensing process can utilize additional steps to determine the amount of sliced food items dispenses on the pizza crust. For example, this process can use a slice food item weight calculated utilizing the current weight of the pizza crust compared to an initial weight prior to dispensing of slice food item. If the slice food item weight is not equal to a predetermined value, then the process can proceed back to step 390. If the slice food item weight is equal to the predetermined value, then the process can proceed to step 400.

With reference to FIG. 53, an example of a final or stopped process is illustrated and will be described, which provides a flow chart process for the ceasing of operation of the present technology. The platform unit is moved back to the start or idle position (step 402) so that it is ready to receive a new pizza crust. After which, the user is notified that the process has finished and the prepared pizza is ready for removal from the unit (step 404).

For purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated. Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

In some embodiments, method steps. processes, functions/acts disclosed herein may be performed in a different order or combination. In some embodiments, one or more steps of methods. processes, functions/acts disclosed herein may be omitted.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present technology. In this regard, each block in the flowchart or block diagrams or each method step or process summarized, described and/or claimed in this application may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the described embodiments of the present technology are illustrative only and that modifications thereof may occur to those skilled in the art. Accordingly, this present technology is not to be regarded as limited to the embodiments disclosed, but is to be limited only as defined by the appended claims herein. It will further be understood that any features described in relation to any particular embodiment may be featured in combinations with other embodiments, for avoidance of doubt.

While embodiments of the automated food article making system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although preparing a pizza utilizing the present technology has been described, it should be appreciated that the automated food article making system and method herein described is also suitable for preparing other food types such as, but not limited to, quesadillas, tortillas, tacos, nachos, sandwiches, pancakes, crepes, and the like.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A sauce dispenser system comprising:
a platform moving assembly configured to support and rotate a pizza crust at a dispense operating height; and
a sauce dispenser assembly comprising:
a sauce container configured to store a sauce therein;
a sauce pump unit configured to receive and pump the sauce from the sauce container to a discharge tube; and
a sauce spreader including at least one spreader pad configured to spread the sauce dispensed from the discharge tube on to the pizza crust being rotated by the platform moving assembly;
wherein the platform moving assembly is further configured to automatically adjust a horizontal (X-axis) position of the pizza crust in relation to the sauce spreader while the sauce being dispensed on the rotating pizza crust is being spread by the sauce spreader pad(s); and
wherein the sauce spreader further comprises a spreader body having a distal end and a proximal end, the spreader pad(s) being located at the distal end for spreading the dispensed sauce on the pizza crust, wherein the spreader body is pivotally mounted to lower the spreader body at an angle of inclination to the horizontal X-axis for the spreader pad(s) spreading the sauce being dispensed in relation to a rotational direction of the pizza crust; and wherein the sauce dispenser system further comprises a computer or controller operably coupled to the sauce dispenser assembly, the computer or controller being configured to control the sauce dispenser assembly to automatically adjust the spreader body angle of inclination according to data relating to characteristics of the sauce being dispensed.

2. The sauce dispenser system according to claim 1, wherein the sauce pump unit includes a sauce motor operatively coupled to a pair of counter rotating impellers.

3. The sauce dispenser system of claim 1, wherein the spreader body includes a discharge tube through opening disposed between the distal end and the proximal end for receiving therethrough a dispensing end of the discharge tube.

4. The sauce dispenser system according to claim 1, wherein the sauce spreader includes a discharge tube opening configured to receive therethrough an end of the discharge tube, and the at least one spreader pad is adjacent the discharge tube opening, the spreader pad(s) being positionable downstream of the discharge tube opening so that the sauce dispensed from the discharge tube is spread out by the spreader pad(s) in relation to the rotational direction of the pizza crust.

5. The sauce dispenser system according to claim 4, wherein the spreader body is pivotable so that the at least one spreader pad is contactable with the pizza crust.

6. The sauce dispenser system according to claim 4, further comprising a range finder sensor system configured to scan the pizza crust to provide thickness data associated with the pizza crust.

7. The sauce dispenser system according to claim 6, wherein the range finder sensor system comprises a time-of-flight sensor.

8. The sauce dispenser system of claim 6, further comprising a computer system including at least one processing unit operably connected or connectable to said platform moving assembly, and said range finder sensor system.

9. The sauce dispenser system of claim 8, wherein the at least one processing unit is configured to control said platform moving assembly to adjust the dispense operating height at which the pizza crust is supported according to said thickness data.

10. The sauce dispenser system of claim 9, wherein the platform moving assembly comprises:
a platform unit configured to move in a horizontal direction along a pair of travel tracks;
a travel motor configured to impart movement of the platform unit in the horizontal direction; and
a tray motor unit slidably mounted to the platform unit and configured to move in a vertical direction in relation to the platform unit, the tray motor unit including a tray motor configured to rotate a tray support platform that is configured to support the pizza crust.

11. The sauce dispenser system according to claim 10, wherein the platform unit includes a platform motor and platform gear, with the platform gear being configured to engage with a rack gear of the tray motor unit to move the tray motor unit in the vertical direction.

12. The sauce dispenser system according to claim 11, wherein the computer system including at least one processing unit is operably connected or connectable to the tray motor, the travel motor, the platform motor, a horizontal position sensor and a vertical position sensor each associated with the platform unit, a sauce motor for the sauce pump unit a weight sensor and a time-of-flight sensor.

13. The sauce dispenser system according to claim 12, wherein the at least one processing unit is configured to control any one of or any combination of the tray motor, the travel motor, the platform motor, and the sauce motor based on any one of or any combination of weight data, the thickness data, horizontal position data provided by the horizontal position sensor, and vertical position data provided by the vertical position sensor.

14. A sauce dispenser system comprising
a platform moving assembly configured to support and rotate a pizza crust at a dispense operating height; and
a sauce dispenser assembly comprising:
a sauce container configured to store a sauce therein;
a sauce pump unit configured to receive and pump the sauce from the sauce container to a discharge tube; and
a sauce spreader including at least one spreader pad configured to spread the sauce dispensed from the discharge tube on to the pizza crust being rotated by the platform moving assembly;
wherein the platform moving assembly is further configured to automatically adjust a horizontal (X-axis) position of the pizza crust in relation to the sauce spreader while the sauce being dispensed on the rotating pizza crust is being spread by the sauce spreader pad(s); and wherein the sauce spreader further comprises a spreader body having a distal end and a proximal end, the spreader pad(s) being located at the distal end, and wherein the sauce spreader is configured to lower the spreader body at an angle of inclination to the horizontal X-axis for spreading by the spreader pad(s) the sauce being dispensed in relation to a rotational direction of the pizza crust, and wherein the spreader body includes a discharge tube through opening disposed between the distal end and the proximal end for receiving therethrough a dispensing end of the discharge tube.

15. The sauce dispenser system according to claim 14, further comprising a range finder sensor system configured to scan the pizza crust to provide thickness data associated with the pizza crust.

16. The sauce dispenser system according to claim 15, wherein the range finder sensor system comprises a time-of-flight sensor.

17. A sauce dispenser system comprising a platform moving assembly configured to support and rotate a pizza crust at a dispense operating height; and a sauce dispenser assembly comprising:

a sauce container configured to store a sauce therein;

a sauce pump unit configured to receive and pump the sauce from the sauce container to a discharge tube; and a sauce spreader including at least one spreader pad configured to spread the sauce dispensed from the discharge tube on to the pizza crust being rotated by the platform moving assembly;

wherein the platform moving assembly is further configured to automatically adjust a horizontal (X-axis) position of the pizza crust in relation to the sauce spreader while the sauce being dispensed on the rotating pizza crust is being spread by the sauce spreader pad(s);

wherein the sauce spreader further comprises a spreader body having a distal end and a proximal end, the spreader pad(s) being located at the distal end for spreading the dispensed sauce on the pizza crust, wherein the spreader body is pivotally mounted to lower the spreader body at an angle of inclination to the horizontal X-axis for the spreader pad(s) spreading the sauce being dispensed in relation to a rotational direction of the pizza crust; and wherein the sauce dispenser system further comprises a computer or controller operably coupled to the sauce dispenser assembly, the computer or controller being configured to control the sauce dispenser assembly to automatically adjust the spreader body angle of inclination according to data relating to the thickness of the pizza crust.

18. The sauce dispenser of claim 17, wherein the computer or controller is configured to control the sauce dispenser assembly to adjust the angle of inclination to maintain a pressing force of the spreader pad(s) on the pizza crust in substantially the same operating range irrespective of whether the pizza crust thickness is a smaller thickness or a larger thickness than an average thickness or predetermined thickness for which the sauce spreader is normally configured to operate.

19. The sauce dispenser of claim 17, wherein the spreader body includes a discharge tube through opening disposed between the distal end and the proximal end for receiving therethrough a dispensing end of the discharge tube.

20. The sauce dispenser of claim 17, wherein the sauce dispenser assembly includes a stepper motor operably coupled to the sauce spreader for adjusting the angle of inclination, wherein the computer or controller is operably coupled to the stepper motor and configured to control the stepper motor to adjust the angle of inclination according to the thickness data.

* * * * *